United States Patent
Saito

(10) Patent No.: US 10,385,269 B2
(45) Date of Patent: Aug. 20, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/368,676

(22) Filed: Dec. 5, 2016

(65) Prior Publication Data
US 2017/0174993 A1 Jun. 22, 2017

(30) Foreign Application Priority Data

Dec. 21, 2015 (JP) ................................ 2015-248229
Sep. 5, 2016 (JP) ................................ 2016-172397

(51) Int. Cl.
| | | |
|---|---|---|
| G02F 1/1333 | (2006.01) |
| C09K 19/30 | (2006.01) |
| C09K 19/34 | (2006.01) |
| C09K 19/20 | (2006.01) |
| C09K 19/04 | (2006.01) |
| C09K 19/12 | (2006.01) |

(52) U.S. Cl.
CPC .......... *C09K 19/3001* (2013.01); *C09K 19/20* (2013.01); *C09K 19/3066* (2013.01); *C09K 19/3068* (2013.01); *C09K 19/3402* (2013.01); *C09K 2019/0466* (2013.01); *C09K 2019/123* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3083* (2013.01); *C09K 2019/3422* (2013.01)

(58) Field of Classification Search
USPC ....................................................... 252/299.6
See application file for complete search history.

(56) References Cited

U.S. PATENT DOCUMENTS

| | | | |
|---|---|---|---|
| 9,296,949 B2 * | 3/2016 | Kuriyama | ............... C09K 19/44 |
| 2013/0148069 A1 | 6/2013 | Archetti et al. | |
| 2013/0182202 A1 | 7/2013 | Graziano et al. | |
| 2013/0314655 A1 | 11/2013 | Archetti et al. | |
| 2014/0049738 A1* | 2/2014 | Hirai | ..................... G02F 1/1337 349/123 |
| 2015/0301368 A1 | 10/2015 | Archetti et al. | |

FOREIGN PATENT DOCUMENTS

| | | | |
|---|---|---|---|
| JP | 2013541028 | 11/2013 | |
| JP | 2013543526 | 12/2013 | |
| JP | 2014513150 | 5/2014 | |
| WO | 2014094959 | 6/2014 | |
| WO | WO 2015/060056 A1 * | 4/2015 | ............. C09K 19/42 |

* cited by examiner

*Primary Examiner* — Geraldina Visconti
(74) *Attorney, Agent, or Firm* — JCIPRNET

(57) ABSTRACT

The subject is to show a liquid crystal composition in which the homeotropic alignment of liquid crystal molecules can be achieved by the action of a polymer, and a liquid crystal display device including this composition.

The means concerns a nematic liquid crystal composition that has positive dielectric anisotropy and that includes a specific liquid crystal compound having a large positive dielectric anisotropy as a first component and a polar compound having a polymerizable group as a first additive, and the composition may include a specific liquid crystal compound having a high maximum temperature or a small viscosity as a second component, a specific liquid crystal compound having a positive dielectric anisotropy as a third component, a specific liquid crystal compound having negative dielectric anisotropy as a fourth component, and a polymerizable compound as a second additive, and concerns a liquid crystal display device including the composition.

19 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2015-248229, filed on Dec. 21, 2015, and Japan application serial no. 2016-172397, filed on Sep. 5, 2016. The entirety of the above-mentioned patent applications are hereby incorporated by reference herein and made a part of this specification.

TECHNICAL FIELD

The invention relates to a liquid crystal composition, a liquid crystal display device including this composition and so forth. It relates especially to a liquid crystal composition having positive dielectric anisotropy and including a polar compound having a polymerizable group (or its polymer), where the homeotropic alignment of liquid crystal molecules can be achieved by the action of the compound, and to a liquid crystal display device.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by improving the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable. The elastic constant of the composition relates to the contrast ratio of the device. A large elastic constant of the composition is desirable for increasing the contrast ratio of the device.

TABLE 1

Characteristics of Compositions and AM Devices

| No. | Characteristics of Compositions | Characteristics of AM Devices |
| --- | --- | --- |
| 1 | a wide temperature range of a nematic phase | a wide temperature range in which the device can be used |
| 2 | a small viscosity | a short response time |
| 3 | a suitable optical anisotropy | a large contrast ratio |
| 4 | a large positive or negative dielectric anisotropy | a low threshold voltage and low power consumption, a large contrast ratio |
| 5 | a large specific resistance | a large voltage holding ratio and a large contrast ratio |
| 6 | a high stability to ultraviolet light and heat | a long service life |
| 7 | a large elastic constant | a large contrast ratio and a short response time |

The optical anisotropy of the composition relates to the contrast ratio of the device. A large optical anisotropy or a small optical anisotropy, namely a suitable optical anisotropy, is necessary depending on the mode of the device. The product (Δn×d) of the optical anisotropy (Δn) of the composition and the cell gap (d) of the device is designed so as to maximize the contrast ratio. A suitable value of the product depends on the type of operating mode. A suitable value is approximately 0.45 micrometers for a device having a mode such as TN. In this case, a composition having a large optical anisotropy is desirable for a device having a small cell gap. A large dielectric anisotropy of the composition contributes to a low threshold voltage, a small power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance at a temperature close to the maximum temperature of a nematic phase as well as at room temperature, after it has been used for a long time. The stability of the composition to ultraviolet light or heat relates to the service life of the device. The device has a long service life when the stability is high. Characteristics of this kind are desirable for an AM device used for a liquid crystal projector, a liquid crystal television and so forth.

In a conventional liquid crystal display device, the homeotropic alignment of liquid crystal molecules is achieved by a specific polyimide alignment film. The effect of a polymer is utilized for a liquid crystal display device with a polymer sustained alignment (PSA) type. First, a composition to which a small amount of a polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the alignment of liquid crystal molecules, and thus the response time of the device is decreased and image burn-in is improved. This kind of effect of the polymer can be expected for a device having a mode such as TN, ECB, OCB, IPS, VA, FFS or FPA.

In contrast, a liquid crystal composition including a polymer and a polar compound is used for a liquid crystal display device without alignment films. First, a composition to which a small amount of a polymerizable compound and a small amount of a polar compound have been added is poured into a device, where the liquid crystal molecules are aligned by the action of the polar compound. Next, the composition is irradiated with ultraviolet light, where the polymerizable compound is polymerized, stabilizing the alignment of the liquid crystal molecules. In this composition, the alignment of the liquid crystal molecules can be adjusted by the polymer and the polar compound, and thus the response time of the device is decreased and image burn-in is improved. Furthermore, a step for forming an alignment film is not necessary to the device without alignment films. The electric resistance of the device is sometimes decreased by the interaction of the alignment film and the composition. However, the phenomena are not caused because of the absence of the alignment film. This kind of effect caused by the polymer and the polar compound can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment type. A composition having positive or negative dielectric anisotropy is used for a device without alignment films. Examples of the liquid crystal composition having positive dielectric anisotropy are disclosed in the following patent documents No. 1 to 4.

PRIOR ART

Patent Document

Patent document No. 1: JP 2013-541028 A.
Patent document No. 2: JP 2013-543526 A.
Patent document No. 3: JP 2014-513150 A.
Patent document No. 4: WO 2014-94959 A.

SUMMARY OF THE INVENTION

Subject to be Solved by the Invention

The invention provides a liquid crystal composition that includes a polar compound having a polymerizable group, where the polar compound has a high compatibility with liquid crystal compounds. The invention further provides a liquid crystal composition in which the homeotropic alignment of liquid crystal molecules can be achieved by the action of the polymer formed from the polar compound. The invention further provides a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. The invention further provides a liquid crystal composition that is suitably balanced between at least two of the characteristics. The invention further provides a liquid crystal display device including such a composition. The invention further provides an AM device that has characteristics such as a short response time, a large voltage holding ratio, a low threshold voltage, a large contrast ratio and a long service life.

Means for Solving the Subject

The invention relates to a liquid crystal composition having positive dielectric anisotropy and including at least one compound selected from the group consisting of compounds represented by formula (1) as a first component and at least one polar compound having a polymerizable group as a first additive, and to a liquid crystal display device including the composition.

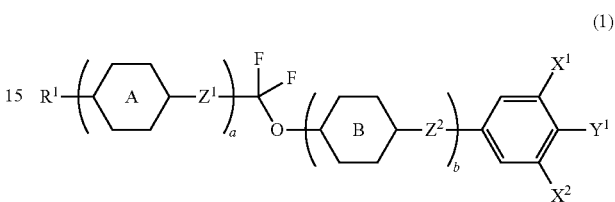

In formula (1), $R^1$ is alkyl having 1 to 12 carbons, alkoxy having 1 to 12 carbons or alkenyl having 2 to 12 carbons; ring A and ring B are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are independently a single bond, —CH$_2$CH$_2$—, —CH═CH—, —CH$_2$O—, —OCH$_2$—, —COO—, —OCO—, —CF$_2$O— or —OCF$_2$—; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; a is 1, 2, 3 or 4; b is 0, 1, 2 or 3; and the sum of a and b is 4 or less.

Effect of the Invention

One of the advantages of the invention is to provide a liquid crystal composition that includes a polar compound having a polymerizable group, where the polar compound has a high compatibility with liquid crystal compounds. A further advantage is to provide a liquid crystal composition in which the homeotropic alignment of liquid crystal molecules can be achieved by the action of the polymer formed from the polar compound. A further advantage is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. A further advantage is to provide a liquid crystal composition that is suitably balanced between at least two of the characteristics. A further advantage is to provide a liquid crystal display device including such a composition. A further advantage is to provide an AM device that has characteristics such as a short response time, a large voltage holding ratio, a low threshold voltage, a large contrast ratio and a long service life.

Embodiment to Carry Out the Invention

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it.

A liquid crystal composition is prepared by mixing a plurality of liquid crystal compounds. An additive such as an optically active compound, an antioxidant, an ultraviolet light absorber, a coloring matter, an antifoaming agent, a polymerizable compound, a polymerization initiator, a polymerization inhibitor and a polar compound is added to the liquid crystal composition as required. The liquid crystal compounds or the additive is added according to this procedure. Even if an additive is added, the proportion of a liquid crystal compound is expressed as a percentage by weight (% by weight) based on the weight of the liquid crystal composition excluding the additive. The proportion of the additive is expressed as a percentage by weight (% by weight) based on the weight of the liquid crystal composition excluding the additive. That is to say, the proportion of the liquid crystal compound or additive is calculated on the basis of the total weight of the liquid crystal compounds. Weight parts per million (ppm) is sometimes used. The proportion of the polymerization initiator or the polymerization inhibitor is exceptionally expressed on the basis of the weight of the polymerizable compound.

"The upper limit of the temperature range of a nematic phase" is sometimes abbreviated to "the maximum temperature." "The lower limit of the temperature range of a nematic phase" is sometimes abbreviated to "the minimum temperature." That "specific resistance is large" means that a composition has a large specific resistance at a temperature close to the maximum temperature as well as at room temperature in the initial stages, and that the composition has a large specific resistance at a temperature close to the maximum temperature as well as at room temperature, after it has been used for a long time. That "a voltage holding ratio is large" means that a device has a large voltage holding ratio at a temperature close to the maximum temperature as well as at room temperature in the initial stages, and that the device has a large voltage holding ratio at a temperature close to the maximum temperature as well as at room temperature, after it has been used for a long time. In compositions or devices, characteristics are sometimes evaluated using a long-term test (including an accelerated aging test). The expression "increase the dielectric anisotropy" means that its value increases positively when the composition has positive dielectric anisotropy, and that its value increases negatively when the composition has negative dielectric anisotropy.

A compound represented by formula (1) is sometimes abbreviated to "compound (1)." At least one compound selected from the group consisting of compounds represented by formula (1) is sometimes abbreviated to "compound (1)." "Compound (1)" means one compound, a mixture of two compounds or a mixture of three or more compounds, represented by formula (1). The same applies to a compound represented by other formulas. The expression "at least one 'A'" means that the number of 'A' is arbitrary.

The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'."

An expression such as "at least one —$CH_2$— may be replaced by —O—" is sometimes used. In this case, —$CH_2$—$CH_2$—$CH_2$— may be transformed to —O—$CH_2$—O— by replacement of nonadjacent —$CH_2$— with —O—. However, adjacent —$CH_2$— should not be replaced by —O—. This is because of the formation of unstable —O—O—$CH_2$— (peroxide) by this replacement. That is to say, the expression means both "one —$CH_2$— may be replaced by —O—" and "at least two nonadjacent —$CH_2$— may be replaced by —O—." In formula (5), $R^7$ is alkyl having 1 to 25 carbons or the like, and in the alkyl at least one —$CH_2$— may be replaced by cycloalkylene having 3 to 8 carbons or the like. The number of carbons is increased by this replacement. In this case, the maximum number of carbons is 30. The same rule applies when the number of carbon is increased by replacement.

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. The same rule applies to symbols such as other terminal groups. In formula (1), two of ring A are present when a is 2. In this compound, two groups represented by two of ring A may be the same or different. The same rule applies to arbitrary two of ring A, when a is greater than 2. The same rule also applies to other symbols. The same rule also applies to two -$Sp^{11}$-$P^5$ in compound (7-27), for instance.

A symbol such as A, B, C or D surrounded by a hexagonal shape corresponds to a ring such as ring A, ring B, ring C or ring D, respectively, and represents a ring such as a six-membered ring or a condensed ring. In formula (5), an oblique line crossing a hexagonal shape means that arbitrary hydrogen on the ring may be replaced by a group such as -$Sp^1$-$P^1$. A subscript such as 'k' shows the number of the group that has been replaced. There is no replacement when the subscript 'k' is 0 (zero). A plurality of -$Sp^1$-$P^1$ are present on ring J when the subscript 'k' is 2 or more. A plurality of groups represented by -$Sp^1$-$P^1$ may be the same or different. In the expression "ring A and ring B are independently X, Y or Z", "independently" is used, since the subject is plural. In the case of "ring C is X, Y or Z", "independently" is not used, since the subject is singular. When "ring C" is used in a plurality of formulas, the rule "may be the same or different" is applied to "ring C." The same applies to other groups.

2-Fluoro-1,4-phenylene means the two divalent groups described below. Fluorine may be facing left (L) or facing right (R) in a chemical formula. The same rule also applies to an asymmetric divalent group formed from a ring by removing two hydrogens, such as tetrahydropyran-2,5-diyl. The same rule also applies to a bonding group such as carbonyloxy (—COO— or —OCO—).

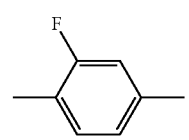

(L)

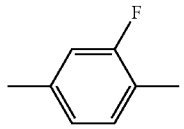
(R)

Alkyl in a liquid crystal compound is straight-chain or branched-chain, and does not include cycloalkyl. Straight-chain alkyl is preferable to branched-chain alkyl. This applies to a terminal group such as alkoxy and alkenyl. With regard to the configuration of 1,4-cyclohexylene, trans is generally preferable to cis.

The invention includes the following items.

Item 1.

A liquid crystal composition having positive dielectric anisotropy and including at least one compound selected from the group consisting of compounds represented by formula (1) as a first component and at least one polar compound having a polymerizable group as a first additive:

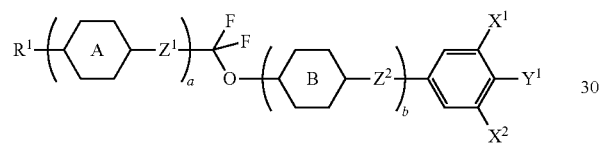
(1)

in formula (1), $R^1$ is alkyl having 1 to 12 carbons, alkoxy having 1 to 12 carbons or alkenyl having 2 to 12 carbons; ring A and ring B are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are independently a single bond, —CH$_2$CH$_2$—, —CH=CH—, —CH$_2$O—, —OCH$_2$—, —COO—, —OCO—, —CF$_2$O— or —OCF$_2$—; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and a is 1, 2, 3 or 4; b is 0, 1, 2 or 3, and the sum of a and b is 4 or less.

Item 2.

The liquid crystal composition according to item 1, including at least one compound selected from the group consisting of compounds represented by formula (1-1) to formula (1-14) as the first component:

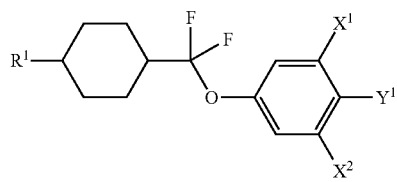
(1-1)

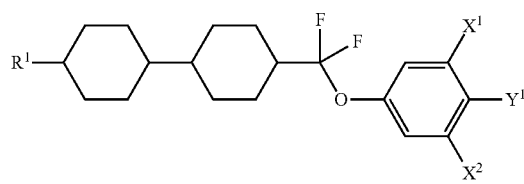
(1-2)

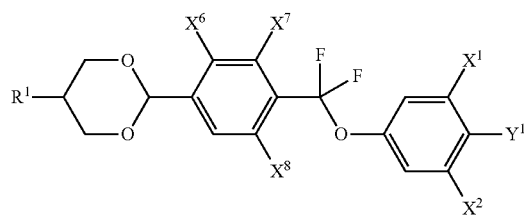
(1-3)

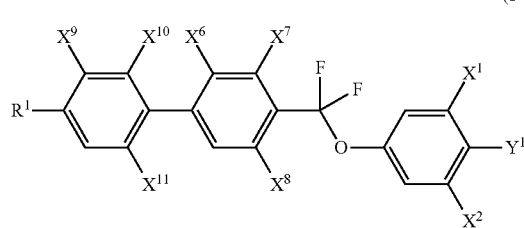
(1-4)

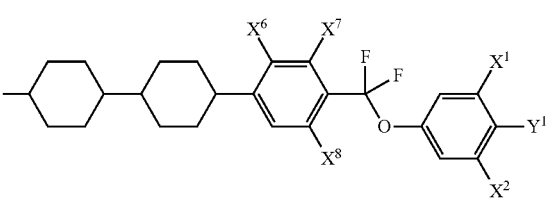
(1-5)

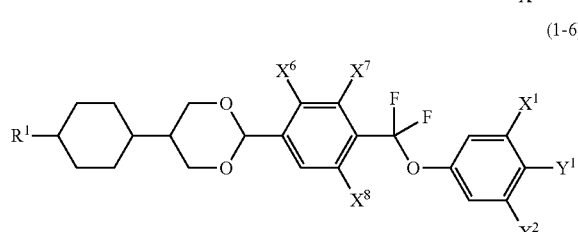
(1-6)

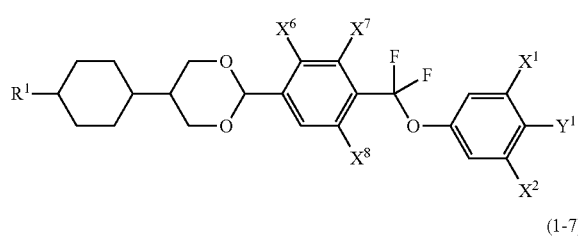

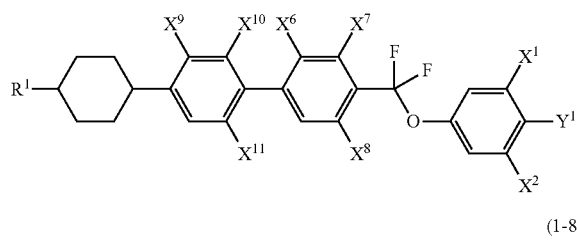
(1-7)

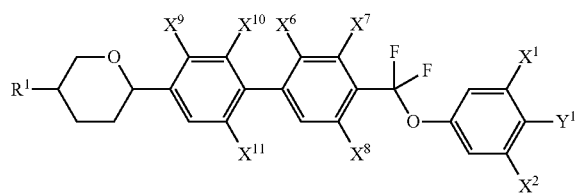
(1-8)

-continued (1-9)

[Chemical structure]

(1-10)

[Chemical structure]

(1-11)

[Chemical structure]

(1-12)

[Chemical structure]

(1-13)

[Chemical structure]

(1-14)

[Chemical structure]

in formula (1-1) to formula (1-14), $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$, $X^8$, $X^9$, $X^{10}$, $X^{11}$, $X^{12}$, $X^{13}$ and $X^{14}$ are independently hydrogen or fluorine; and $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine.

Item 3.

The liquid crystal composition according to item 1 or 2, wherein the proportion of the first component is in the range of 5% by weight to 55% by weight based on the weight of the liquid crystal composition.

Item 4.

The liquid crystal composition according to any one of items 1 to 3, including at least one compound selected from the group consisting of compounds represented by formula (2) as a second component:

$$R^2-\left(\!\!\left(C\right)\!-Z^3\right)_c\!\!-\left(D\right)\!-R^3 \quad (2)$$

in formula (2), $R^2$ and $R^3$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine; ring C and ring D are independently 1,4-cyclohexylene, 1,4-phenylene, 2-fluoro-1,4-phenylene or 2,5-difluoro-1,4-phenylene; $Z^3$ is a single bond, —CH$_2$CH$_2$—, —CH$_2$O—, —OCH$_2$—, —COO— or —OCO—; and c is 1, 2 or 3.

Item 5.

The liquid crystal composition according to any one of items 1 to 4, including at least one compound selected from the group consisting of compounds represented by formula (2-1) to formula (2-13) as the second component:

(2-1)

[Chemical structure]

(2-2)

[Chemical structure]

(2-3)

[Chemical structure]

(2-4)

[Chemical structure]

(2-5)

[Chemical structure]

(2-6)

[Chemical structure]

(2-7)

[Chemical structure]

(2-8)

[Chemical structure]

-continued

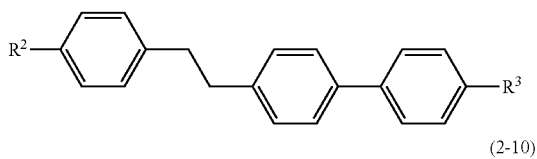
(2-9)

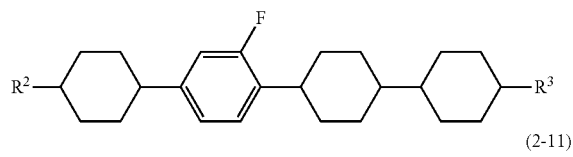
(2-10)

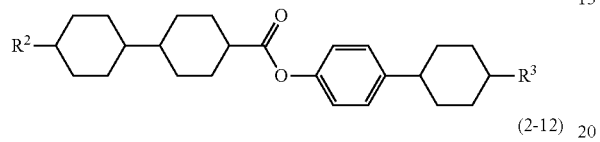
(2-11)

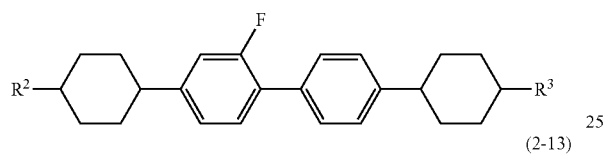
(2-12)

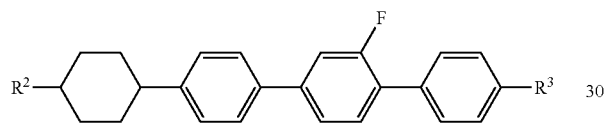
(2-13)

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine.

Item 6.

The liquid crystal composition according to item 4 or 5, wherein the proportion of the second component is in the range of 10% by weight to 70% by weight based on the weight of the liquid crystal composition.

Item 7.

The liquid crystal composition according to any one of items 1 to 6, including at least one compound selected from the group consisting of compounds represented by formula (3) as a third component:

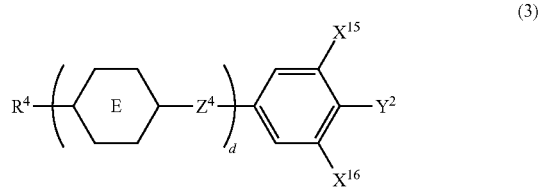
(3)

in formula (3), $R^4$ is alkyl having 1 to 12 carbons, alkoxy having 1 to 12 carbons or alkenyl having 2 to 12 carbons; ring E is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^4$ is a single bond, —$CH_2CH_2$—, —COO— or —OCO—; $X^{15}$ and $X^{16}$ are independently hydrogen or fluorine; $Y^2$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and d is 1, 2, 3 or 4.

Item 8.

The liquid crystal composition according to any one of items 1 to 7, including at least one compound selected from the group consisting of compounds represented by formula (3-1) to formula (3-16) as the third component:

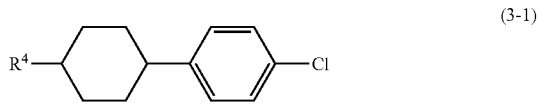
(3-1)

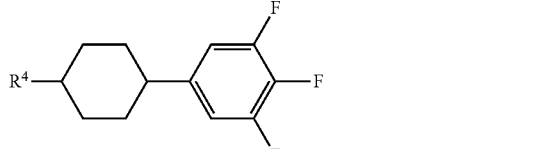
(3-2)

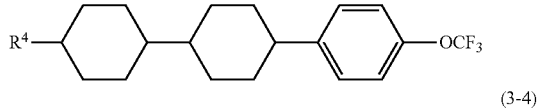
(3-3)

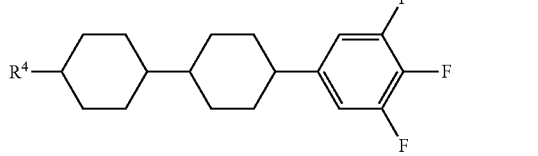
(3-4)

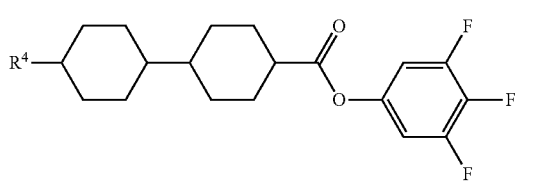
(3-5)

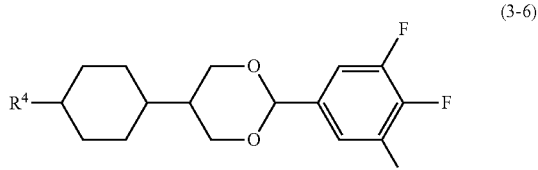
(3-6)

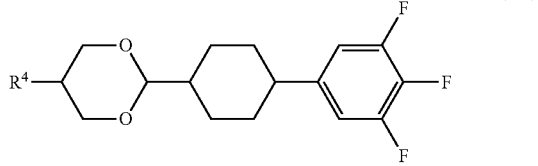
(3-7)

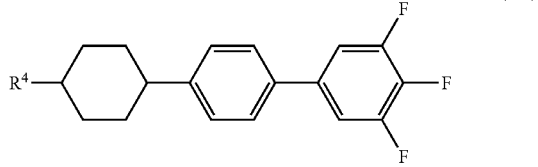
(3-8)

-continued (3-9)

(3-10)
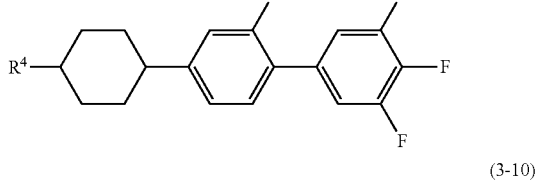

(3-11)
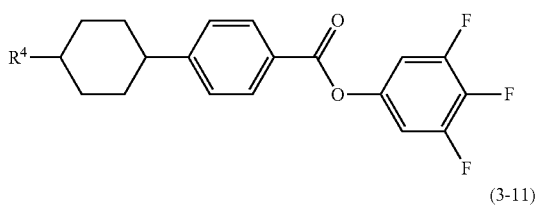

(3-12)
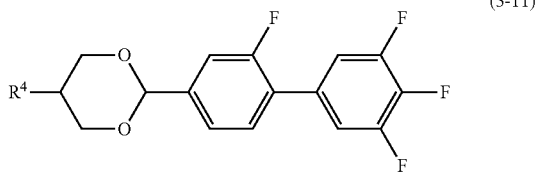

(3-13)
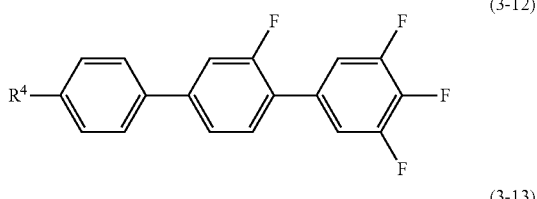

(3-14)
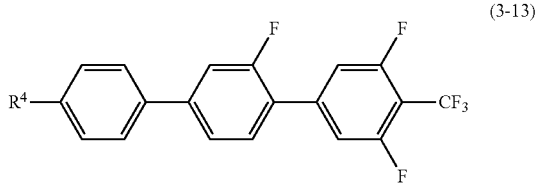

(3-15)
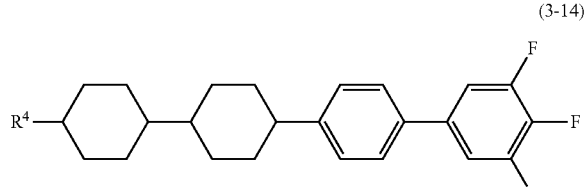

(3-16)
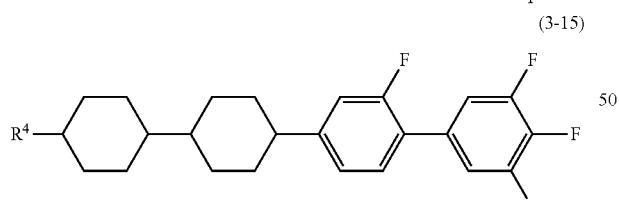

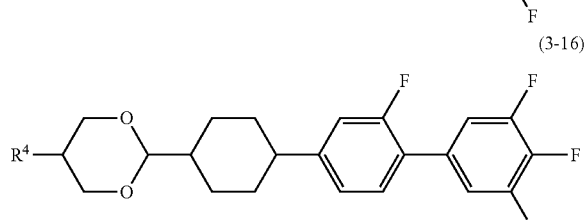

in formula (3-1) to formula (3-16), $R^4$ is alkyl having 1 to 12 carbons, alkoxy having 1 to 12 carbons or alkenyl having 2 to 12 carbons.

Item 9.

The liquid crystal composition according to item 7 or 8, wherein the proportion of the third component is in the range of 5% by weight to 50% by weight based on the weight of the liquid crystal composition.

Item 10.

The liquid crystal composition according to any one of items 1 to 9, including at least one compound selected from the group consisting of compounds represented by formula (4) as a fourth component:

(4)
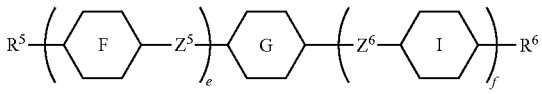

in formula (4), $R^5$ and $R^6$ are independently alkyl having 1 to 12 carbons, alkoxy having 1 to 12 carbons, alkenyl having 2 to 12 carbons or alkenyloxy having 2 to 12 carbons; ring F and ring I are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochromane-2,6-diyl; $Z^5$ and $Z^6$ are independently a single bond, —CH$_2$CH$_2$—, —CH$_2$O—, —OCH$_2$—, —COO— or —OCO—; and e is 1, 2 or 3, f is 0 or 1, and the sum of e and f is 3 or less.

Item 11.

The liquid crystal composition according to any one of items 1 to 10, including at least one compound selected from the group consisting of compounds represented by formula (4-1) to formula (4-22) as the fourth component:

(4-1)
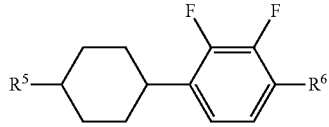

(4-2)
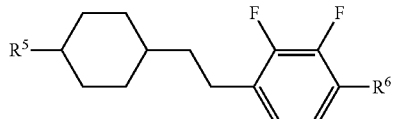

(4-3)
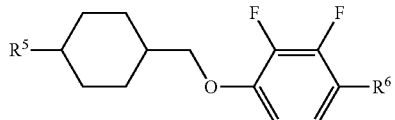

(4-4)
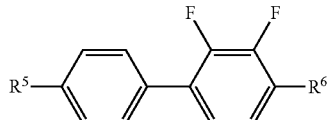

(4-5)
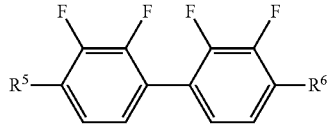

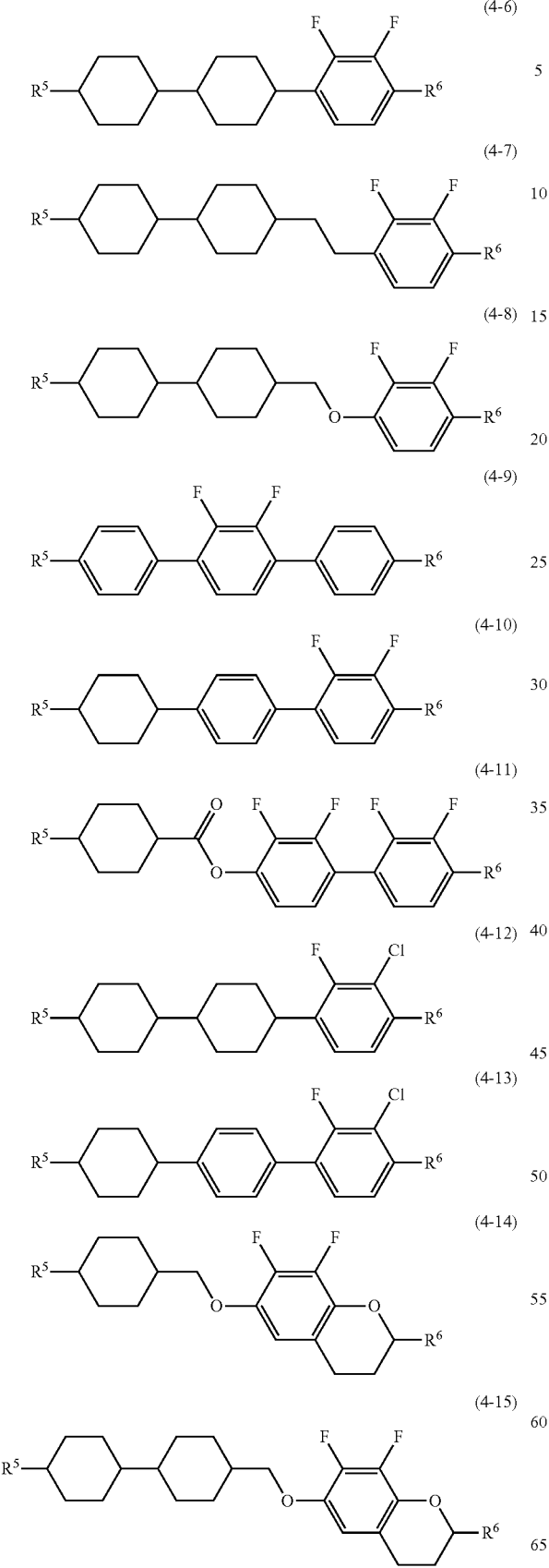
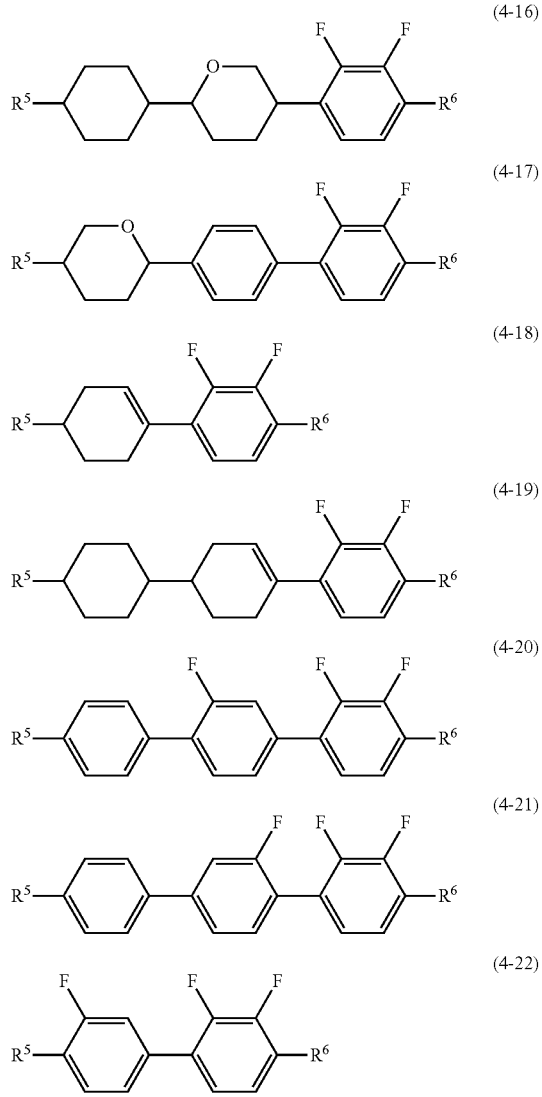

in formula (4-1) to formula (4-22), $R^5$ and $R^6$ are independently alkyl having 1 to 12 carbons, alkoxy having 1 to 12 carbons, alkenyl having 2 to 12 carbons or alkenyloxy having 2 to 12 carbons.

Item 12.

The liquid crystal composition according to item 10 or 11, wherein the proportion of the fourth component is in the range of 3% by weight to 40% by weight based on the weight of the liquid crystal composition.

Item 13.

The liquid crystal composition according to any one of items 1 to 12, wherein the first additive is a polar compound having a heteroatom selected from nitrogen, oxygen, sulfur and phosphorus.

Item 14.

The liquid crystal composition according to any one of items 1 to 13, including at least one polar compound selected from the group consisting of compounds represented by formula (5) and formula (6) as the first additive:

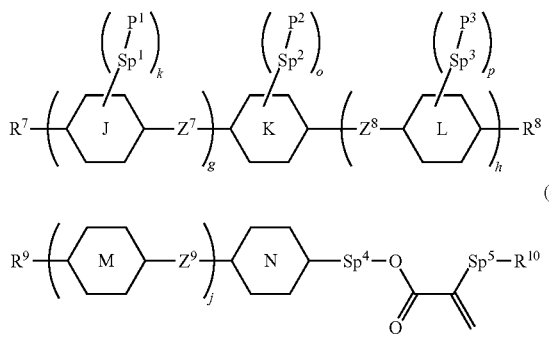

in formula (5), $R^7$ is hydrogen, fluorine, chlorine or alkyl having 1 to 25 carbons, and in the alkyl at least one —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in these groups at least one hydrogen may be replaced by fluorine or chlorine, where $R^0$ is hydrogen or alkyl having 1 to 12 carbons; $R^8$ is a polar group having at least one of an oxygen atom of a OH moiety, a sulfur atom of an SH moiety and a nitrogen atom of primary, secondary or tertiary amine moiety; ring J, ring K and ring L are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^7$ and $Z^8$ are independently a single bond or alkylene having 1 to 10 carbons, and in the alkylene at least one —$CH_2$— may be replaced by —O—, —CO—, —COO— or —OCO—, and at least one —$CH_2CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine; $P^1$, $P^2$ and $P^3$ is a polymerizable group; $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine; g and h are independently 0, 1, 2, 3 or 4, and the sum of g and h is 0, 1, 2, 3 or 4; k and p are independently 0, 1, 2, 3 or 4, o is 1, 2, 3 or 4; and in formula (6), $R^9$ is hydrogen, fluorine, chlorine, alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; $R^{10}$ is a group represented by —OH, —$OR^0$, —$NH_2$, —$NHR^0$ or —$N(R^0)_2$, where $R^0$ is hydrogen or alkyl having 1 to 12 carbons; ring M and ring N are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^9$ is a single bond, —$CH_2CH_2$—, —CH=CH—, —C≡C—, —COO—, —OCO—, —$CF_2O$—, —$OCF_2$—, —$CH_2O$—, —$OCH_2$— or —CF=CF—; $Sp^4$ and $Sp^5$ are independently a single bond or alkylene having 1 to 7 carbons, and in the alkylene at least one —$CH_2$— may be replaced by —O—, —COO— or —OCO—, at least one —$CH_2CH_2$— may be replaced by —CH=CH—, and in these groups at least one hydrogen may be replaced by fluorine; and j is 0, 1, 2, 3 or 4.

Item 15.

The liquid crystal composition according to any one of items 1 to 14, wherein in formula (5) according to item 14, $R^8$ is a group represented by any one of formula (A1) to formula (A4):

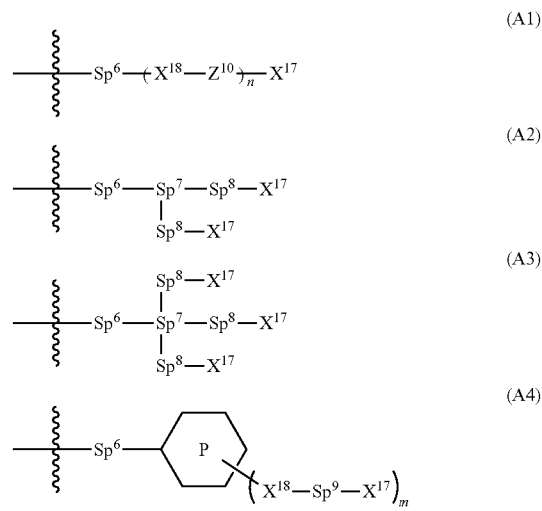

in formula (A1) to formula (A4), $Sp^6$, $Sp^8$ and $Sp^9$ are independently a single bond or alkylene having 1 to 12 carbons, and in the alkylene at least one —$CH_2$— may be replaced by —O—, —S—, —NH—, —$N(R^9)$—, —CO—, —CO—O—, —O—$CO_3$—O—CO—O—, —S—CO—, —CO—S—, —$N(R^0)$—CO—O—, —O—CO—$N(R^0)$—, —$N(R^0)$—CO—$N(R^0)$—CH=CH— or —C≡C—, and in these groups at least one hydrogen may be replaced by fluorine or chlorine, where $R^0$ is hydrogen or alkyl having 1 to 12 carbons; $Sp^7$ is >CH—, >$CR^0$—, >N— or >C<, where $R^0$ is hydrogen or alkyl having 1 to 12 carbons; $X^{17}$ is —OH, —$OR^0$, —COOH, —$NH_2$, —$NHR^0$, —$N(R^0)_2$, —SH, —$SR^0$

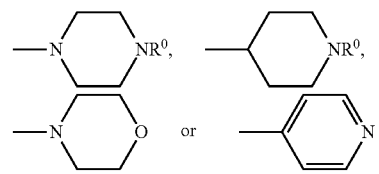

where $R^0$ is hydrogen or alkyl having 1 to 12 carbons; $X^{18}$ is —O—, —CO—, —NH—, —NR$^0$—S— or a single bond, where $R^0$ is hydrogen or alkyl having 1 to 12 carbons; $Z^{10}$ is a single bond or alkylene having 1 to 15 carbons, and in the alkylene at least one —CH$_2$— may be replaced by —C≡C—, —CH=CH—, —COO—, —OCO—, —CO— or —O—, and in these groups at least one hydrogen may be replaced by fluorine or chlorine; Ring P is aryl having 6 to 25 carbons, and in the aryl one to three hydrogens may be replaced by —OH, —(CH$_2$)$_q$—OH, fluorine, chlorine, alkyl having 1 to 5 carbons or alkyl having 1 to 5 carbons in which at least one hydrogen has been replaced by fluorine or chlorine, where q is 1, 2, 3 or 4; n is 0, 1, 2 or 3; and m is 1, 2, 3, 4 or 5.

Item 16.

The liquid crystal composition according to item 14, wherein formula (5) according to item 14, $P^1$, $P^2$ and $P^3$ are independently a polymerizable group selected from the group consisting of groups represented by formula (P-1) to formula (P-5):

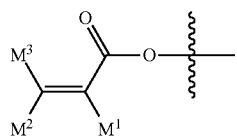

(P-1)

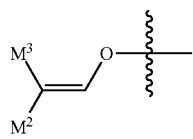

(P-2)

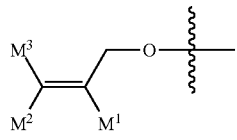

(P-3)

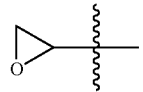

(P-4)

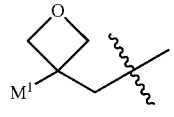

(P-5)

in formula (P-1) to formula (P-5), $N^1$, $M^2$ and $M^3$ are independently hydrogen, fluorine, alkyl having 1 to 5 carbons or alkyl having 1 to 5 carbons in which at least one hydrogen has been replaced by fluorine or chlorine.

Item 17.

The liquid crystal composition according to any one of items 1 to 16, wherein the first additive is at least one polar compound selected from the group consisting of compounds represented by formula (5-1) to formula (5-15):

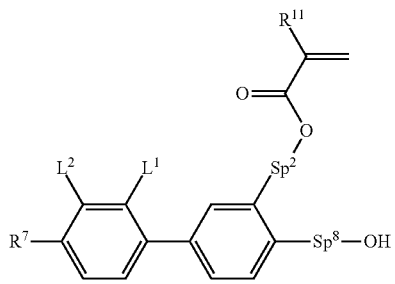

(5-1)

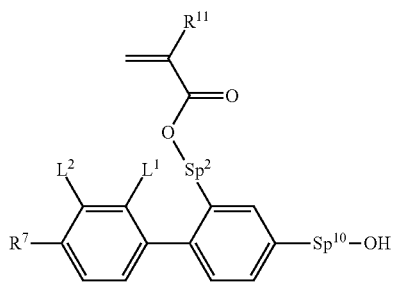

(5-2)

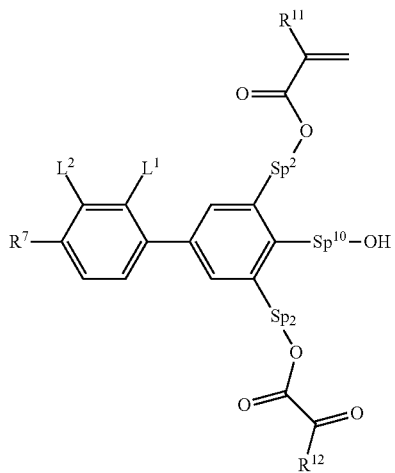

(5-3)

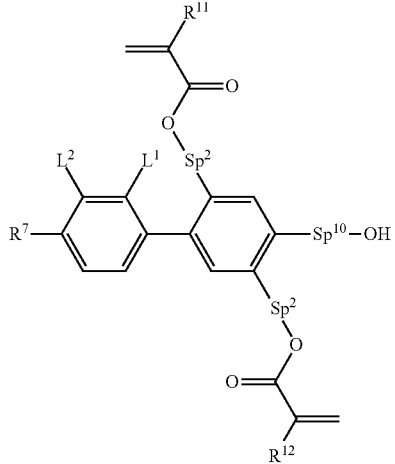

(5-4)

-continued
(5-5)
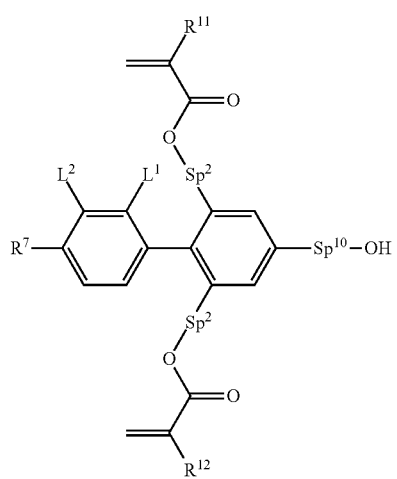
(5-6)
(5-7)
(5-8)
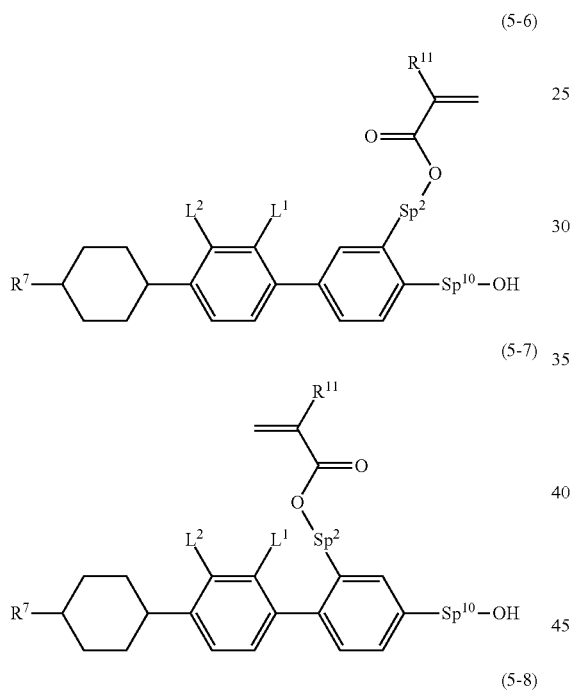
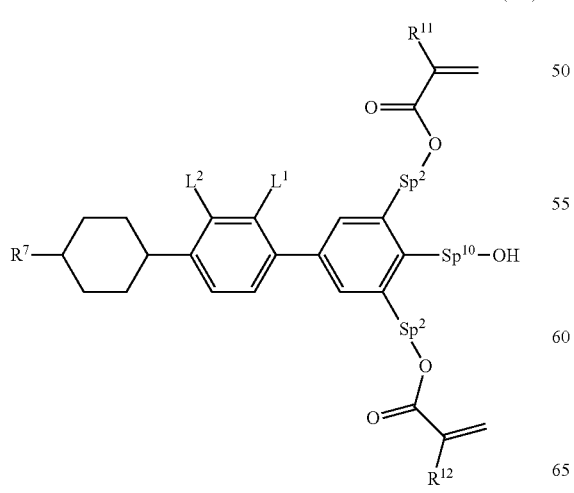
-continued
(5-9)
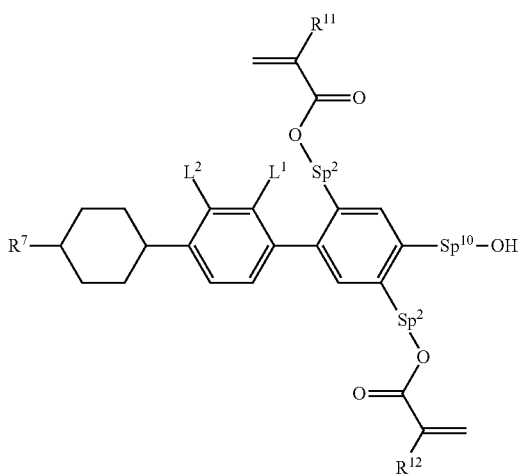
(5-10)
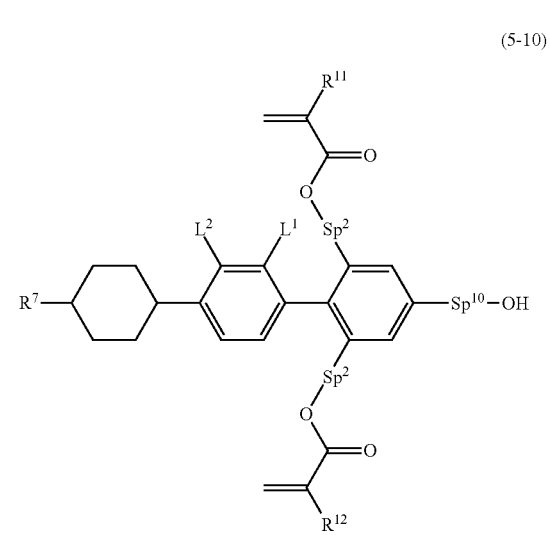
(5-11)
(5-12)
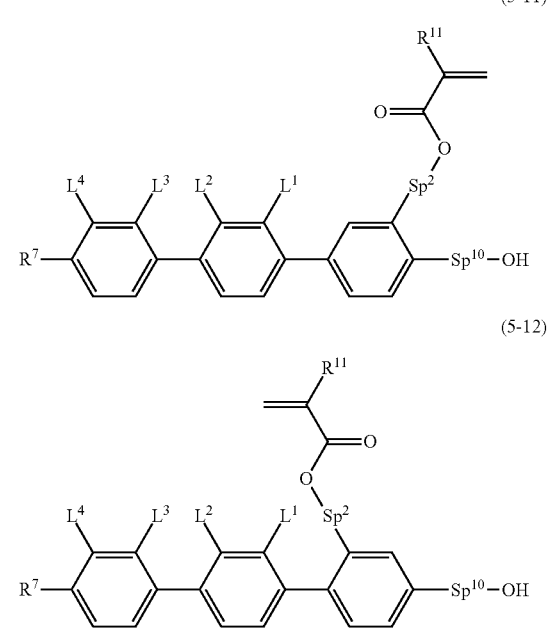

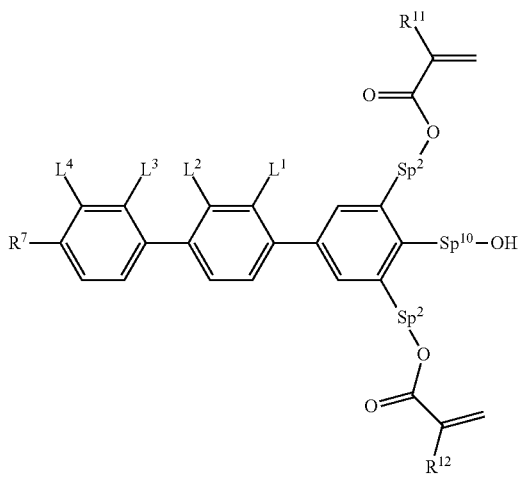

(5-13)

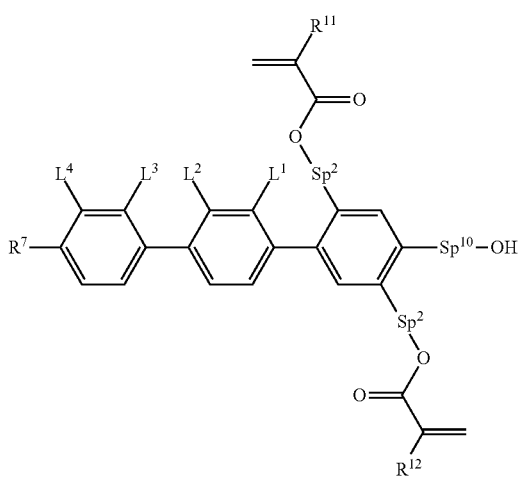

(5-14)

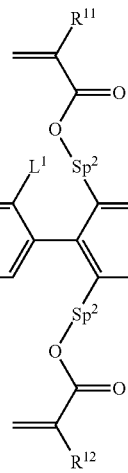

(5-15)

in formula (5-1) to formula (5-15), $R^7$ is hydrogen, fluorine, chlorine or alkyl having 1 to 25 carbons, and in the alkyl at least one —CH$_2$— may be replaced by —NR$^0$—, —O—, —S—, —CO—, —CO—O—, —O—CO—, —O—CO—O— or cycloalkylene having 3 to 8 carbons, at least one tertiary carbon (>CH—) may be replaced by nitrogen (>N—), and in these groups at least one hydrogen may be replaced by fluorine or chlorine, where $R^0$ is hydrogen or alkyl having 1 to 12 carbons; $Sp^2$ is a single bond or alkylene having 1 to 10 carbons, and in the alkylene at least one —CH$_2$— may be replaced by —O—, —COO—, —COO— or —OCOO—, and at least one —CH$_2$CH$_2$— may be replaced by —CH=CH— or —C≡C—, and in these groups at least one hydrogen may be replaced by fluorine or chlorine; $Sp^{10}$ is a single bond or alkylene having 1 to 10 carbons, and in the alkylene at least one —CH$_2$— may be replaced by —O—, —COO—, —OCO— or —OCOO—, and at least one —CH$_2$CH$_2$— may be replaced by —CH=CH— or —C≡C—, and in these groups at least one hydrogen may be replaced by fluorine or chlorine; $L^1$, $L^2$, $L^3$ and $L^4$ are independently hydrogen, fluorine, methyl or ethyl; and $R^{11}$ and $R^{12}$ are independently hydrogen or methyl.

Item 18.

The liquid crystal composition according to any one of items 1 to 17, wherein the first additive is at least one polar compound selected from the group consisting of compounds represented by formula (6-1) to formula (6-9):

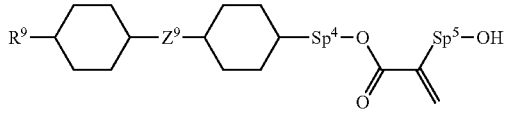

(6-1)

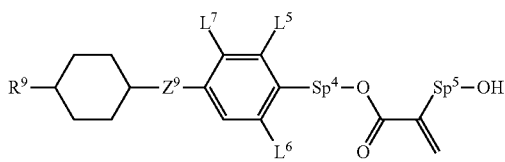

(6-2)

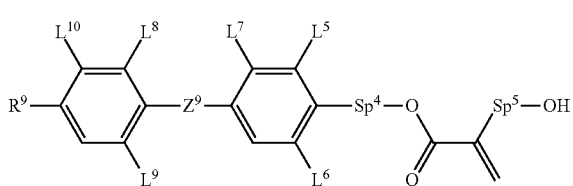

(6-3)

-continued

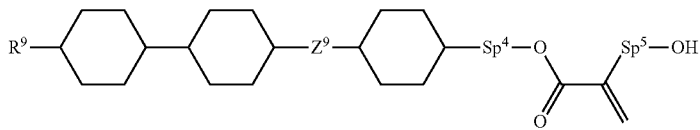
(6-4)

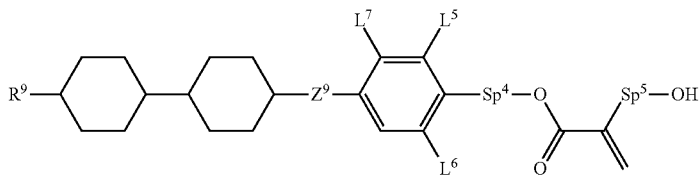
(6-5)

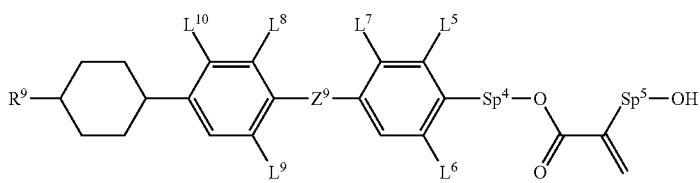
(6-6)

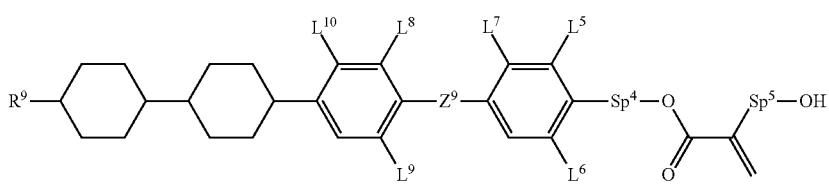
(6-7)

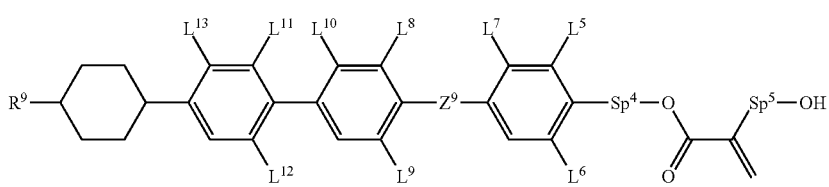
(6-8)

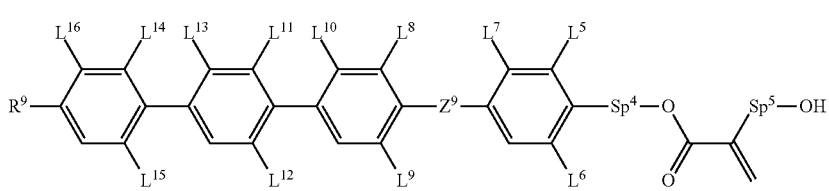
(6-9)

in formula (6-1) to formula (6-9), $R^9$ is hydrogen, fluorine, chlorine, alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; $Z^9$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; $Sp^4$ and $Sp^5$ are independently a single bond or alkylene having 1 to 7 carbons, and in the alkylene at least one —CH$_2$— may be replaced by —O—, —COO— or —OCO—, at least one —CH$_2$CH$_2$— may be replaced by —CH=CH—, and in these groups at least one hydrogen may be replaced by fluorine; and $L^5$, $L^6$, $L^7$, $L^8$, $L^9$, $L^{10}$, $L^{11}$, $L^{12}$, $L^{13}$, $L^{14}$, $L^{15}$ and $L^{16}$ are independently hydrogen, fluorine, methyl or ethyl.

Item 19.
The liquid crystal composition according to any one of items 1 to 18, wherein the proportion of the first additive is in the range of 0.05% by weight to 10% by weight based on the weight of the liquid crystal composition.

Item 20.
The liquid crystal composition according to any one of items 1 to 19, including at least one polymerizable compound selected from the group consisting of compounds represented by formula (7) as a second additive:

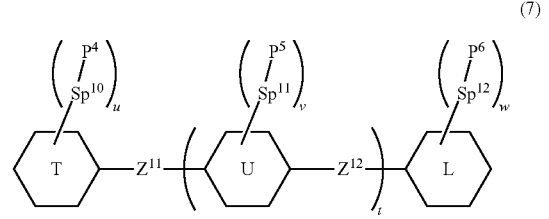
(7)

in formula (7), ring T and ring V are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring U is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^{11}$ and $Z^{12}$ are independently a single bond or alkylene having 1 to 10 carbons, and in the alkylene at least one —$CH_2$— may be replaced by —O—, —CO—, —COO— or —OCO—, and at least one —$CH_2CH_2$— may be replaced by —CH═CH—, —C(CH$_3$)═CH—, —CH═C(CH$_3$)— or —C(CH$_3$)═O(CH$_3$)—, and in these groups at least one hydrogen may be replaced by fluorine or chlorine; $P^4$, $P^5$ and $P^6$ is a polymerizable group; $Sp^{10}$, $Sp^{11}$ and $Sp^{12}$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH═CH— or —C≡C—, and in these groups at least one hydrogen may be replaced by fluorine or chlorine; t is 0, 1 or 2; and u, v and w are independently 0, 1, 2, 3 or 4, and the sum u, v and w is 1 or more.

Item 21.

The liquid crystal composition according to item 20, wherein formula (7) according to item 20, $P^4$, $P^5$ and $P^6$ are independently a polymerizable group selected from the group consisting of groups represented by formula (P-1) to formula (P-5):

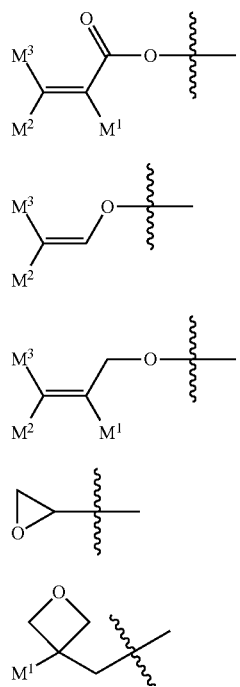

in formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine.

Item 22.

The liquid crystal composition according to any one of items 1 to 21, including at least one polymerizable compound selected from the group consisting of compounds represented by formula (7-1) to formula (7-28) as the second additive:

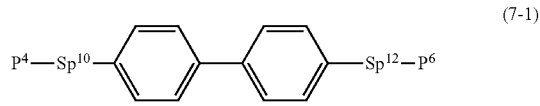

(7-1)

(7-2)

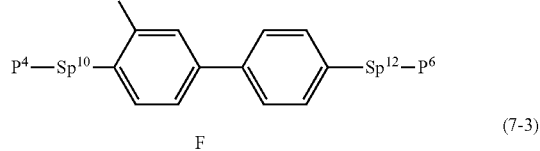

(7-3)

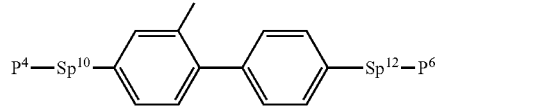

(7-4)

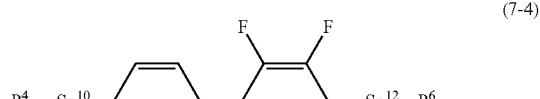

(7-5)

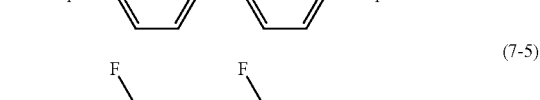

(7-6)

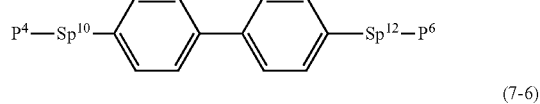

(7-7)

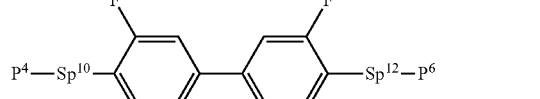

(7-8)

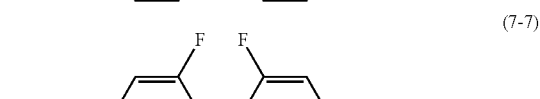

(7-9)

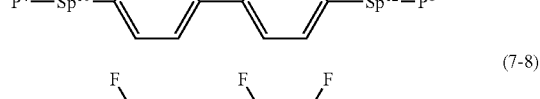

(7-10)

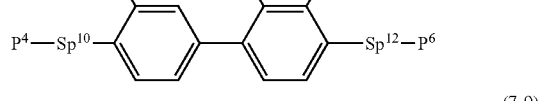

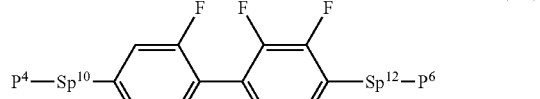

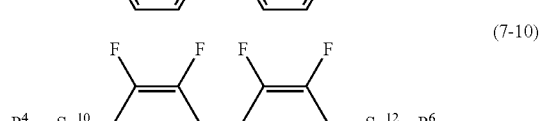

(7-11)
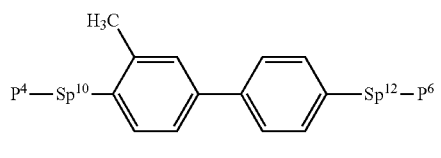
(7-12)
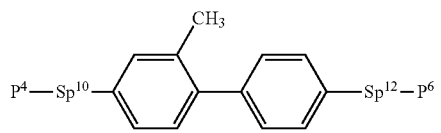
(7-13)
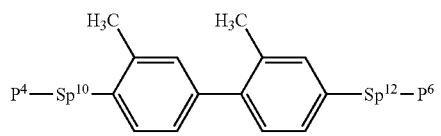
(7-14)
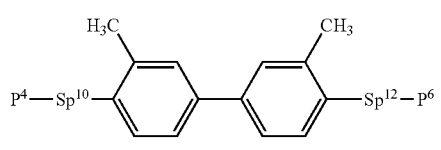
(7-15)
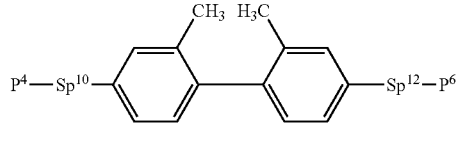
(7-16)
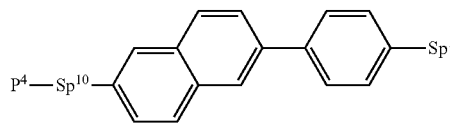
(7-17)
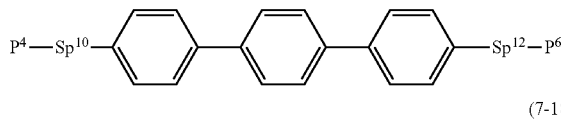
(7-18)
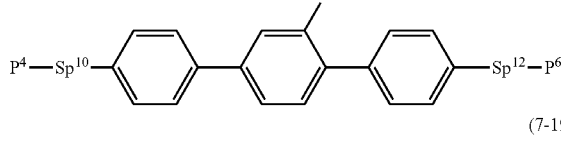
(7-19)
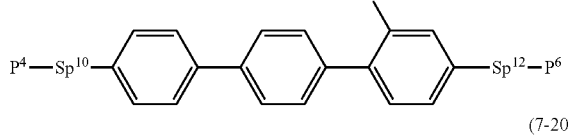
(7-20)
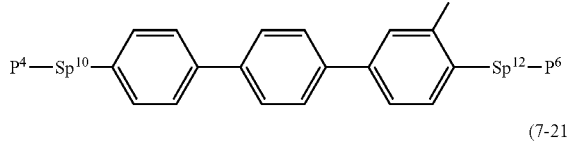
(7-21)
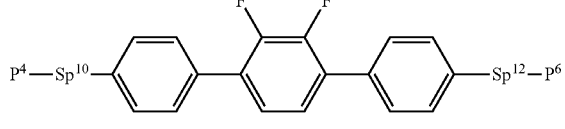
(7-22)
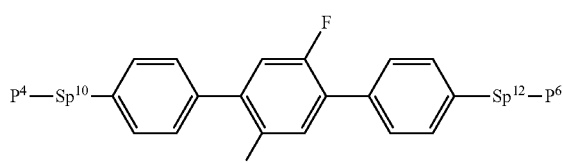
(7-23)
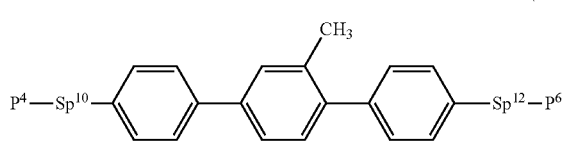
(7-24)
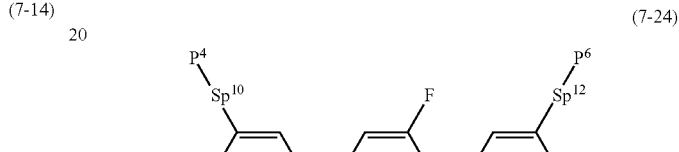
(7-25)
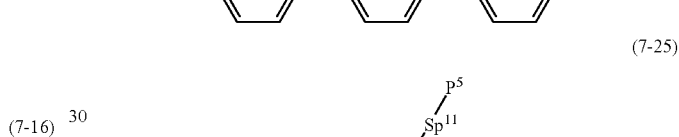
(7-26)
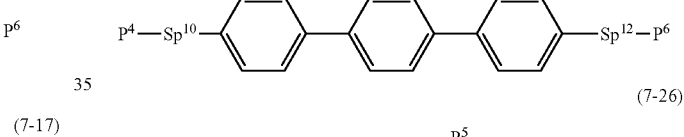
(7-27)
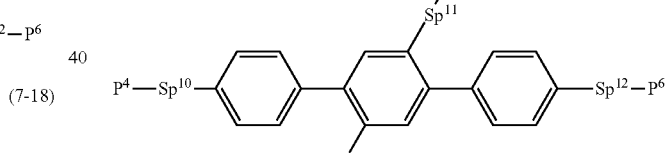
(7-28)
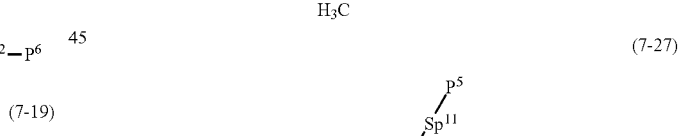
in formula (7-1) to formula (7-28), $P^4$, $P^5$ and $P^6$ are independently a polymerizable group selected from the group consisting of groups represented by formula (P-1) to formula (P-3):

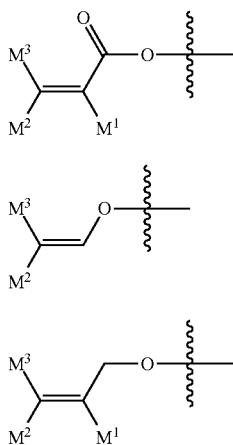

where $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and $Sp^{10}$, $Sp^{11}$ and $Sp^{12}$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine.

Item 23.

The liquid crystal composition according to any one of items 20 to 22, wherein the proportion of the second additive is in the range of 0.03% by weight to 10% by weight based on the weight of the liquid crystal composition.

Item 24.

A liquid crystal display device including the liquid crystal composition according to any one of items 1 to 23.

Item 25.

The liquid crystal display device according to item 24, wherein the operating mode of the liquid crystal display device is an IPS mode, a TN mode, an FFS mode or an FPA mode, and the driving mode of the liquid crystal display device is an active matrix mode.

Item 26.

A liquid crystal display device with a polymer sustained alignment type including a liquid crystal composition according to any one of items 1 to 23, where the polymerizable compound in the liquid crystal composition has been polymerized.

Item 27.

A liquid crystal display device without alignment films and including a liquid crystal composition according to any one of items 1 to 23, where the polymerizable compound in the liquid crystal composition has been polymerized.

Item 28.

Use of the liquid crystal composition according to any one of items 1 to 23 for the liquid crystal display device.

Item 29.

Use of the liquid crystal composition according to any one of items 1 to 23 for the liquid crystal display device with a polymer sustained alignment type.

Item 30.

Use of the liquid crystal composition according to any one of items 1 to 23 for the liquid crystal display device without alignment films.

The invention further includes the following items. (a) A method for producing the liquid crystal display device described above, wherein the liquid crystal composition described above is placed between the two substrates, and the composition is irradiated with light under the conditions of an applied voltage, and a polar compound having a polymerizable group included in the composition is polymerized. (b) The liquid crystal composition described above, wherein the maximum temperature of a nematic phase is 70° C. or higher, the optical anisotropy (measured at 25° C.) at a wavelength of 589 nanometers is 0.08 or more, and the dielectric anisotropy (measured at 25° C.) at a frequency of 1 kHz is 2 or more.

The invention further includes the following items. (c) The composition described above including at least two compounds selected from polar compound (5) and polar compound (6) described above. (d) The composition described above, further including a polar compound that is different from polar compound (5) and polar compound (6) described above. (e) The composition described above, including one, two or at least three of additives such as an optically active compound, an antioxidant, an ultraviolet light absorber, a coloring matter, an antifoaming agent, a polymerizable compound, a polymerization initiator, a polymerization inhibitor and a polar compound. (f) An AM device including the composition described above. (g) A device including the composition described above and having a mode of TN, ECB, OCB, IPS, FFS, VA or FPA. (h) A transmission-type device including the composition described above. (i) Use of the composition described above, as a composition having a nematic phase. (j) Use of the composition prepared by the addition of an optically active compound to the composition described above, as an optically active composition.

The composition of the invention will be explained in the following order: First, the structure of the composition will be explained. Second, the main characteristics of the component compounds and the main effects of these compounds on the composition will be explained. Third, a combination of the components in the composition, a desirable proportion of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the structure of the composition will be explained. The compositions of the invention are classified into composition A and composition B. Composition A may further include any other liquid crystal compound, an additive and so forth, in addition to liquid crystal compounds selected from compound (1), compound (2), compound (3) and compound (4). "Any other liquid crystal compound" is a liquid crystal compound that is different from compound (1) to compound (4). This kind of compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator, a polymerization inhibitor and a polar compound.

Composition B consists essentially of liquid crystal compounds selected from compound (1) to compound (4). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the composition will be explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is close to zero.

TABLE 2

Characteristics of Compounds

| Characteristics | Compound (1) | Compound (2) | Compound (3) | Compound (4) |
|---|---|---|---|---|
| Maximum Temperature | S-L | S-L | S-L | S-L |
| Viscosity | M-L | S-M | M-L | M |
| Optical Anisotropy | M-L | S-L | M-L | M-L |
| Dielectric Anisotropy | S-L[1)] | 0 | S-M[1)] | M-L[2)] |
| Specific Resistance | L | L | L | L |

[1)]The value of the dielectric anisotropy is positive, and the symbol shows the magnitude of the absolute value.
[2)]The value of the dielectric anisotropy is negative, and the symbol shows the magnitude of the absolute value.

The main effects of the component compounds on the characteristics of the composition upon mixing the component compounds with the composition are as follows. Compound (1) increases the dielectric anisotropy. Compound (2) increases the maximum temperature or decreases the viscosity. Compound (3) increases the dielectric anisotropy and decreases the minimum temperature. Compound (4) increases the dielectric constant in the minor axis direction. Compound (5) or compound (6) is absorbed on the substrate surface by the action of the polar group, and adjusts the alignment of liquid crystal molecules. It is essential that compound (5) or compound (6) should have a high compatibility with liquid crystal compounds in order to achieve the desired effect. Compound (5) or compound (6) is optimum for this purpose, since it has a six-membered ring such as 1,4-cyclohexylene or 1,4-phenylene, and its molecular structure is rod-like. Compound (5), compound (6) or compound (7) give a polymer by polymerization. This polymer decreases the response time of the device, and improves image burn-in, since it stabilizes the alignment of liquid crystal molecules. Compound (5) or compound (6) is effective in view of adjust the alignment of liquid crystal molecules. The polymer of compound (7) is also effective. Combinations of compound (5) and compound (7) or compound (6) and compound (7) are more effective. A synergistic effect can be expected by the combination. Better long-term stability can be expected by the combination in comparison with compound (5) alone or compound (6) alone.

Third, a combination of the components in the composition, a desirable proportion of the components and its basis will be explained. A combination of the components in the composition is compound (1) plus compound (2), compound (1) plus compound (2) plus compound (3) or compound (1) plus compound (2) plus compound (3) plus compound (4). A desirable combination of the components is compound (1) plus compound (2) plus compound (3) or compound (1) plus compound (2) plus compound (3) plus compound (4). A more desirable combination of the components is compound (1) plus compound (2) plus compound (3). Compound (4) is added when the elastic constant of the composition is adjusted and the voltage-transmission curve of the device is adjusted.

A desirable proportion of compound (1) is approximately 5% by weight or more for increasing the dielectric anisotropy and approximately 55% by weight or less for decreasing the minimum temperature or decreasing the viscosity. A more desirable proportion is in the range of approximately 5% by weight to approximately 45% by weight. An especially desirable proportion is in the range of approximately 10% by weight to approximately 35% by weight.

A desirable proportion of compound (2) is approximately 10% by weight or more for increasing the maximum temperature or for decreasing the viscosity and approximately 70% by weight or less for increasing the dielectric anisotropy. A more desirable proportion is in the range of approximately 15% by weight to approximately 65% by weight. An especially desirable proportion is in the range of approximately 20% by weight to approximately 60% by weight.

A desirable proportion of compound (3) is approximately 5% by weight or more for increasing the dielectric anisotropy and approximately 50% by weight or less for decreasing the minimum temperature. A more desirable proportion is in the range of approximately 5% by weight to approximately 40% by weight. An especially desirable proportion is in the range of approximately 5% by weight to approximately 30% by weight.

A desirable proportion of compound (4) is approximately 3% by weight or more for increasing the dielectric anisotropy in the minor axis direction and approximately 40% by weight or less for decreasing the minimum temperature. A more desirable proportion is in the range of approximately 5% by weight to approximately 35% by weight. An especially desirable proportion is in the range of approximately 10% by weight to approximately 35% by weight.

Compound (5) or compound (6) is added to the composition for the purpose of adjusting the alignment of liquid crystal molecules. A desirable proportion of compound (5) or compound (6) is approximately 0.05% by weight or more for aligning liquid crystal molecules and approximately 10% by weight or less for preventing a poor display of the device. A more desirable proportion is in the range of approximately 0.1% by weight to approximately 7% by weight. An especially desirable proportion is in the range of approximately 0.5% by weight to approximately 5% by weight.

Compound (7) is added to the composition for the purpose of adjusting to the device with a polymer sustained alignment type. A desirable proportion of compound (7) is approximately 0.03% by weight or more for improving the long-term reliability of the device and approximately 10% by weight or less for preventing a poor display of the device. A more desirable proportion is in the range of approximately 0.1% by weight to approximately 2% by weight. An especially desirable proportion is in the range of approximately 0.2% by weight to approximately 1.0% by weight.

Fourth, a desirable embodiment of the component compounds will be explained. In formula (1), formula (2), formula (3) and formula (4), $R^1$ is alkyl having 1 to 12 carbons, alkoxy having 1 to 12 carbons or alkenyl having 2 to 12 carbons. Desirable $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine. Desirable $R^2$ or $R^3$ is alkyl having 1 to 12 carbons for increasing the stability to ultraviolet light or heat, and alkenyl having 2 to 12 carbons for decreasing the minimum temperature or decreasing the viscosity.

$R^4$ is alkyl having 1 to 12 carbons, alkoxy having 1 to 12 carbons or alkenyl having 2 to 12 carbons. Desirable $R^4$ is alkyl having 1 to 12 carbons for increasing the stability to ultraviolet light or heat. $R^5$ and $R^6$ are independently alkyl having 1 to 12 carbons, alkoxy having 1 to 12 carbons, alkenyl having 2 to 12 carbons or alkenyloxy having 2 to 12 carbons. Desirable $R^2$ or $R^3$ is alkyl having 1 to 12 carbons for increasing the stability to ultraviolet light or heat and alkoxy having 1 to 12 carbons for increasing the dielectric anisotropy.

Desirable alkyl is methyl, ethyl, propyl, butyl, plenty, hexyl, hefty or octyl. More desirable alkyl is methyl, ethyl, propyl, butyl or pentyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity, for instance. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkyl in which at least one hydrogen has been replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Ring A and ring B are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Desirable ring A or ring B is 1,4-phenylene, 2-fluoro-1,4-phenylene or 2,6-difluoro-1,4-phenylene for increasing the optical anisotropy. Ring C and ring D are independently 1,4-cyclohexylene, 1,4-phenylene, 2-fluoro-1,4-phenylene or 2,5-difluoro-1,4-phenylene. Desirable ring C or ring D is 1,4-cyclohexylene for decreasing the viscosity and 1,4-phenylene for increasing the optical anisotropy. Ring E is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Desirable ring E is 1,4-phenylene or 2-fluoro-1,4-phenylene for increasing the optical anisotropy.

Ring F and ring I are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl. Desirable ring F or ring I is 1,4-cyclohexylene for decreasing the viscosity and tetrahydropyran-2,5-diyl for increasing the dielectric anisotropy and 1,4-phenylene for increasing the optical anisotropy. Ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochromane-2,6-diyl. Desirable ring G is 2,3-difluoro-1,4-phenylene for increasing the dielectric anisotropy. With regard to the configuration of 1,4-cyclohexylene, trans is preferable to cis for increasing the maximum temperature. Tetrahydropyran-2,5-diyl is

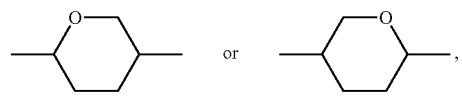

and preferably

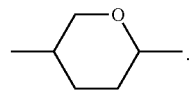

.

$Z^1$ and $Z^2$ are independently a single bond, —CH$_2$CH$_2$—, —CH=CH—, —CH$_2$O—, —OCH$_2$—, —COO—, —OCO—, —CF$_2$O— or —OCF$_2$—. Desirable $Z^1$ or $Z^2$ is a single bond for decreasing the viscosity. $Z^3$ is a single bond, —CH$_2$CH$_2$—, —CH$_2$O—, —OCH$_2$—, —COO— or —OCO—. Desirable $Z^3$ is a single bond for decreasing the viscosity. $Z^4$ is a single bond, —CH$_2$CH$_2$—, —COO— or —OCO—. Desirable $Z^4$ is a single bond for decreasing the viscosity. $Z^5$ and $Z^6$ are independently a single bond, —CH$_2$CH$_2$—, —CH$_2$O—, —OCH$_2$—, —COO— or —OCO—. Desirable $Z^5$ or $Z^6$ is a single bond for decreasing the viscosity and —CH$_2$O— or —OCH$_2$— for increasing the dielectric anisotropy.

$X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$ and $X^{16}$ are independently hydrogen or fluorine. Desirable $X^1$ to $X^{15}$ or $X^{16}$ is fluorine for increasing the dielectric anisotropy.

$Y^1$ and $Y^2$ are independently fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine. Desirable $Y^1$ or $Y^2$ is fluorine for decreasing the minimum temperature. A desirable example of alkyl in which at least one hydrogen has been replaced by fluorine or chlorine is trifluoromethyl. A desirable example of alkoxy in which at least one hydrogen has been replaced by fluorine or chlorine is trifluoromethoxy. A desirable example of alkenyloxy in which at least one hydrogen has been replaced by fluorine or chlorine is trifluorovinyloxy.

a is 1, 2, 3 or 4, b is 0, 1, 2 or 3, and the sum of a and b is 4 or less. Desirable a is 2 or 3 for increasing the dielectric anisotropy. Desirable b is 0 or 1 for decreasing the minimum temperature. c is 1, 2 or 3. Desirable c is 1 for decreasing the viscosity and is 2 for decreasing the minimum temperature. d is 1, 2, 3 or 4. Desirable d is 2 or 3 for increasing the dielectric anisotropy. e is 1, 2 or 3, f is 0 or 1, and the sum of e and f is 3 or less. Desirable e is 1 for decreasing the viscosity and is 2 or 3 for increasing the maximum temperature. Desirable f is 0 for decreasing the viscosity and is 1 for decreasing the minimum temperature.

In formula (5), $R^8$ is a polar group. In formula (6), $R^{10}$ is a polar group. It is desirable that compound (5) or compound (6) should be stable since it is added to the composition. It is desirable that compound (5) or compound (6) should not decrease the voltage holding ratio of the device when the compound is added to the composition. It is desirable that compound (5) or compound (6) should have a low volatility. Desirable molar mass is 130 g/mol or more. More desirable molar mass is in the range of 150 g/mol to 500 g/mol. A desirable compound (5) or compound (6) has a polymerizable group such as acryloyloxy (—OCO—CH=CH$_2$) and methacryloyloxy (—OCO—(CH$_3$) C=CH$_2$).

A suitable polar group has a noncovalent interaction with the surface of a glass substrate or a metal oxide film. A desirable polar group has a heteroatom selected from the group consisting of nitrogen, oxygen, sulfur and phosphorus. A desirable polar group has at least one or at least two of these heteroatoms. A more desirable polar group is a monovalent group derived by excluding hydrogen from a compound selected from the group consisting of alcohols, primary, secondary and tertiary amines, ketones, carboxylic acids, thiols, esters, ethers, thioethers, and any combination of these. The structure of these groups may be straight-chain, branched-chain, cyclic, or any combination of these. An especially desirable polar group has at least one oxygen of a OH moiety or a nitrogen atom of primary, secondary or tertiary amine moiety.

Examples of polar group $R^8$ include groups represented by formula (A1) to formula (A4).

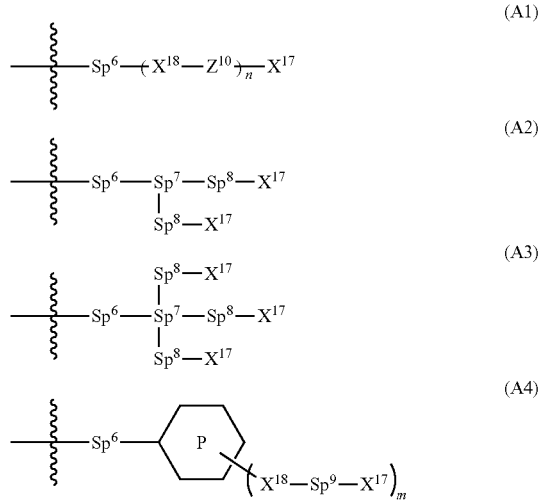

In formula (A1) to formula (A4), $Sp^6$, $Sp^8$ and $Sp^9$ are independently a single bond or alkylene having 1 to 12 carbons, and in the alkylene at least one —CH$_2$— may be replaced by —O—, —S—, —NH—, —N(R$^0$)—, —CO—, —CO—O—, —O—CO, —O—CO—O—, —S—CO—, —CO—S—, —N(R$^0$)—CO—O—, —O—CO—N(R$^0$)—, —N(R$^0$)—CO—N(R$^0$)—, —CH=CH— or —C≡C—, and in these groups at least one hydrogen may be replaced by fluorine or chlorine, where R$^0$ is hydrogen or alkyl having 1 to 12 carbons. $Sp^7$ is >CH—, >CR$^0$—, >N— or >C<, where $R^0$ is hydrogen or alkyl having 1 to 12 carbons. That is to say, it means that Sp$^7$ in formula (A2) is >CH—, >CR$^0$— or >N—, and Sp$^7$ in formula (A3) is >C<.

Desirable $Sp^6$, $Sp^8$ or $Sp^9$ is a single bond, —(CH$_2$)$_{p1}$—, —(CH$_2$)$_{p1}$—O—, —(CH$_2$CH$_2$O)$_{q1}$—CH$_2$CH$_2$—, —(CH$_2$)$_{p1}$—O—CO—, —(CH$_2$)$_{p1}$—O—CO—O—, —CH$_2$CH$_2$—S—CH$_2$CH$_2$— or —CH$_2$CH$_2$—NHCH$_2$CH$_2$—, where p1 is an integer from 1 to 12, q1 is an integer from 1 to 3. More desirable $Sp^6$, $Sp^8$ or $Sp^9$ is ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In formula (A1) to formula (A4), $X^{17}$ is —OH, —OR$^0$, —COOH, —NH$_2$, —NHR$^0$, —N(R$^0$)$_2$, —SH, —SR$^0$,

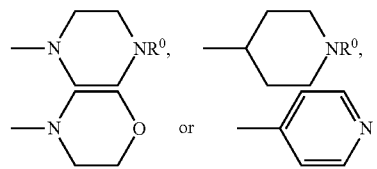

where R$^0$ is hydrogen or alkyl having 1 to 12 carbons.

In formula (A1), $X^{18}$ is —O—, —CO—, —NH—, —NR$^0$—S— or a single bond, where R$^0$ is hydrogen or alkyl having 1 to 12 carbons. $Z^{10}$ is a single bond or alkylene having 1 to 15 carbons, and in the alkylene at least one —CH$_2$— may be replaced by —C≡C—, —CH=CH—, —COO—, —OCO—, —CO— or —O—, and in these groups at least one hydrogen may be replaced by fluorine or chlorine. Ring P is aryl having 6 to 25 carbons, and in the group one to three hydrogens may be replaced by —OH, —(CH$_2$)$_q$—OH, fluorine, chlorine, alkyl having 1 to 5 carbons or alkyl having 1 to 5 carbons in which at least one hydrogen has been replaced by fluorine or chlorine, where q is 1, 2, 3 or 4. n is 0, 1, 2 or 3, and m is 1, 2, 3, 4 or 5.

Aryl is a monovalent group derived by excluding one hydrogen from an aromatic hydrocarbon and does not include a heteroatom. Aryl may be a single ring or a plurality of rings. That is to say, aryl has at least one ring, and the ring may be condensed (for example, naphthyl), and two rings may be connected with a covalent bond (for example, biphenyl), or may have a combination of the condensed ring and connected rings. Aryl may be substituted. Examples of the substituent are —OH, —(CH$_2$)$_q$—OH, fluorine, chlorine, alkyl having 1 to 5 carbons or alkyl having 1 to 5 carbons in which at least one hydrogen has been replaced by fluorine or chlorine, where q is 1, 2, 3 or 4.

Desirable aryl includes a monovalent group derived by excluding one hydrogen from benzene, biphenyl, terphenyl, [1,1:3',1"]terphenyl, naphthalene, anthracene, binaphthyl, phenanthrene, pyrene, dihydropyrene, chrycene, perylene, tetracene, pentacene, benzopyrene, fluorene, indene, indenofluorene or spirobifluorene.

In formula (5), $R^8$ is a polar group having at least one of an oxygen atom of a OH moiety, a sulfur atom of an SH moiety and a nitrogen atom of primary, secondary or tertiary amine moiety. Desirable $R^8$ is —OH, —(CH$_2$)$_n$—OH, —O—(CH$_2$)$_n$—OH, —[O—(CH$_2$)$_{n1}$]$_{n2}$—OH, —COOH, —(CH$_2$)$_n$—COOH, —O—(CH$_2$)$_n$—COOH or —[O—(CH$_2$)$_{n1}$]$_{n2}$—COOH, where n, n1 and n2 are independently an integer from 1 to 12, and preferably 1, 2, 3 or 4.

Desirable $R^8$ is also —$NH_2$, —NH—$(CH_2)_{n3}$H, —$(CH_2)_n$—$NH_2$, —$(CH_2)_n$—NH—$(CH_2)_{n3}$H, —NH—$(CH_2)_{n1}$—$NH_2$, —NH—$(CH_2)_n$—NH—$(CH_2)_{n3}$H, —$(CH_2)_{n1}$—NH—$(CH_2)_{n2}$—$NH_2$, —$(CH_2)_{n1}$—NH—$(CH_2)_{n2}$—NH—$(CH_2)_{n3}$H, —O—$(CH_2)_n$—$NH_2$, —$(CH_2)_{n1}$—O—$(CH_2)_n$—$NH_2$, —$(CH_2)_{n1}$—NH—$(CH_2)_{n2}$—OH, —O—$(CH_2)_{n1}$—NH—$(CH_2)_{n2}$—$NH_2$, —O—$(CH_2)_{n1}$—NH—$(CH_2)_{n2}$—OH or —$(CH_2)_{n1}$—NH—$(CH_2)_{n2}$—NH—$(CH_2)_{n3}$H, where n, n1, n2 and n3 are independently an integer from 1 to 12, and preferably 1, 2, 3 or 4.

It is especially desirable that $R^8$ should be —OH or —$NH_2$ in view of a high solubility in a liquid crystal composition. —OH is preferable to —O—, —CO— or —COO—, since it has a high anchor force. A group having a plurality of heteroatoms (nitrogen, oxygen) is especially desirable. A compound having such a polar group is effective even at low concentrations.

In formula (5) $R^7$ is hydrogen, fluorine, chlorine or alkyl having 1 to 25 carbons, and in the alkyl at least one —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—) and in these groups at least one hydrogen may be replaced by fluorine or chlorine, where $R^0$ is hydrogen or alkyl having 1 to 12 carbons. Desirable $R^7$ is alkyl having 1 to 25 carbons.

In formula (5), $P^1$, $P^2$ and $P^3$ are independently a polymerizable group. Desirable $P^1$, $P^2$ or $P^3$ is a polymerizable group selected from the group consisting of groups represented by formula (P-1) to formula (P-5). More desirable $P^1$, $P^2$ or $P^3$ is a group represented by formula (P-1), formula (P-2) or formula (P-3). Especially desirable $P^1$, $P^2$ or $P^3$ is a group represented by formula (P-1) or formula (P-2). The most desirable $P^1$, $P^2$ or $P^3$ is a group represented by formula (P-1). A desirable group represented by formula (P-1) is —OCO—CH=$CH_2$ or —OCO—C($CH_3$)=$CH_2$. A wavy line in formula (P-1) to formula (P-5) shows a binding site.

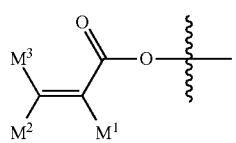

(P-1)

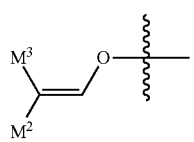

(P-2)

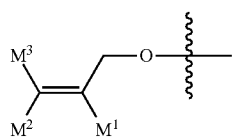

(P-3)

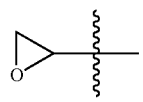

(P-4)

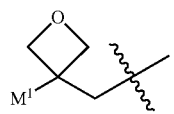

(P-5)

In formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine. Desirable $M^1$, $M^2$ or $M^3$ is hydrogen or methyl for increasing the reactivity. More desirable $M^1$ is hydrogen or methyl, and more desirable $M^2$ or $M^3$ is hydrogen.

In formula (5), $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine. Desirable $Sp^1$, $Sp^2$ or $Sp^3$ is a single bond, —$CH_2CH_2$—, —$CH_2O$—, —$OCH_2$—, —COO—, —OCO—, —CO—CH=CH— or —CH=CH—CO—. More desirable $Sp^1$, $Sp^2$ or $Sp^3$ is a single bond, with the proviso that $Sp^1$ and $Sp^3$ is a single bond when ring J and ring L and phenyl.

In formula (5), ring J, ring K and ring L are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring J, ring K or ring L is 1,4-phenylene or 2-fluoro-1,4-phenylene.

In formula (5), $Z^7$ and $Z^8$ are independently a single bond or alkylene having 1 to 10 carbons, and in the alkylene at least one —$CH_2$— may be replaced by —O—, —CO—, —COO— or —OCO—, and at least one —$CH_2CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine. Desirable $Z^7$ or $Z^8$ is a single bond, —$CH_2CH_2$—, —$CH_2O$—, —$OCH_2$—, —COO— or —OCO—. More desirable $Z^7$ or $Z^8$ is a single bond.

In formula (5), g and h are independently 0, 1, 2, 3 or 4, and the sum of g and h is 0, 1, 2, 3 or 4. Desirable g or h is 0, 1 or 2. k and p are independently 0, 1, 2, 3 or 4. Desirable k or p is 1 or 2. o is 1, 2, 3 or 4. Desirable o is 1 or 2.

In formula (5-1) to formula (5-15), $Sp^{10}$ is a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine. L, $L^2$, $L^3$ and $L^4$ are independently hydrogen, fluorine, methyl or ethyl. $R^{11}$ and $R^{12}$ are independently hydrogen or methyl.

In formula (6), $R^{10}$ is a group represented by —OH, —$OR^0$, —$NH_2$, —$NHR^0$ or —N($R^0$)$_2$, where $R^0$ is hydrogen or alkyl having 1 to 12 carbons. It is especially desirable that $R^2$ should be —OH or —$NH_2$ in view of a high solubility in a liquid crystal composition. —OH is preferable to —O—, —CO— or —COO—, since it has a high anchor force. A group having a plurality of heteroatoms (nitrogen, oxygen) is especially desirable. A polar compound having such a polar group is effective even at low concentrations.

In formula (6), $R^9$ is hydrogen, fluorine, chlorine, alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine. Desirable $R^9$ is alkyl having 1 to 12 carbons.

In formula (6), ring M and ring N are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring M or ring N is 1,4-cyclohexylene, 1,4-phenylene or 2-fluoro-1,4-phenylene.

In formula (6), $Z^9$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—. Desirable $Z^9$ is a single bond, —CH$_2$CH$_2$—, —CH$_2$O—, —OCH$_2$—, —COO— or —OCO—. More desirable $Z^9$ is a single bond.

In formula (6), $Sp^4$ and $Sp^5$ are independently a single bond or alkylene having 1 to 7 carbons, and in the alkylene at least one —CH$_2$— may be replaced by —O—, —COO— or —OCO—, at least one —CH$_2$CH$_2$— may be replaced by —CH=CH—, and in these groups at least one hydrogen may be replaced by fluorine. Desirable $Sp^4$ or $Sp^5$ is a single bond.

In formula (6), j is 0, 1, 2, 3 or 4. Desirable j is 0, 1 or 2.

In formula (6-1) to formula (6-9), $L^5$, $L^6$, $L^7$, $L^8$, $L^9$, $L^{10}$, $L^{11}$, $L^{12}$, $L^{13}$, $L^{14}$, $L^{15}$ and $L^{16}$ are independently hydrogen, fluorine, methyl or ethyl. Desirable $L^5$ to $L^{16}$ is hydrogen or fluorine.

In formula (7), $P^4$, $P^5$ and $P^6$ are independently a polymerizable group. Desirable $P^4$, $P^5$ or $P^6$ is a polymerizable group selected from the group consisting of groups represented by formula (P-1) to formula (P-5). More desirable $P^4$, $P^5$ or $P^6$ is a group represented by formula (P-1), formula (P-2) or formula (P-3). Especially desirable $P^4$, $P^5$ or $P^6$ is a group represented by formula (P-1) or formula (P-2). The most desirable $P^4$, $P^5$ or $P^6$ is a group represented by formula (P-1). A desirable group represented by formula (P-1) is —OCO—CH=CH$_2$ or —OCO—C(CH$_3$)=CH$_2$. A wavy line in formula (P-1) to formula (P-5) shows a binding site.

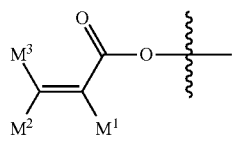

(P-1)

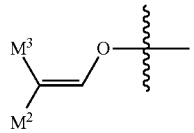

(P-2)

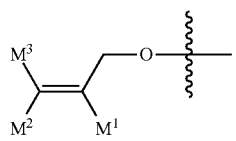

(P-3)

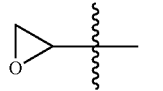

(P-4)

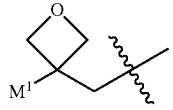

(P-5)

In formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine. Desirable $M^1$, $M^2$ or $M^3$ is hydrogen or methyl for increasing the reactivity. More desirable $M^1$ is hydrogen or methyl, and more desirable $M^2$ or $M^3$ is hydrogen.

In formula (7), $Sp^{10}$, $Sp^{11}$ and $Sp^{12}$ are independently a single bond or alkylene having 1 to 10 carbons, and in the alkylene at least one —CH$_2$— may be replaced by —O—, —COO—, —OCO— or —OCOO—, and at least one —CH$_2$CH$_2$— may be replaced by —CH=CH— or —C≡C—, and in these groups at least one hydrogen may be replaced by fluorine or chlorine.

Desirable $Sp^{10}$, Sp or $Sp^{12}$ is a single bond, —CH$_2$CH$_2$—, —CH$_2$O—, —OCH$_2$—, —COO—, —OCO—, —CO—CH=CH— or —CH=CH—CO—. More desirable $Sp^{10}$, $Sp^{11}$ or $Sp^{12}$ is a single bond.

In formula (7), ring T and ring V are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring T or ring V is phenyl. Ring U is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring U is 1,4-phenylene or 2-fluoro-1,4-phenylene.

In formula (7), $Z^{11}$ and $Z^{12}$ are independently a single bond or alkylene having 1 to 10 carbons, and in the alkylene at least one —CH$_2$— may be replaced by —O—, —CO—, —COO— or —OCO—, and at least one —CH$_2$CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine. Desirable $Z^{11}$ or $Z^{12}$ is a single bond, —CH$_2$CH$_2$—, —CH$_2$O—, —OCH$_2$—, —COO— or —OCO—. More desirable $Z^{11}$ or $Z^{12}$ is a single bond.

In formula (7), t is 0, 1 or 2. Desirable t is 0 or 1. u, v and w are independently 0, 1, 2, 3 or 4, and the sum of u, v and w is 1 or more. Desirable u, v or w is 1 or 2.

Fifth, desirable component compounds will be shown. Desirable compound (1) is compound (1-1) to compound (1-14) according to item 2. It is desirable that in these compounds, at least one of the first component should be compound (1-3), compound (1-4), compound (1-7), compound (1-9), compound (1-10) or compound (1-12). It is desirable that at least two of the first component should be a combination of compound (1-3) and compound (1-4), compound (1-3) and compound (1-7), compound (1-3) and compound (1-10), compound (1-7) and compound (1-10) or compound (1-9) and compound (1-10).

Desirable compound (2) is compound (2-1) to compound (2-13) according to item 5. It is desirable that at least two of the second component should be a combination of compound (2-1), compound (2-3), compound (2-5), compound (2-6), compound (2-8) or compound (2-13). It is desirable that at least two of the second component should be a combination of compound (2-1) and compound (2-3), compound (2-1) and compound (2-5), compound (2-1) and compound (2-8) or compound (2-3) and compound (2-5).

Desirable compound (3) is compound (3-1) to compound (3-16) according to item 8. It is desirable that in these compounds, at least one of the third component should be compound (3-4), compound (3-8), compound (3-9), compound (3-11), compound (3-12), compound (3-13) or compound (3-16). It is desirable that at least two of the third component should be a combination of compound (3-9) and compound (3-12), compound (3-11) and compound (3-12), compound (3-12) and compound (3-13) or compound (3-12) and compound (3-16).

Desirable compound (4) is compound (4-1) to compound (4-22) according to item 11. It is desirable that in these compounds, at least one of the fourth component should be compound (4-1), compound (4-3), compound (4-4), compound (4-6), compound (4-8) or compound (4-10). It is desirable that at least two of the fourth component should be a combination of compound (4-1) and compound (4-6), compound (4-1) and compound (4-10), compound (4-3) and compound (4-8), compound (4-4) and compound (4-6), compound (4-4) and compound (4-8) or compound (4-4) and compound (4-10).

Desirable compound (5) is compound (5-1) to compound (5-15) according to item 17. It is desirable that in these compounds, at least one of the first additive should be compound (5-6), compound (5-8), compound (5-10), compound (5-11), compound (5-13) or compound (5-15). It is desirable that at least two of the first additive should be a combination of compound (5-1) and compound (5-11) or compound (5-3) and compound (5-8).

Desirable compound (6) is compound (6-1) to compound (6-9) according to item 18. It is desirable that in these compounds, at least one of the first additive should be compound (6-1), compound (6-2), compound (6-3), compound (6-5) or compound (6-6). It is desirable that at least two of the first additive should be a combination of compound (6-1) and compound (6-2) or compound (6-1) and compound (6-4).

Desirable compound (7) is compound (7-1) to compound (7-28) according to item 22. More desirable compound (7) is compound (7-1), compound (7-2), compound (7-3), compound (7-4), compound (7-5), compound (7-6), compound (7-7), compound (7-18), compound (7-20), compound (7-23), compound (7-24), compound (7-25) and compound (7-26). Especially desirable compound (7) is compound (7-2), compound (7-3), compound (7-4) and compound (7-18).

Sixth, additives that may be added to the composition will be explained. Such additives include an optically active compound, an antioxidant, an ultraviolet light absorber, a coloring matter, an antifoaming agent, a polymerizable compound, a polymerization initiator, a polymerization inhibitor and a polar compound. The optically active compound is added to the composition for the purpose of inducing the helical structure of liquid crystal molecules and giving a twist angle. Examples of such compounds include compound (8-1) to compound (8-5). A desirable proportion of the optically active compound is approximately 5% by weight or less, and a more desirable proportion is in the range of approximately 0.01% by weight to approximately 2% by weight.

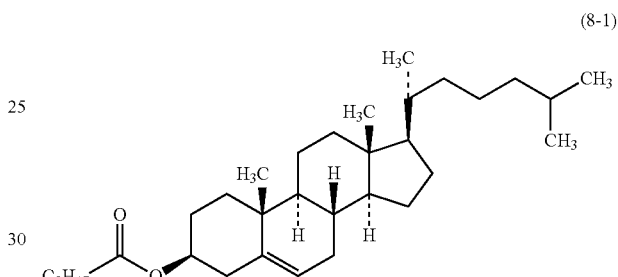

(8-1)

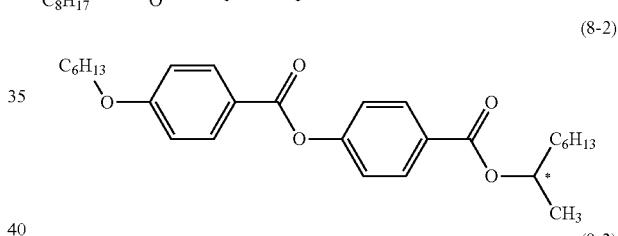

(8-2)

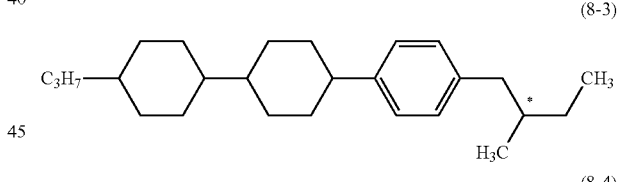

(8-3)

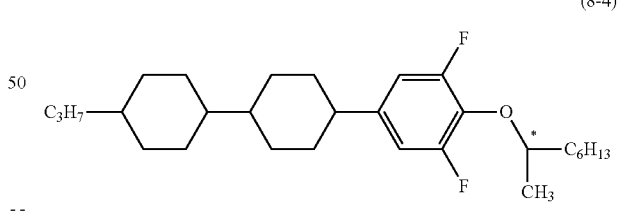

(8-4)

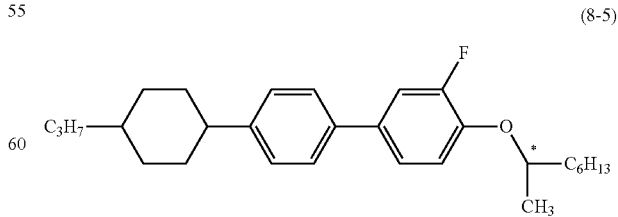

(8-5)

The antioxidant is added to the composition in order to prevent a decrease in specific resistance that is caused by heating under air, or to maintain a large voltage holding ratio at a temperature close to the maximum temperature as well as at room temperature, after the device has been used for a long time. A desirable example of the antioxidant is compound (9) where n is an integer from 1 to 9, for instance.

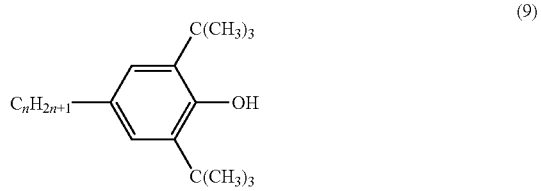

(9)

In compound (9), desirable n is 1, 3, 5, 7 or 9. More desirable n is 7. Compound (9) where n is 7 is effective in maintaining a large voltage holding ratio at a temperature close to the maximum temperature as well as at room temperature, after the device has been used for a long time, since it has a small volatility. A desirable proportion of the antioxidant is approximately 50 ppm or more for achieving its effect and is approximately 600 ppm or less for avoiding a decrease in the maximum temperature or avoiding an increase in the minimum temperature. A more desirable proportion is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable proportion of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable proportion is in the range of approximately 100 ppm to approximately 10,000 ppm.

A dichroic dye such as an azo dye or an anthraquinone dye is added to the composition for adjusting to a device having a guest host (GH) mode. A desirable proportion of the coloring matter is in the range of approximately 0.01% by weight to approximately 10% by weight. The antifoaming agent such as dimethyl silicone oil or methyl phenyl silicone oil is added to the composition for preventing foam formation. A desirable proportion of the antifoaming agent is approximately 1 ppm or more for achieving its effect and is approximately 1,000 ppm or less for preventing a poor display. A more desirable proportion is in the range of approximately 1 ppm to approximately 500 ppm.

The polymerizable compound is used for adjusting to a device with a polymer sustained alignment (PSA) type. Compound (5), compound (6) and compound (7) are suitable for this purpose. Any other polymerizable compound that is different from compound (5), compound (6) and compound (7) may be added to the composition, together with compound (5), compound (6) or compound (7). Desirable examples of any other polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable proportion of Compound (5), compound (6) and compound (7) is approximately 10% by weight or more based on the total weight of the polymerizable compound. A more desirable proportion is approximately 50% by weight or more. An especially desirable proportion is approximately 80% by weight or more. An especially desirable proportion is also 100% by weight. The reactivity of the polymerizable compound or the pretilt angle of liquid crystal molecules can be adjusted by changing the type of compound (5), compound (6) or compound (7), or by combining compound (5), compound (6) or compound (7) with any other polymerizable compound in a suitable proportion. A short response time of the device can be achieved by optimizing the pretilt angle. A large contrast ratio or a long service life can be achieved, since the alignment of liquid crystal molecules is stabilized.

The polymerizable compound is polymerized on irradiation with ultraviolet light. It may be polymerized in the presence of an initiator such as a photopolymerization initiator. Suitable conditions for polymerization, and a suitable type and amount of the initiator are known to a person skilled in the art, and are described in the literature. For example, Irgacure 651 (registered trademark; BASF), Irgacure 184 (registered trademark; BASF) or Darocur 1173 (registered trademark; BASF), each of which is a photopolymerization initiator, is suitable for radical polymerization. A desirable proportion of the photopolymerization initiator is in the range of approximately 0.1% by weight to approximately 5% by weight based on the total weight of the polymerizable compound. A more desirable proportion is in the range of approximately 1% by weight to approximately 3% by weight.

The polymerization inhibitor may be added in order to prevent polymerization when the polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-t-butylcatechol, 4-methoxyphenol and phenothiazine.

A polar compound means an organic compound having polarity. It does not include a compound with ionic bonds herein. Atoms, such as oxygen, sulfur and nitrogen, that are more electronegative have a tendency to have partial negative charges. Atoms, such as carbon and hydrogen, have a tendency to be neutral or have partial positive charges. Polarity results from the uneven partial charge distribution between various atoms in the compound. For example, the polar compound has at least one moiety such as —OH, —COOH, —SH, —NH$_2$, >NH and >N—.

Seventh, methods for synthesizing the component compounds will be explained. These compounds can be synthesized by known methods. The synthetic methods will be exemplified. Compound (1-4) and compound (1-10) are prepared by the method described in JP H10-251186 A (1998). compound (2-1) is prepared by the method described in JP 59-176221 A (1984). Compound (3-4) and compound (3-8) are prepared by the method described in JP H02-233626 A (1990). Compound (4-1) and compound (4-6) are prepared by the method described in JP H02-503441 A (1990). The method for preparing compound (6-1) will be described in Examples. compound (7-18) is prepared by the method described in JP H07-101900 A (1995). A compound of formula (9) where n is 1 is available from Sigma-Aldrich Corporation. Compound (9) where n is 7, for instance, is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin- Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. Most compositions have a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the proportion of the component compounds or by mixing with any other liquid crystal compound. Furthermore, a composition having an optical anisotropy in the range of approximately 0.10 to approximately 0.30 may be prepared by trial and error. A device including this composition has a large voltage holding ratio. This composition is suitable for an AM device. This composition is suitable especially for an AM device having a transmission type. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the alignment of liquid crystal molecules may be parallel or perpendicular to the glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

One example of methods for producing the device with a polymer sustained alignment type is as follows: A device having two substrates, called an array substrate and a color filter substrate, is prepared. The substrates have an alignment film. At least one of the substrates has an electrode layer. Liquid crystal compounds are mixed to give a liquid crystal composition. A polymerizable compound is added to this composition. An additive may be further added as required. The composition is poured into the device. The device is irradiated with light while a voltage is applied to it. Ultraviolet light is desirable. The polymerizable compound is polymerized by irradiation with light. A composition including a polymer is formed by the polymerization. The device with polymer sustained alignment type can be produced by this procedure.

In the procedure, liquid crystal molecules are aligned by the effect of the alignment film and an electric field when a voltage is applied. The molecules of the polymerizable compound are also aligned according to the alignment. A polymer where the alignment is maintained is formed, since the polymerizable compound is polymerized by ultraviolet light under these conditions. The response time of the device is decreased by the effect of the polymer. Image burn-in can also be improved at the same time by the effect of the polymer, since the burn-in is a malfunction of liquid crystal molecules. Incidentally, it may be possible that the polymerizable compound in the composition is polymerized in advance and then this composition is placed between the substrates of a liquid crystal display device.

When compound (5) and compound (6), that is to say a polar compound having a polymerizable group, is used as a polymerizable compound, an alignment film is not required for the substrate of the device. A device without alignment films is produced according to the procedure described in the second-above paragraph.

In the procedure, compound (5) and compound (6) are arranged on the substrate, since the polar group interacts with the surface of the substrate. The liquid crystal molecules are aligned according to the arrangement. The alignment of the liquid crystal molecules is further promoted when a voltage is applied. A polymer where the alignment is maintained is formed, since the polymerizable group is polymerized by ultraviolet light under these conditions. The alignment of liquid crystal molecules is additionally stabilized by the effect of the polymer, and the response time of the device is decreased. Image burn-in can also be improved at the same time by the effect of the polymer, since the burn-in is a malfunction of liquid crystal molecules.

EXAMPLES

The invention will be explained in more detail by way of Examples. The invention is not limited to Examples. The invention includes a mixture of composition (M1) and composition (M2). The invention also includes a mixture prepared by mixing at least two compositions in Examples. Compounds prepared herein were identified by methods such as NMR analysis. The characteristics of the compounds, compositions and devices were measured by the methods described below.

NMR Analysis: A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometers, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents such as chloroform and hexane may also be used for diluting the sample. The following capillary columns may also be used in order to separate the component compounds: HP-1 made by Agilent Technologies Inc. (length 30 meters, bore 0.32 millimeter, film thickness 0.25 micrometers), Rtx-1 made by Restek Corporation (length 30 meters, bore 0.32 millimeter, film thickness 0.25 micrometers), and BP-1 made by SGE International Pty. Ltd. (length 30 meters, bore 0.32 millimeter, film thickness 0.25 micrometers). A capillary column CBP1-M50-025 (length 50 meters, bore 0.25 millimeter, film thickness 0.25 micrometers) made by Shimadzu Corporation may also be used for the purpose of avoiding an overlap of peaks of the compounds.

The proportion of the liquid crystal compounds included in the composition may be calculated according to the following method. A mixture of the liquid crystal compounds was analyzed by gas chromatography (FID). The ratio of peak areas in the gas chromatogram corresponds to the proportion of the liquid crystal compounds. When the capillary columns described above are used, the correction coefficient of respective liquid crystal compounds may be regarded as 1 (one). Accordingly, the proportion (percentage by weight) of the liquid crystal compounds can be calculated from the ratio of peak areas.

Samples for measurement: A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The proportion of the component compounds were expressed as a percentage by weight.

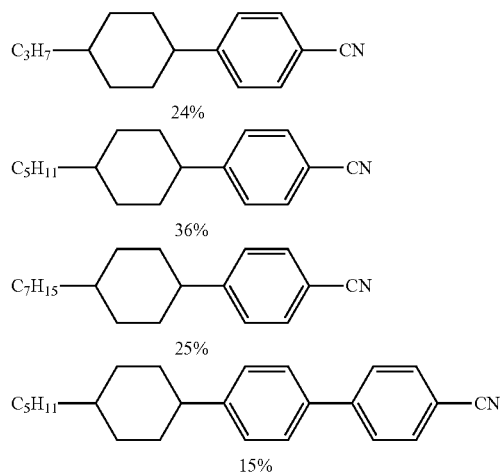

Measurement methods: The characteristics of compounds were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.): A sample was placed on a hot plate in a melting point apparatus equipped with a polarizing microscope and was heated at the rate of 1° C. per minute. The temperature was measured when a part of the sample began to change from a nematic phase to an isotropic liquid. The upper limit of the temperature range of a nematic phase is sometimes abbreviated to the "maximum temperature."

(2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. The lower limit of the temperature range of a nematic phase is sometimes abbreviated to "the minimum temperature."

(3) Viscosity (bulk viscosity; η; measured at 20° C.; mPa·s): An E-type viscometer made by Tokyo Keiki Inc. was used for measurement.

(4) Viscosity (rotational viscosity; γ1; measured at 25° C.; mPa·s): The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with an increment of 0.5 volt in the range of 16 to 19.5 volts. After a period of 0.2 seconds with no voltage, a voltage was applied repeatedly under the conditions of a single rectangular wave alone (rectangular pulse; 0.2 seconds) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was measured by the method described in measurement (6).

(5) Optical anisotropy (refractive index anisotropy; Δn; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n∥−n⊥.

(6) Dielectric anisotropy (Δε; measured at 25° C.): A sample was poured into a TN device in which the distance between the two glass substrates (cell gap) was 9 micrometers and the twist angle was 80 degrees. Sine waves (10 V, 1 kHz) were applied to this device, and the dielectric constant (ε∥) in the major axis direction of liquid crystal molecules was measured after 2 seconds. Sine waves (0.5 V, 1 kHz) were applied to this device and the dielectric constant ($\varepsilon\perp$) in the minor axis direction of the liquid crystal molecules was measured after 2 seconds. The value of dielectric anisotropy was calculated from the equation: $\Delta\varepsilon=\varepsilon\|-\varepsilon\perp$.

(7) Threshold voltage (Vth; measured at 25° C.; V): An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was 4.45/An (micrometers) and the twist angle was 80 degrees. A voltage to be applied to this device (32 Hz, rectangular waves) was stepwise increased in 0.02 V increments from 0 V up to 10 V. During the increase, the device was vertically irradiated with light, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(8) Voltage Holding Ratio (VHR-1; measured at 25° C.; %): A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The resulting values were represented by the symbol VHR-2.

(10) Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time ($\tau$; measured at 25° C.; millisecond): An LCD evaluation system Model LCD-5100 made by Otsuka Electronics Co., Ltd. was used for measurement. The light source was a halogen lamp. The low-pass filter was set at 5 kHz. A sample was poured into a FFS device without alignment films, in which the distance between the two glass substrates (cell gap) was 3.5 micrometers. This device was sealed with a UV-curable adhesive. The device was irradiated with ultraviolet light (28 J) of 78 mW/cm$^2$ (405 nanometers) for 359 seconds, while a voltage of 30 V was applied. A multi-metal lamp for UV curing M04-L41 made by Eye Graphics Co., Ltd. was used for irradiation with ultraviolet light. Rectangular waves (120 Hz) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The maximum voltage of the rectangular waves was adjusted in order that the transmittance was 90%. The minimum voltage of the rectangular waves was adjusted to 2.5 V where the transmittance was 0%. The response time was expressed as the time (fall time; millisecond) for change from 90% transmittance to 10% transmittance.

(13) Elastic constants (K; measured at 25° C.; pN): A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18) on page 171 of the book and the values of K11 and K33 thus obtained. The elastic constant K was expressed as an average of K11, K22 and K33.

(14) Specific Resistance ($\rho$; measured at 25° C.; $\Omega$cm): A sample of 1.0 milliliter was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(16) Pretilt Angle

A spectroscopic ellipsometer, Model M-2000U (made by J. A. Woollam Co., Inc.) was used for measurement of a pretilt angle.

(17) Alignment stability (Stability of liquid crystal alignment axis): In the liquid crystal display device, the change of a liquid crystal alignment axis in the side of the electrode was evaluated. A liquid crystal alignment angle [$\varphi$(before)] before stressed in the side of the electrode was measured, and rectangular waves (4.5 V, 60 Hz) were applied to the device for 20 minutes, and no voltages for 1 second, and then a liquid crystal alignment angle [$\varphi$(after)] in the side of the electrode was measured after 1 second and 5 minutes. The change ($\Delta\varphi$, deg.) of the liquid crystal alignment angle after 1 second and 5 minutes was calculated from these values by the following equation:

$$\Delta\varphi(\text{deg.})=\varphi(\text{after})-\varphi(\text{before})$$

These measurements was carried out by referring J. Hilfiker, B. Johs, C. Herzinger, J. F. Elman, E. Montbach, D. Bryant and P. J. Bos, Thin Solid Films, 455-456, (2004) 596-600. The smaller value of $\Delta\varphi$ means a smaller change ratio of the liquid crystal alignment axis, which means that the stability of liquid crystal alignment axis is better.

Synthetic Example 1

Compound (6-1) was prepared by the following method.

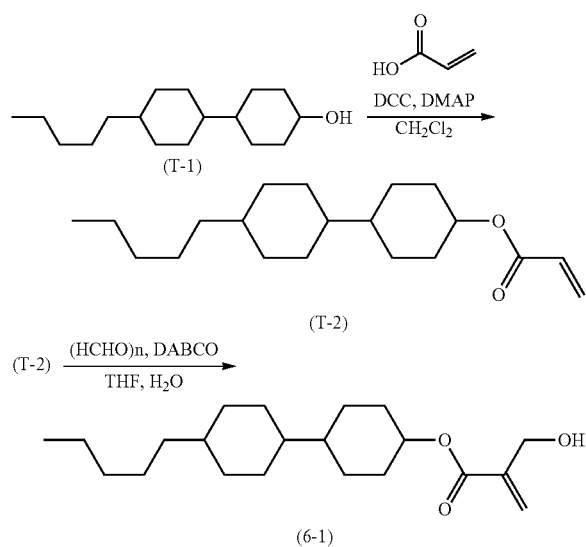

First Step:

Compound (T-1) (25.0 g), acrylic acid (7.14 g), 4-dimethylaminopyridine (DMAP; 1.21 g) and dichloromethane (300 ml) were placed in a reaction vessel, and the mixture was cooled to 0° C. 1,3-Dicyclohexylcarbodiimide (DCC; 24.5 g) in dichloromethane (125 ml) solution was slowly added dropwise, and then the mixture was stirred for 12 hours while the mixture was coming to room temperature. Insoluble materials were filtered off, the reaction mixture was poured into water, and the aqueous layer was extracted with dichloromethane. The combined organic layers were washed with water, and dried over anhydrous magnesium sulfate. The solution was concentrated under reduced pressure, and the residue was purified by silica gel chromatography (heptane:toluene=2:1, by volume), and then purified by recrystallization from Solmix A-11 (registered trademark) to give compound (T-2) (11.6 g; 38%). Incidentally, Solmix A-11 (registered trademark) was a mixture of ethanol (85.5%), methanol (13.4%) and isopropanol (1.1%), and was obtained from Japan Alcohol Trading Co., Ltd.

Second Step:

Paraformaldehyde (2.75 g), 1,4-diazabicyclo[2.2.2]octane (DABCO; 4.62 g) and water (40 ml) were placed in a reaction vessel, and the mixture was stirred at room temperature for 15 minutes. Compound (T-2) (6.31 g) in THF (90 ml) solution was added dropwise, and the mixture was stirred at room temperature for 72 hours. The reaction mixture was poured into water, and the aqueous layer was extracted with ethyl acetate. The combined organic layers were washed with water, and dried over anhydrous magnesium sulfate. The solution was concentrated under reduced pressure, and the residue was purified by silica gel chromatography (toluene:ethyl acetate=5:1, by volume), and then purified by recrystallization (heptane:toluene=1:1, by volume) to give compound (6-1) (1.97 g; 29%).

$^1$H-NMR of compound (6-1): chemical shift δ (ppm; $CDCl_3$): 6.23 (s, 1H), 5.79 (d, J=1.2 Hz, 1H), 4.79-4.70 (m, 1H), 4.32 (d, J=6.7 Hz, 2H), 2.29 (t, J=6.7 Hz, 1H), 2.07-2.00 (m, 2H), 1.83-1.67 (m, 6H), 1.42-1.18 (m, 8H), 1.18-0.91 (m, 9H), 0.91-0.79 (m, 5H).

The compounds described in Examples were expressed in terms of symbols according to the definition in Table 3 described below. In Table 3, the configuration of 1,4-cyclohexylene is trans. A parenthesized number next to a symbolized compound represents the chemical formula to which the compound belongs. The symbol (-) means any other liquid crystal compound. The proportion (percentage) of a liquid crystal compound means the percentages by weight (% by weight) based on the weight of the liquid crystal composition excluding additives. Last, the values of characteristics of the composition were summarized.

TABLE 3

Method of Description of Compounds using Symbols
R—($A_1$)—$Z_1$—...—$Z_n$—($A_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| F—$C_nH_{2n}$— | Fn— |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |

| 3) Bonding Group —$Z_n$— | Symbol |
|---|---|
| —$C_nH_{2n}$— | n |
| —COO— | E |
| —CH=CH— | V |
| —C≡C— | T |
| —$CF_2O$— | X |
| —$CH_2O$— | 1O |

| 4) Ring Structure —$A_n$— | Symbol |
|---|---|
| cyclohexyl | H |
| tetrahydropyran (O top) | Dh |
| tetrahydropyran (O other) | dh |
| phenyl | B |

TABLE 3-continued

Method of Description of Compounds using Symbols
R—(A₁)—Z₁— ... —Zₙ—(Aₙ)—R'

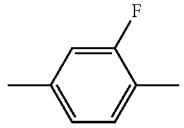 B(F)

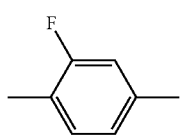 B(2F)

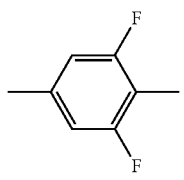 B(F,F)

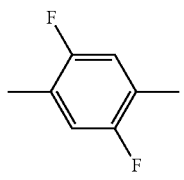 B(2F,5F)

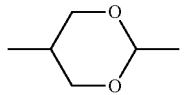 G

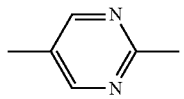 Py

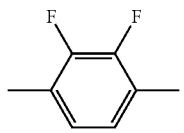 B(2F,3F)

5) Examples of Description

Example 1. 3-HH—V1

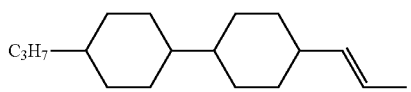

Example 2. 3-HHB—CL

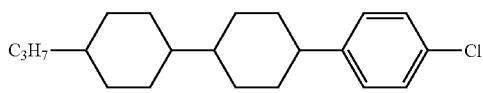

Example 3. 4-GB(F)B(F,F)XB(F,F)—F

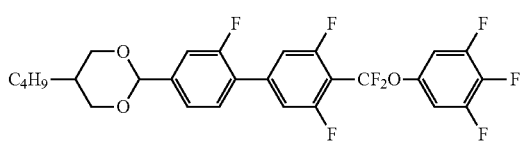

Example 4. 2-BB(F)B(F,F)—F

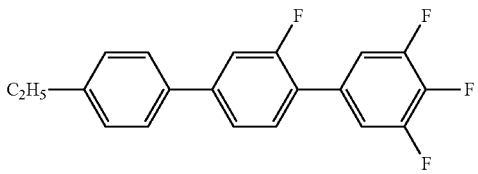 [SMILES: CCc1ccc(-c2ccc(-c3cc(F)c(F)c(F)c3)c(F)c2)cc1]

Examples of the Device

1. Starting Materials

The composition was injected to a device without alignment films. After irradiation with ultraviolet light, the homeotropic alignment of liquid crystal molecules in this device was studied. First, starting materials will be explained. The starting materials were compositions (M1) to (M13), polar compounds (PC-1) to (PC-22) and polymerizable compounds (RM-1) to (RM-9) and will be listed in this order.

Composition (M1)

| | | |
|---|---|---|
| 5-HXB(F,F)-F | (1-1) | 3% |
| 3-HHXB(F,F)-F | (1-2) | 6% |
| 3-BB(F,F)XB(F,F)-F | (1-4) | 6% |
| 3-BB(2F,3F)XB(F,F)-F | (1-4) | 4% |
| 3-HHB(F,F)XB(F,F)-F | (1-5) | 4% |
| 3-HBB(2F,3F)XB(F,F)-F | (1-7) | 5% |
| 5-BB(F)B(F,F)XB(F)B(F,F)-F | (1-14) | 2% |
| 3-HH-V | (2-1) | 22% |
| 3-HH-V1 | (2-1) | 10% |
| 5-HB-O2 | (2-2) | 5% |
| 3-HHEH-3 | (2-4) | 3% |
| 3-HBB-2 | (2-6) | 7% |
| 5-B(F)BB-3 | (2-7) | 3% |
| 3-HB-CL | (3-1) | 3% |
| 3-HHB-OCF3 | (3-3) | 3% |
| 3-HGB(F,F)-F | (3-6) | 3% |
| 3-HB(F)B(F,F)-F | (3-9) | 5% |
| 3-HHBB(F,F)-F | (3-14) | 6% |

NI=77.2° C.; Tc<−20° C.; Δn=0.101; Δε=5.8; Vth=1.88 V; η=13.7 mPa·s; γ1=61.3 mPa·s.

Composition (M2)

| | | |
|---|---|---|
| 5-HXB(F,F)-F | (1-1) | 6% |
| 3-HHXB(F,F)-F | (1-2) | 6% |
| 2-BB(F)B(F,F)XB(F)-F | (1-10) | 3% |
| 3-BB(F)B(F,F)XB(F)-F | (1-10) | 3% |
| 4-BB(F)B(F,F)XB(F)-F | (1-10) | 4% |
| 2-HH-5 | (2-1) | 8% |
| 3-HH-V | (2-1) | 10% |
| 3-HH-V1 | (2-1) | 7% |
| 4-HH-V | (2-1) | 10% |
| 4-HH-V1 | (2-1) | 8% |
| 5-HB-O2 | (2-2) | 7% |
| 4-HHEH-3 | (2-4) | 3% |
| V2-BB(F)B-1 | (2-8) | 3% |
| 5-HB-CL | (3-1) | 5% |
| V-HB(F)B(F,F)-F | (3-9) | 5% |
| 3-HHB(F)B(F,F)-F | (3-15) | 7% |
| 1O1-HBBH-3 | (—) | 5% |

NI=78.5° C.; Tc<−20° C.; Δn=0.095; Δε=3.4; Vth=1.50 V; η=8.4 mPa·s; γ1=54.2 mPa·s.
Composition (M3)

| | | |
|---|---|---|
| 3-HHXB(F,F)-F | (1-2) | 7% |
| 3-BB(F,F)XB(F,F)-F | (1-4) | 10% |
| 5-HHB(F,F)XB(F,F)-F | (1-5) | 6% |
| 3-HBB(2F,3F)XB(F,F)-F | (1-7) | 5% |
| 2-HH-3 | (2-1) | 8% |
| 3-HH-V | (2-1) | 20% |
| 3-HH-V1 | (2-1) | 7% |
| 4-HH-V | (2-1) | 6% |
| 5-HB-O2 | (2-2) | 5% |
| V2-B2BB-1 | (2-9) | 3% |
| 3-HHEBH-3 | (2-11) | 5% |
| 3-HHEBH-5 | (2-11) | 5% |
| 3-HHEB(F,F)-F | (3-5) | 5% |
| 5-HBEB(F,F)-F | (3-10) | 5% |
| 2-HHB(F)B(F,F)-F | (3-15) | 3% |

NI=90.3° C.; Tc<−20° C.; Δn=0.088; Δε=5.4; Vth=1.69 V; η=13.7 mPa·s; γ1=60.6 mPa·s.
Composition (M4)

| | | |
|---|---|---|
| 3-BB(F,F)XB(F,F)-F | (1-4) | 12% |
| 3-HBBXB(F,F)-F | (1-7) | 3% |
| 3-BB(F)B(F,F)XB(F)-F | (1-10) | 3% |
| 3-BB(F)B(F,F)XB(F,F)-F | (1-10) | 3% |
| 4-BB(F)B(F,F)XB(F,F)-F | (1-10) | 5% |
| 5-BB(F)B(F,F)XB(F,F)-F | (1-10) | 4% |
| 2-HH-3 | (2-1) | 6% |
| 3-HH-5 | (2-1) | 6% |
| 3-HH-V | (2-1) | 25% |
| 3-HH-VFF | (2-1) | 6% |
| 5-HB-O2 | (2-2) | 7% |
| V-HHB-1 | (2-5) | 6% |
| V-HBB-2 | (2-6) | 5% |
| 3-HHBB(F,F)-F | (3-14) | 5% |
| 4-HHBB(F,F)-F | (3-14) | 4% |

NI=78.3° C.; Tc<−20° C.; Δn=0.107; Δε=7.0; Vth=1.55 V; η=11.6 mPa·s; γ1=55.6 mPa·s.
Composition (M5)

| | | |
|---|---|---|
| 3-HHXB(F,F)-F | (1-2) | 6% |
| 3-BB(F,F)XB(F,F)-F | (1-4) | 8% |
| 3-BB(F)B(F,F)XB(F,F)-F | (1-10) | 3% |
| 4-BB(F)B(F,F)XB(F,F)-F | (1-10) | 6% |
| 5-BB(F)B(F,F)XB(F,F)-F | (1-10) | 5% |
| 3-HH-V | (2-1) | 30% |
| 3-HH-V1 | (2-1) | 5% |
| F3-HH-V | (2-1) | 15% |
| 3-HHB-O1 | (2-5) | 2% |
| V-HHB-1 | (2-5) | 5% |
| 2-BB(F)B-3 | (2-8) | 6% |
| 3-HHBB(F,F)-F | (3-14) | 5% |
| 4-HHBB(F,F)-F | (3-14) | 4% |

NI=82.0° C.; Tc<−20° C.; Δn=0.104; Δε=5.7; Vth=1.43 V; η=11.8 mPa·s; γ1=62.1 mPa·s.
Composition (M6)

| | | |
|---|---|---|
| 3-GB(F,F)XB(F,F)-F | (1-3) | 5% |
| 3-HGB(F,F)XB(F,F)-F | (1-6) | 5% |
| 2-dhBB(F,F)XB(F,F)-F | (1-8) | 4% |
| 3-dhB(F,F)B(F,F)XB(F)B(F,F)-F | (1-13) | 3% |
| 3-BB(2F,5F)B-3 | (2) | 3% |
| 2-HH-3 | (2-1) | 14% |
| 2-HH-5 | (2-1) | 4% |
| 3-HH-V | (2-1) | 26% |
| 1V2-HH-3 | (2-1) | 5% |
| 1V2-BB-1 | (2-3) | 3% |
| 3-HB(F)HH-2 | (2-10) | 4% |
| 5-HBB(F)B-2 | (2-13) | 6% |
| 7-HB(F,F)-F | (3-2) | 3% |
| 3-HGB(F,F)-F | (3-6) | 3% |
| 5-GHB(F,F)-F | (3-7) | 4% |
| 3-BB(F)B(F,F)-CF3 | (3-13) | 2% |
| 3-HHBB(F,F)-F | (3-14) | 4% |
| 3-GBB(F)B(F,F)-F | (3-16) | 2% |

NI=78.3° C.; Tc<−20° C.; Δn=0.094; Δε=5.9; Vth=1.25 V; η=12.8 mPa·s; γ1=61.9 mPa·s.
Composition (M7)

| | | |
|---|---|---|
| 3-BB(F)B(F,F)XB(F,F)-F | (1-10) | 3% |
| 4-BB(F)B(F,F)XB(F,F)-F | (1-10) | 5% |
| 3-BB(F,F)XB(F)B(F,F)-F | (1-12) | 3% |
| 5-BB(F)B(F,F)XB(F)B(F,F)-F | (1-14) | 4% |
| 2-HH-5 | (2-1) | 8% |
| 3-HH-V | (2-1) | 25% |
| 3-HH-V1 | (2-1) | 7% |
| 4-HH-V1 | (2-1) | 6% |
| 5-HB-O2 | (2-2) | 5% |
| 7-HB-1 | (2-2) | 5% |
| VFF-HHB-O1 | (2-5) | 8% |
| VFF-HHB-1 | (2-5) | 3% |
| 3-HH2BB(F,F)-F | (3) | 3% |
| 4-HH2BB(F,F)-F | (3) | 3% |
| 3-HBB(F,F)-F | (3-8) | 5% |
| 5-HBB(F,F)-F | (3-8) | 4% |
| 3-BB(F)B(F,F)-F | (3-12) | 3% |

NI=80.0° C.; Tc<−20° C.; Δn=0.101; Δε=4.6; Vth=1.71 V; η=11.0 mPa·s; γ1=47.2 mPa·s.
Composition (M8)

| | | |
|---|---|---|
| 3-BB(F,F)XB(F,F)-F | (1-4) | 10% |
| 3-GB(F)B(F,F)XB(F,F)-F | (1-9) | 6% |
| 5-GB(F,F)XB(F)B(F,F)-F | (1-11) | 5% |
| 5-HBBH-3 | (2) | 5% |
| 3-HH-V | (2-1) | 30% |
| 3-HH-V1 | (2-1) | 10% |
| 1V2-HH-3 | (2-1) | 8% |
| 3-HH-VFF | (2-1) | 8% |
| V2-BB-1 | (2-3) | 2% |
| 5-HB(F)BH-3 | (2-12) | 5% |
| 3-HHB(F,F)-F | (3-4) | 8% |
| 3-GB(F)B(F,F)-F | (3-11) | 3% |

NI=76.6° C.; Tc<−20° C.; Δn=0.088; Δε=5.5; Vth=1.81 V; η=12.1 mPa·s; γ1=60.2 mPa·s.
Composition (M9)

| | | |
|---|---|---|
| 3-HHB(F,F)XB(F,F)-F | (1-5) | 5% |
| 5-HHB(F,F)XB(F,F)-F | (1-5) | 3% |
| 3-HGB(F,F)XB(F,F)-F | (1-6) | 5% |
| 3-GB(F)B(F,F)XB(F,F)-F | (1-9) | 5% |
| 4-GB(F)B(F,F)XB(F,F)-F | (1-9) | 5% |
| 2-HH-5 | (2-1) | 3% |
| 3-HH-5 | (2-1) | 5% |
| 3-HH-V | (2-1) | 24% |
| 4-HH-V | (2-1) | 5% |
| 1V2-HH-3 | (2-1) | 5% |
| 3-HHEH-3 | (2-4) | 5% |
| 5-B(F)BB-2 | (2-7) | 3% |
| 5-B(F)BB-3 | (2-7) | 2% |
| 5-HEB(F,F)-F | (3) | 3% |
| 5-HB-CL | (3-1) | 5% |
| 3-HHB-OCF3 | (3-3) | 4% |
| 3-HHEB(F,F)-F | (3-5) | 4% |
| 3-HBEB(F,F)-F | (3-10) | 3% |

-continued

| | | |
|---|---|---|
| 5-HBEB(F,F)-F | (3-10) | 3% |
| 3-BB(F)B(F,F)-F | (3-12) | 3% |

NI=78.6° C.; Tc<−20° C.; Δn=0.091; Δε=6.8; Vth=1.52 V; η=15.5 mPa·s; γ1=59.3 mPa·s.

Composition (M10)

| | | |
|---|---|---|
| 3-HHXB(F,F)-F | (1-2) | 9% |
| 3-BB(F,F)XB(F,F)-F | (1-4) | 5% |
| 3-HH-V | (2-1) | 25% |
| 3-HH-V1 | (2-1) | 10% |
| 5-HB-O2 | (2-2) | 10% |
| 7-HB-1 | (2-2) | 5% |
| V2-BB-1 | (2-3) | 3% |
| 3-HHB-1 | (2-5) | 4% |
| 1V-HBB-2 | (2-6) | 5% |
| 5-HBB(F)B-2 | (2-13) | 6% |
| 3-HBB(F,F)-F | (3-8) | 3% |
| 3-BB(F)B(F,F)-F | (3-12) | 4% |
| 3-BB(F)B(F,F)-CF3 | (3-13) | 4% |
| 3-GBB(F)B(F,F)-F | (3-16) | 3% |
| 4-GBB(F)B(F,F)-F | (3-16) | 4% |

NI=79.6° C.; Tc<−20° C.; Δn=0.111; Δε=4.7; Vth=1.86 V; η=9.7 mPa·s; γ1=49.9 mPa·s.

Composition (M11)

| | | |
|---|---|---|
| 3-BB(F,F)XB(F,F)-F | (1-4) | 14% |
| 3-dhB(F,F)B(F,F)XB(F)B(F,F)-F | (1-13) | 7% |
| 3-BB(2F,5F)B-3 | (2) | 3% |
| 2-HH-5 | (2-1) | 5% |
| 3-HH-V | (2-1) | 30% |
| 3-HH-V1 | (2-1) | 3% |
| 3-HH-VFF | (2-1) | 10% |
| 3-HHB-1 | (2-5) | 4% |
| 3-HHB-3 | (2-5) | 5% |
| 3-HHB-O1 | (2-5) | 3% |
| 3-HHEBH-3 | (2-11) | 3% |
| 3-HHEBH-4 | (2-11) | 4% |
| 3-HHEBH-5 | (2-11) | 3% |
| 7-HB(F,F)-F | (3-2) | 6% |

NI=82.7° C.; Tc<−20° C.; Δn=0.085; Δε=5.1; Vth=1.70 V; η=8.0 mPa·s; γ1=53.9 mPa·s.

Composition (M12)

| | | |
|---|---|---|
| 3-BB(F)B(F,F)XB(F,F)-F | (1-10) | 3% |
| 4-BB(F)B(F,F)XB(F,F)-F | (1-10) | 5% |
| 3-BB(F,F)XB(F)B(F,F)-F | (1-12) | 3% |
| 5-BB(F)B(F,F)XB(F)B(F,F)-F | (1-14) | 4% |
| 2-HH-5 | (2-1) | 8% |
| 3-HH-V | (2-1) | 28% |
| 4-HH-V1 | (2-1) | 7% |
| 5-HB-O2 | (2-2) | 2% |
| 7-HB-1 | (2-2) | 5% |
| VFF-HHB-O1 | (2-5) | 8% |
| VFF-HHB-1 | (2-5) | 3% |
| 3-HH2BB(F,F)-F | (3) | 3% |
| 4-HH2BB(F,F)-F | (3) | 3% |
| 3-HBB(F,F)-F | (3-8) | 5% |
| 5-HBB(F,F)-F | (3-8) | 4% |
| 3-BB(F)B(F,F)-F | (3-12) | 3% |
| 2-BB(2F,3F)B-3 | (4-9) | 4% |
| 3-HBB(2F,3F)-O2 | (4-10) | 2% |

NI=81.9° C.; Tc<−20° C.; Δn=0.109; Δε=4.8; Vth=1.75 V; η=13.3 mPa·s; γ1=57.4 mPa·s.

Composition (M13)

| | | |
|---|---|---|
| 5-HHB(F,F)XB(F,F)-F | (1-5) | 3% |
| 3-HGB(F,F)XB(F,F)-F | (1-6) | 4% |
| 3-HBBXB(F,F)-F | (1-7) | 6% |
| 3-GB(F)B(F,F)XB(F,F)-F | (1-9) | 5% |
| 4-GB(F)B(F,F)XB(F,F)-F | (1-9) | 5% |
| 3-HH-5 | (2-1) | 4% |
| 3-HH-V | (2-1) | 21% |
| 3-HH-V1 | (2-1) | 3% |
| 4-HH-V | (2-1) | 4% |
| 1V2-HH-3 | (2-1) | 6% |
| F3-HH-V | (2-1) | 3% |
| 5-B(F)BB-2 | (2-7) | 3% |
| 5-B(F)BB-3 | (2-7) | 2% |
| 5-HEB(F,F)-F | (3) | 3% |
| 5-HB-CL | (3-1) | 2% |
| 3-HHB-OCF3 | (3-3) | 4% |
| 3-HHEB(F,F)-F | (3-5) | 4% |
| 3-HBEB(F,F)-F | (3-10) | 3% |
| 5-HBEB(F,F)-F | (3-10) | 3% |
| 3-BB(F)B(F,F)-F | (3-12) | 3% |
| 3-HB(2F,3F)-O2 | (4-1) | 3% |
| 3-BB(2F,3F)-O2 | (4-4) | 2% |
| 3-HHB(2F,3F)-O2 | (4-6) | 4% |

NI=78.1° C.; Tc<−20° C.; Δn=0.100; Δε=6.6; Vth=1.50 V; η=16.2 mPa·s; γ1=61.8 mPa·s.

The following polar compounds (PC-1) to (PC-22) were used as the first additive.

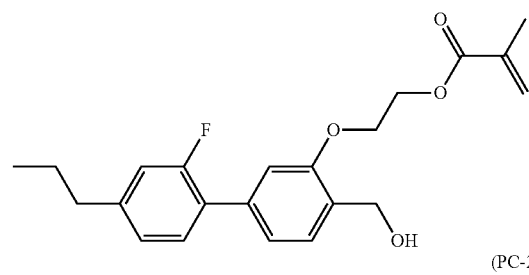

(PC-1)

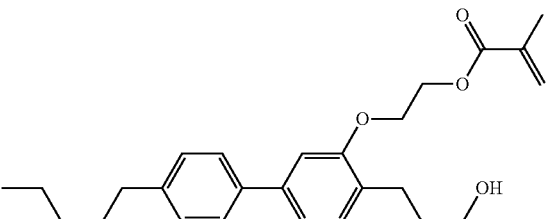

(PC-2)

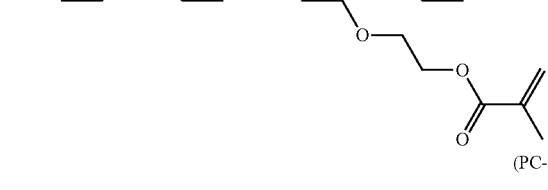

(PC-3)

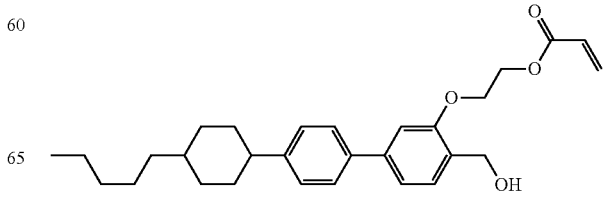

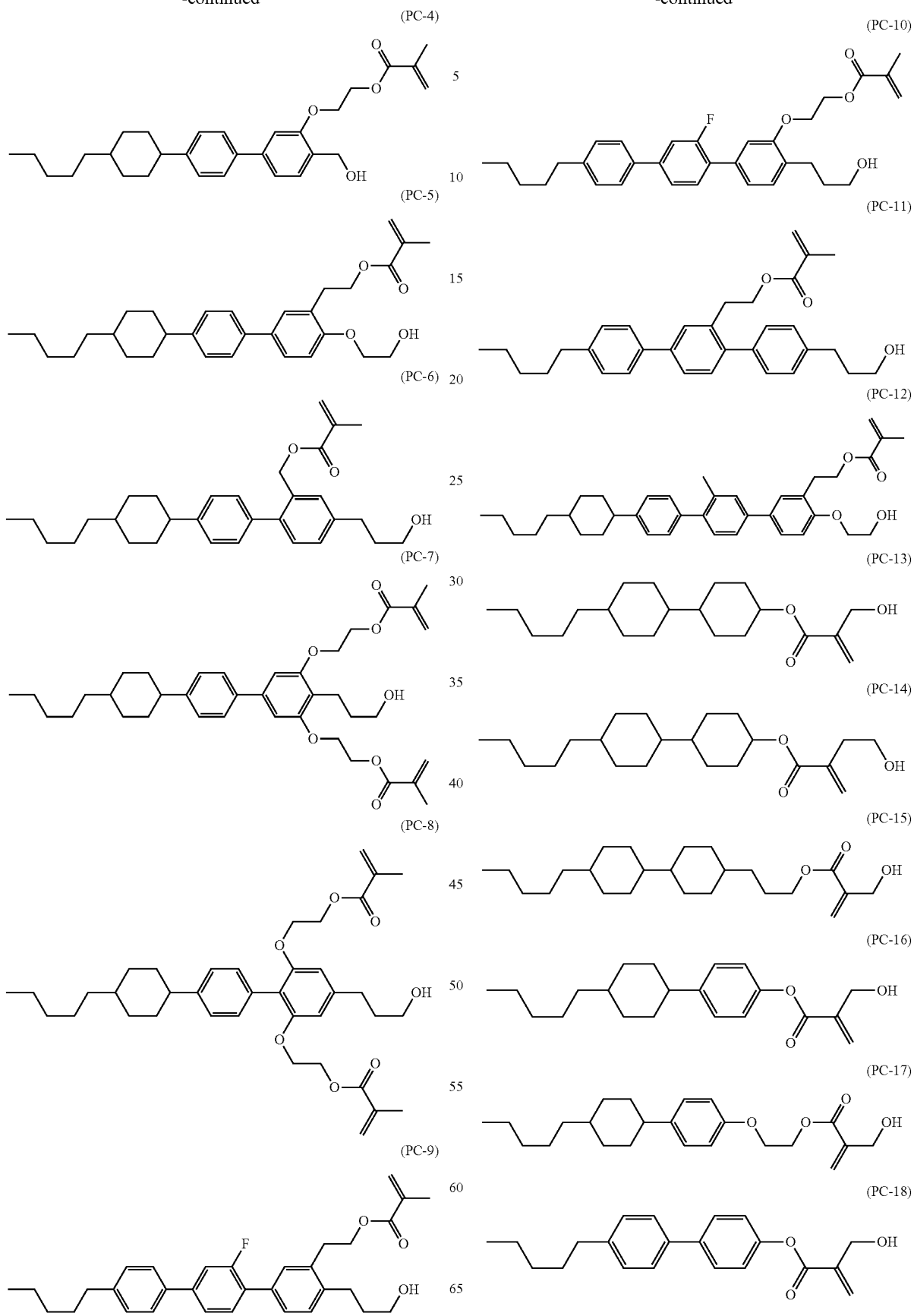

(PC-19)
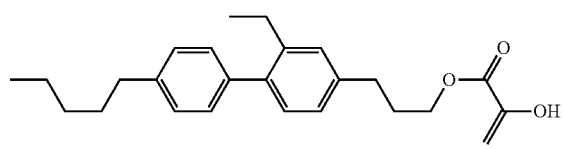
(PC-20)
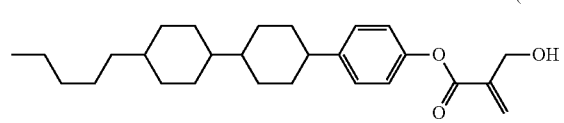
(PC-21)
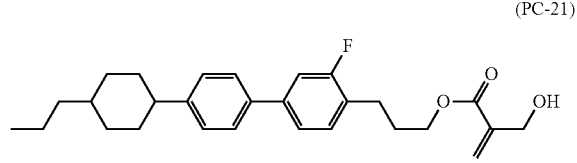
(PC-22)
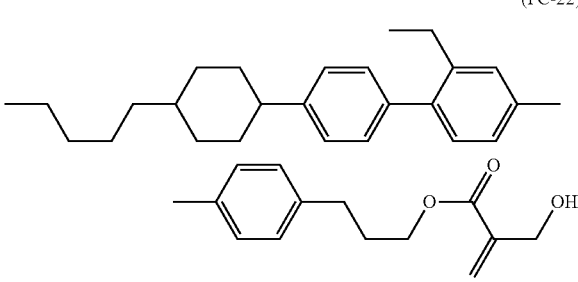
The following polymerizable compounds (RM-1) to (RM-9) were used as the second additive.
(RM-1)
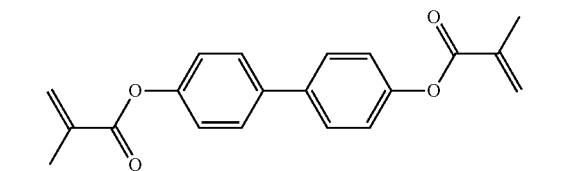
(RM-2)
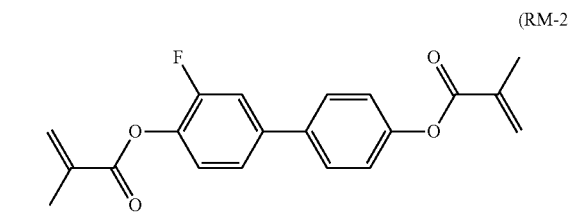
(RM-3)
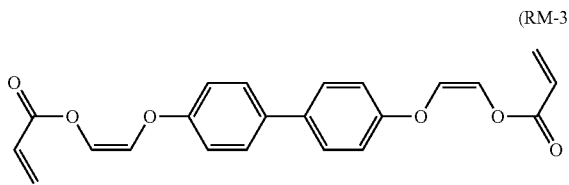
(RM-4)
(RM-5)
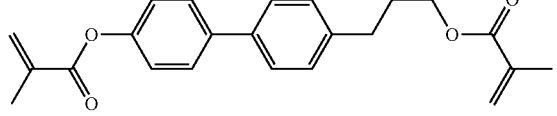
(RM-6)
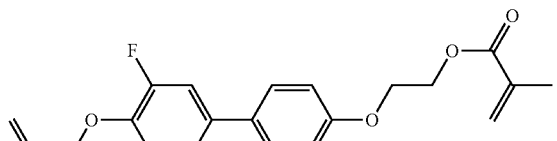
(RM-7)
(RM-8)
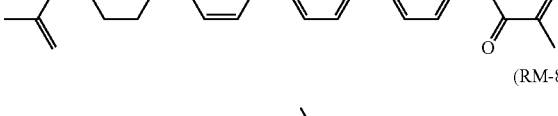
(RM-9)
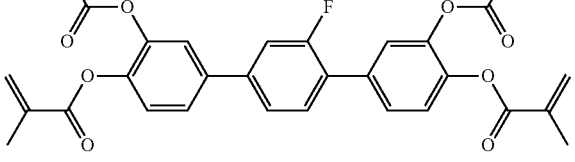

2. Homeotropic Alignment of Liquid Crystal Molecules

Example 1

Polar compound (PC-1) was added to composition (M1) in the proportion of 5% by weight. The mixture was poured into a device without alignment films, in which the distance between the two glass substrates (cell gap) was 4.0 micrometers, on a hot stage at 100° C. Polar compound (PC-1) was polymerized by irradiating the device with ultraviolet light (28 J) using an ultra-high-pressure mercury lamp USH-250-BY (produced by Ushio, Inc.). The device was placed on the stage of a polarized optical microscope in which the polarizer was orthogonal to the analyzer, and irradiated from below with light, and the presence or absence of light leak was observed. The homeotropic alignment was judged as "good" when light did not pass through the device because of a sufficient alignment of liquid crystal molecules. The alignment was judged as "poor" when light passed through the device was observed.

Examples 2 to 23

A device without alignment films was produced using a mixture prepared by the addition of the polar compound to the composition. The presence or absence of the light leak was observed in the same manner as with Example 1. The results were summarized in Table 4. In Example 23, polymerizable compound (RM-1) was also added in the proportion of 0.5% by weight.

TABLE 4

Homeotropic Alignment of Liquid Crystal Molecules

| Examples | Liquid Crystal Composition | Polar Compound (5% by weight) | Polymerizable Compound (0.5% by weight) | Homeotropic Alignment |
|---|---|---|---|---|
| 1 | M1 | PC-1 | — | good |
| 2 | M2 | PC-2 | — | good |
| 3 | M3 | PC-3 | — | good |
| 4 | M4 | PC-4 | — | good |
| 5 | M5 | PC-5 | — | good |
| 6 | M6 | PC-6 | — | good |
| 7 | M7 | PC-7 | — | good |
| 8 | M8 | PC-8 | — | good |
| 9 | M9 | PC-9 | — | good |
| 10 | M10 | PC-10 | — | good |
| 11 | M11 | PC-11 | — | good |
| 12 | M12 | PC-12 | — | good |
| 13 | M13 | PC-13 | — | good |
| 14 | M1 | PC-14 | — | good |
| 15 | M2 | PC-15 | — | good |
| 16 | M3 | PC-16 | — | good |
| 17 | M4 | PC-17 | — | good |
| 18 | M5 | PC-18 | — | good |
| 19 | M6 | PC-19 | — | good |
| 20 | M7 | PC-20 | — | good |
| 21 | M8 | PC-21 | — | good |
| 22 | M9 | PC-22 | — | good |
| 23 | M10 | PC-1 | RM-1 | good |

As Table 4 shows, in Examples 1 to 23, the light leak was not observed, although the types of compositions or polar compounds were changed. The results show that the homeotropic alignment was good, and the liquid crystal molecules were stably aligned, even if the device has no alignment films. In Example 23, polymerizable compound (RM-1) was further added, and the same results were obtained.

INDUSTRIAL APPLICABILITY

The liquid crystal composition of the invention can adjust the alignment of liquid crystal molecules in a device without alignment films. A liquid crystal display device including the composition can be used for a liquid crystal projector, a liquid crystal television and so forth, since it has characteristics such as a short response time, a large voltage holding ratio, a low threshold voltage, a large contrast ratio and a long service life.

What is claimed is:

1. A liquid crystal composition having positive dielectric anisotropy and including at least one compound selected from the group consisting of compounds represented by formula (1) as a first component and at least one polar compound selected from the group consisting of compounds represented by formula (5) and formula (6) as a first additive:

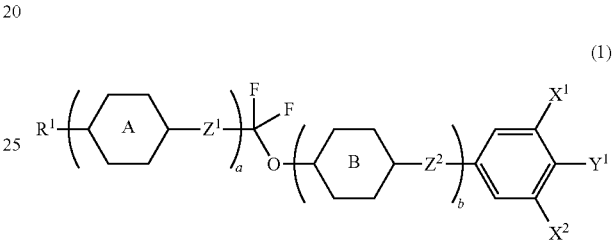

(1)

in formula (1), $R^1$ is alkyl having 1 to 12 carbons, alkoxy having 1 to 12 carbons or alkenyl having 2 to 12 carbons; ring A and ring B are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ and $Z^2$ are independently a single bond, —$CH_2CH_2$—, —CH═CH—, —$CH_2O$—, —$OCH_2$—, —COO—, —OCO—, —$CF_2O$— or —$OCF_2$—; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and a is 1, 2, 3 or 4; b is 0, 1, 2 or 3, and the sum of a and b is 4 or less;

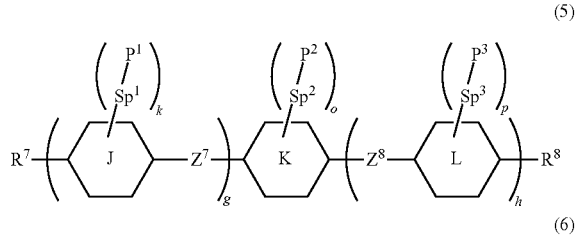

(5)

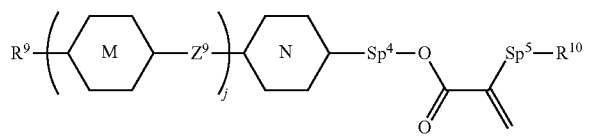

(6)

in formula (5), $R^7$ is hydrogen, fluorine, chlorine or alkyl having 1 to 25 carbons, and in the alkyl at least one —$CH_2$— may be replaced by —$NR^0$—, —O—, —S—, —CO—, —CO—O—, —O—CO— or —O—CO—O— or cycloalkylene having 3 to 8 carbons, and at least one tertiary carbon (>CH—) may be replaced by nitrogen (>N—), and in these groups at least one hydrogen may be replaced by fluorine or chlorine, where $R^0$ is hydrogen or alkyl having 1 to 12 carbons; $R^8$ is a polar group having at least one of an oxygen atom of a OH moiety, a sulfur atom of an SH moiety and a nitrogen atom of primary, secondary or tertiary amine moiety; ring J, ring K and ring L are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^7$ and $Z^8$ are independently a single bond or alkylene having 1 to 10 carbons, and in the alkylene at least one —$CH_2$— may be replaced by —O—, —CO—, —COO— or —OCO—, and at least one —$CH_2CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine; $P^1$, $P^2$ and $P^3$ is a polymerizable group; $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine; g and h are independently 0, 1, 2, 3 or 4, and the sum of g and h is 0, 1, 2, 3 or 4; k and p are independently 0, 1, 2, 3 or 4, o is 1, 2, 3 or 4; and in formula (6), $R^9$ is hydrogen, fluorine, chlorine, alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; $R^{10}$ is a group represented by —OH, —$OR^0$, —$NH_2$, —$NHR^0$ or —$N(R^0)_2$, where $R^0$ is hydrogen or alkyl having 1 to 12 carbons; ring M and ring N are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^9$ is a single bond, —$CH_2CH_2$—, —CH=CH—, —C≡C—, —COO—, —OCO—, —$CF_2O$—, —$OCF_2$—, —$CH_2O$—, —$OCH_2$— or —CF=CF—; $Sp^4$ and $Sp^5$ are independently a single bond or alkylene having 1 to 7 carbons, and in the alkylene at least one —$CH_2$— may be replaced by —O—, —COO— or —OCO—, at least one —$CH_2CH_2$— may be replaced by —CH=CH—, and in these groups at least one hydrogen may be replaced by fluorine; and i is 0, 1, 2, 3 or 4.

2. The liquid crystal composition according to claim 1, including at least one compound selected from the group consisting of compounds represented by formula (1-1) to formula (1-14) as the first component:

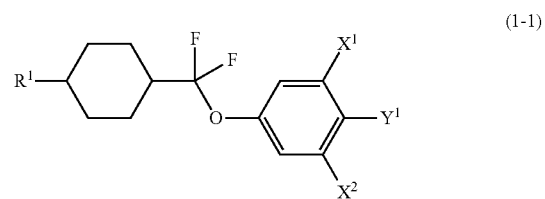

(1-1)

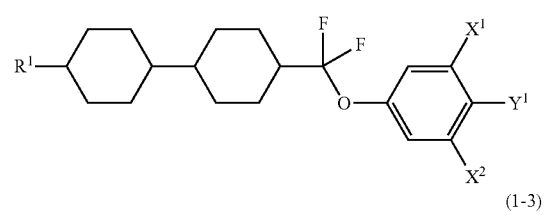

(1-2)

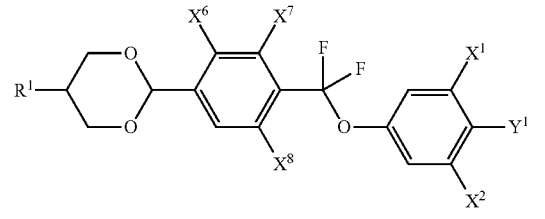

(1-3)

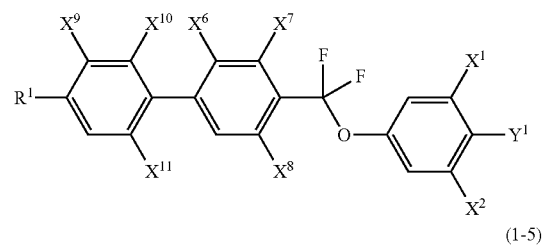

(1-4)

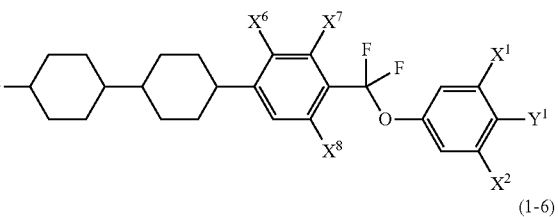

(1-5)

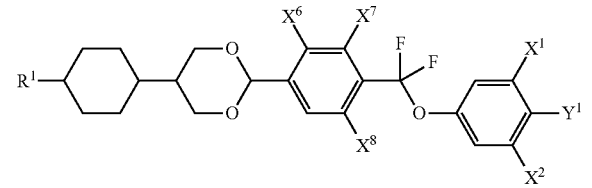

(1-6)

-continued (1-7)
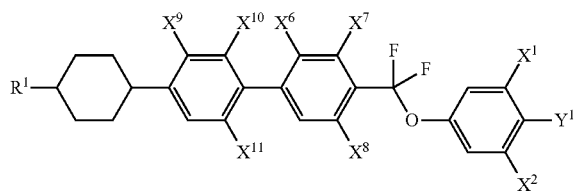

(1-8)
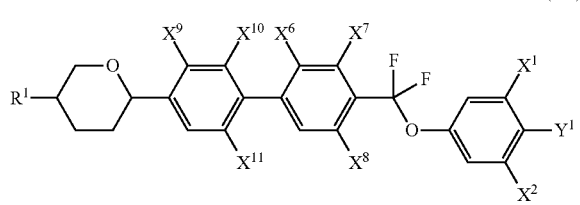

(1-9)
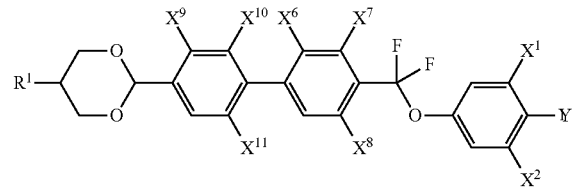

(1-10)
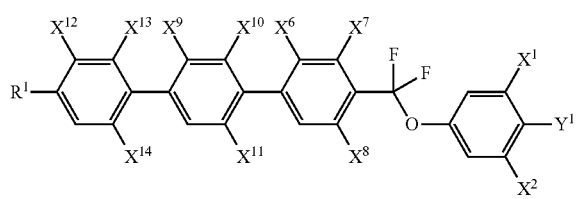

(1-11)
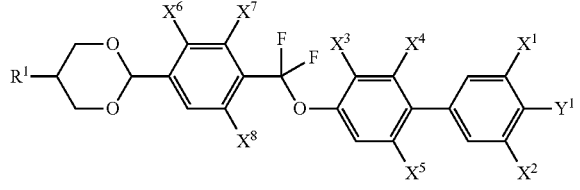

(1-12)
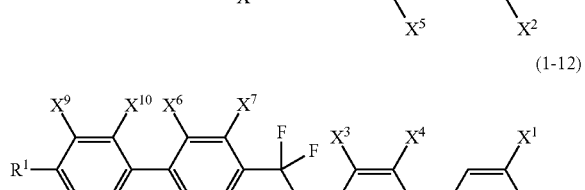

(1-13)
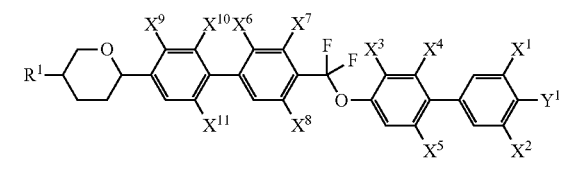

-continued (1-14)
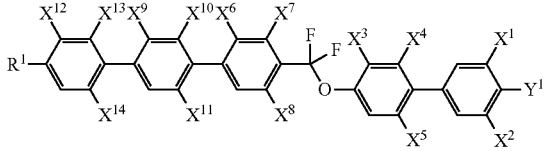

in formula (1-1) to formula (1-14), $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$, $X^8$, $X^9$, $X^0$, $X^{11}$, $X^{12}$, $X^{13}$ and $X^{14}$ are independently hydrogen or fluorine; and $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine.

3. The liquid crystal composition according to claim 1, wherein the proportion of the first component is in the range of 5% by weight to 55% by weight based on the weight of the liquid crystal composition.

4. The liquid crystal composition according to claim 1, including at least one compound selected from the group consisting of compounds represented by formula (2) as a second component:

(2)
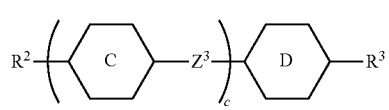

in formula (2), $R^2$ and $R^3$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine; ring C and ring D are independently 1,4-cyclohexylene, 1,4-phenylene, 2-fluoro-1,4-phenylene or 2,5-difluoro-1,4-phenylene; $Z^3$ is a single bond, —CH$_2$CH$_2$—, —CH$_2$O—, —OCH$_2$—, —COO— or —OCO—; and c is 1, 2 or 3.

5. The liquid crystal composition according to claim 4, including at least one compound selected from the group consisting of compounds represented by formula (2-1) to formula (2-13) as the second component:

(2-1)
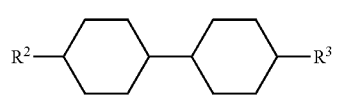

(2-2)
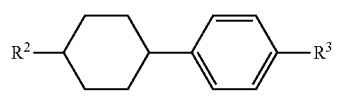

(2-3)
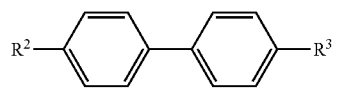

-continued (2-4)
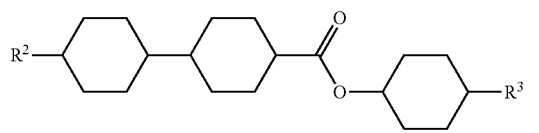

(2-5)
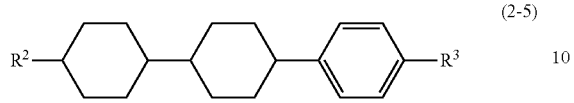

(2-6)
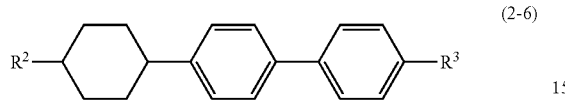

(2-7)
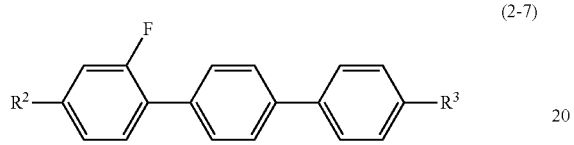

(2-8)
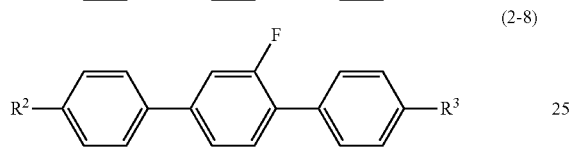

(2-9)
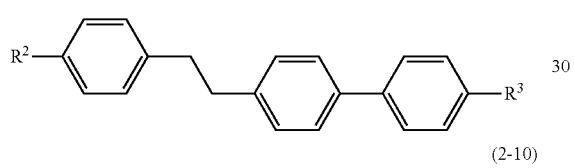

(2-10)
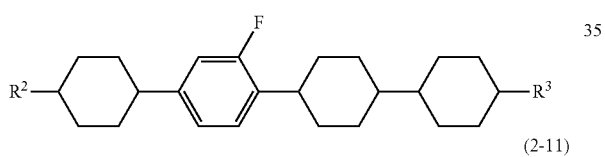

(2-11)
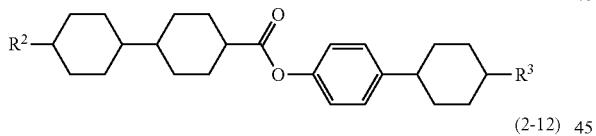

(2-12)
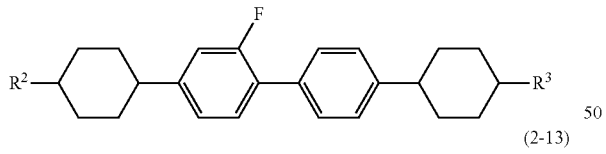

(2-13)
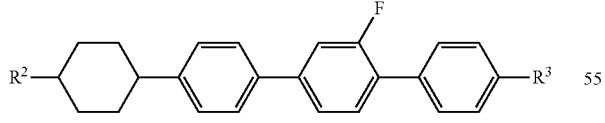

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine.

6. The liquid crystal composition according to claim 4, wherein the proportion of the second component is in the range of 10% by weight to 70% by weight based on the weight of the liquid crystal composition.

7. The liquid crystal composition according to claim 4, including at least one compound selected from the group consisting of compounds represented by formula (3) as a third component:

(3)
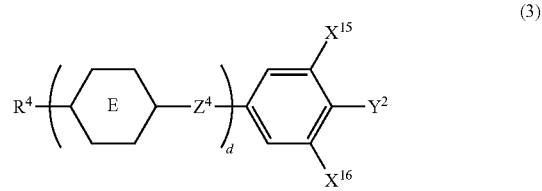

in formula (3), $R^4$ is alkyl having 1 to 12 carbons, alkoxy having 1 to 12 carbons or alkenyl having 2 to 12 carbons; ring E is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^4$ is a single bond, —CH$_2$CH$_2$—, —COO— or —OCO—; $X^{15}$ and $X^{16}$ are independently hydrogen or fluorine; $Y^2$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and d is 1, 2, 3 or 4.

8. The liquid crystal composition according to claim 7, including at least one compound selected from the group consisting of compounds represented by formula (3-1) to formula (3-16) as the third component:

(3-1)
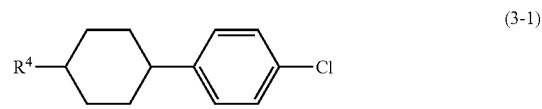

(3-2)
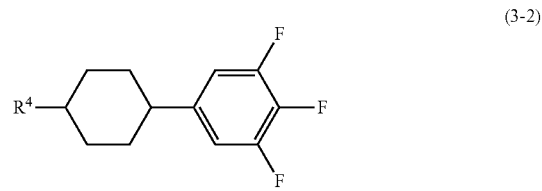

(3-3)
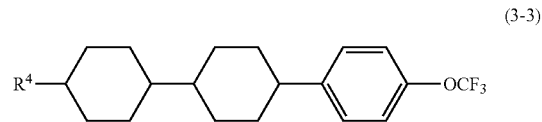

(3-4)
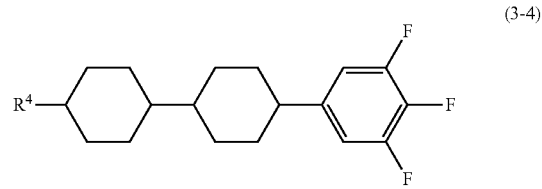

(3-5) 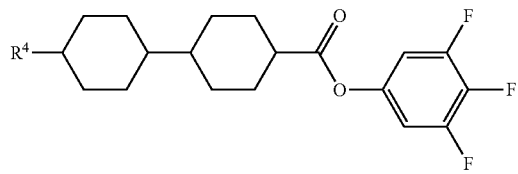

(3-6) 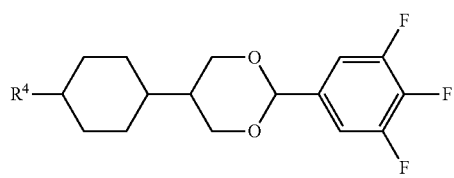

(3-7) 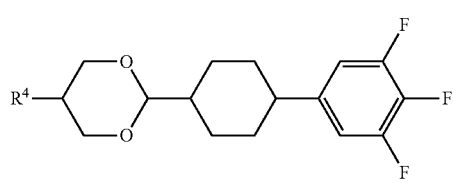

(3-8) 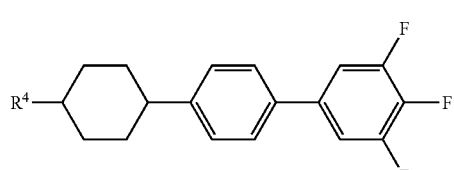

(3-9) 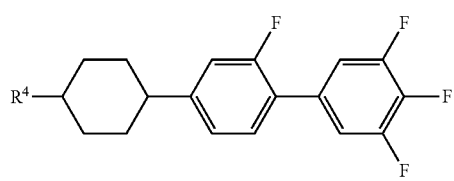

(3-10) 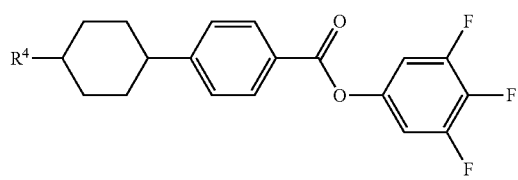

(3-11) 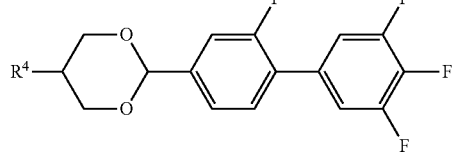

(3-12) 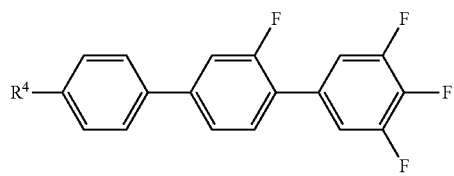

(3-13) 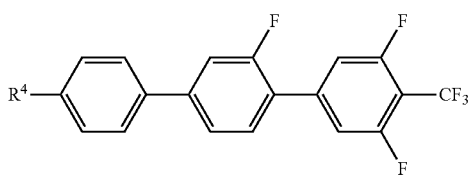

(3-14) 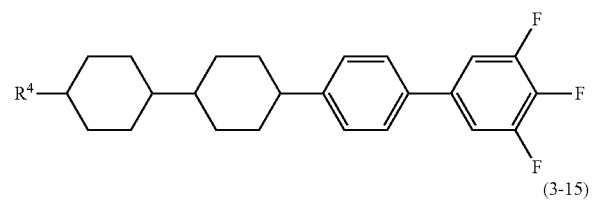

(3-15) 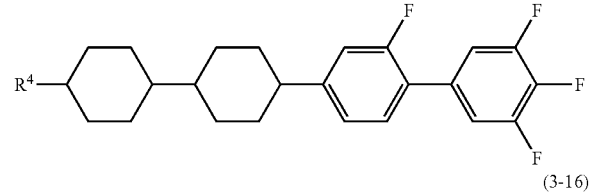

(3-16) 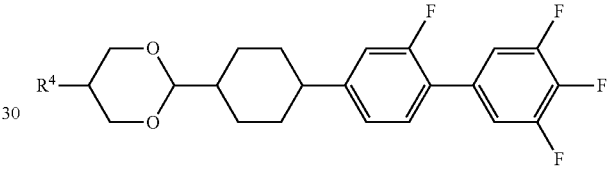

in formula (3-1) to formula (3-16), $R^4$ is alkyl having 1 to 12 carbons, alkoxy having 1 to 12 carbons or alkenyl having 2 to 12 carbons.

9. The liquid crystal composition according to claim 4, including at least one compound selected from the group consisting of compounds represented by formula (4) as a fourth component:

(4)

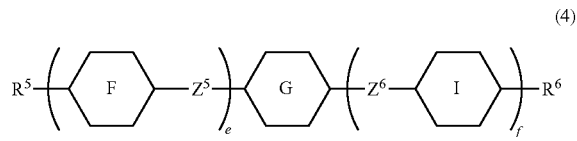

in formula (4), $R^5$ and $R^6$ are independently alkyl having 1 to 12 carbons, alkoxy having 1 to 12 carbons, alkenyl having 2 to 12 carbons or alkenyloxy having 2 to 12 carbons; ring F and ring I are independently 1,4-cyclohexylene, 1,4-cyclohexenylene, 1,4-phenylene, 1,4-phenylene in which at least one hydrogen has been replaced by fluorine or chlorine, or tetrahydropyran-2, 5-diyl; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochromane-2,6-diyl; $Z^5$ and $Z^6$ are independently a single bond, —$CH_2CH_2$—, —$CH_2O$—, —$OCH_2$—, —COO— or —OCO—; and e is 1, 2 or 3, f is 0 or 1, and the sum of e and f is 3 or less.

10. The liquid crystal composition according to claim 9, including at least one compound selected from the group consisting of compounds represented by formula (4-1) to formula (4-22) as the fourth component:
(4-1)
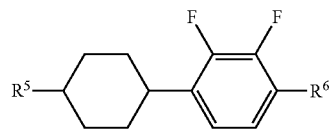
(4-2)
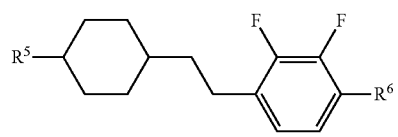
(4-3)
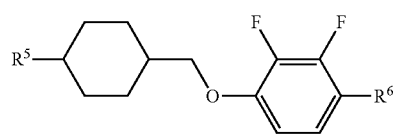
(4-4)
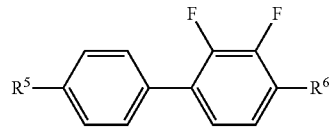
(4-5)
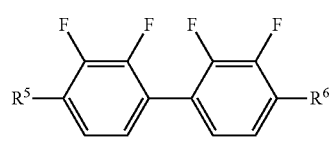
(4-6)
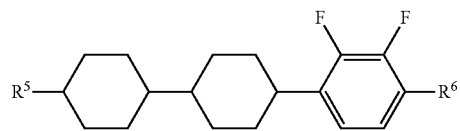
(4-7)
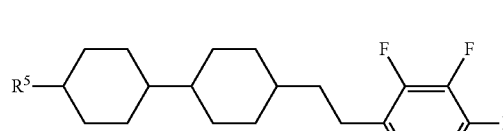
(4-8)
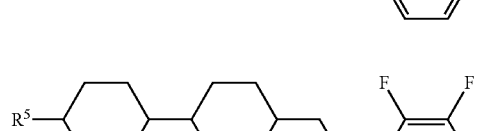
(4-9)
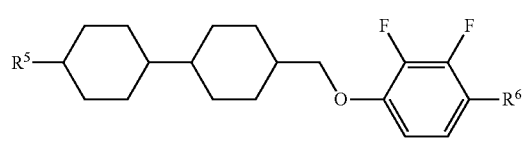
(4-10)
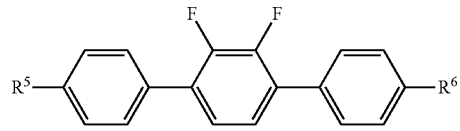
(4-11)
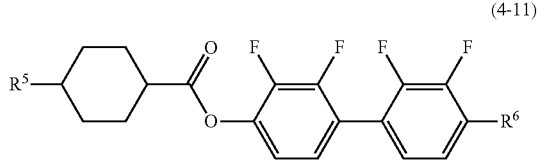
(4-12)
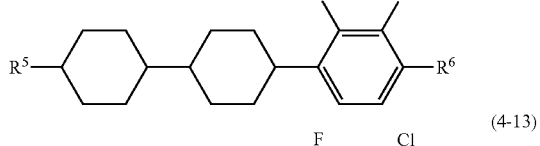
(4-13)
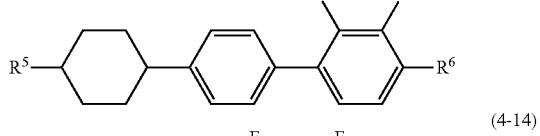
(4-14)
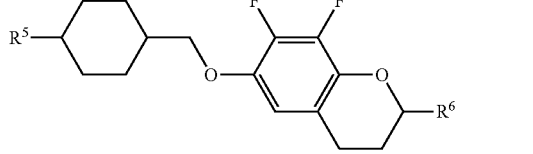
(4-15)
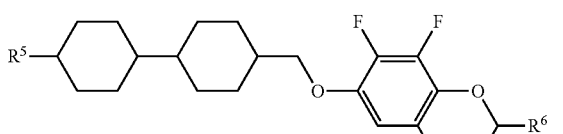
(4-16)
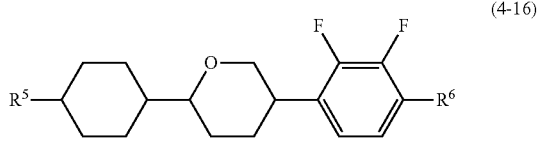
(4-17)
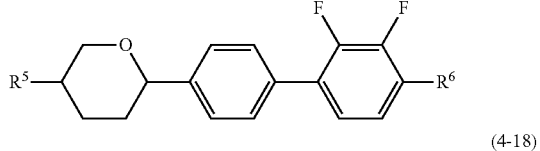
(4-18)
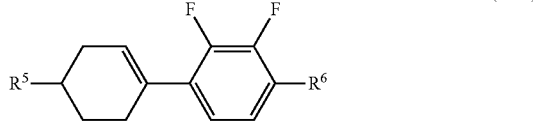
(4-19)
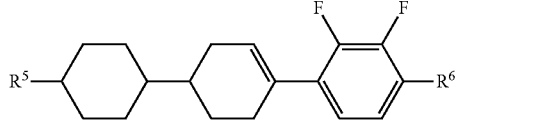
(4-20)
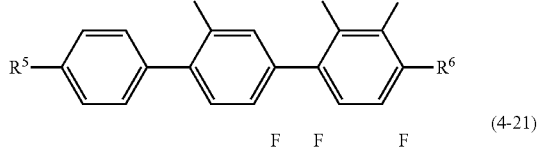
(4-21)
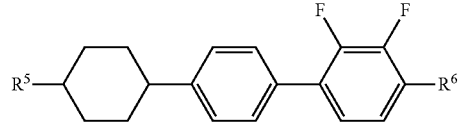

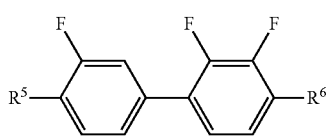
(4-22)

in formula (4-1) to formula (4-22), $R^5$ and $R^6$ are independently alkyl having 1 to 12 carbons, alkoxy having 1 to 12 carbons, alkenyl having 2 to 12 carbons or alkenyloxy having 2 to 12 carbons.

11. The liquid crystal composition according to claim 1, wherein in formula (5), $R^8$ is a group represented by any one of formula (A1) to formula (A4):

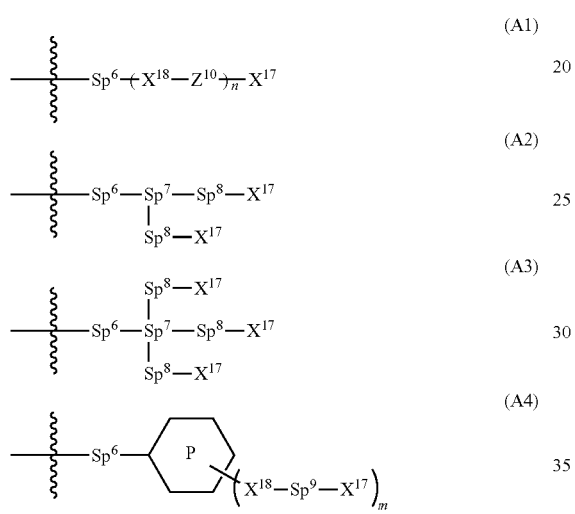

in formula (A1) to formula (A4), $Sp^6$, $Sp^8$ and $Sp^9$ are independently a single bond or alkylene having 1 to 12 carbons, and in the alkylene at least one —$CH_2$— may be replaced by —O—, —S—, —NH—, —N($R^0$)—, —CO—, —CO—O—, —O—CO, —O—CO—O—, —S—CO—, —CO—S—, —N($R^0$)—CO—O—, —O—CO—N($R^0$)—, —N($R^0$)—CO—N($R^0$)—, —CH=CH— or —C≡C—, and in these groups at least one hydrogen may be replaced by fluorine or chlorine, where $R^0$ is hydrogen or alkyl having 1 to 12 carbons; $Sp^7$ is >CH—, >$CR^0$—, >N— or >C<, where $R^0$ is hydrogen or alkyl having 1 to 12 carbons; $X^{17}$ is —OH, —$OR^0$, —COOH, —$NH_2$, —$NHR^0$, —N($R^0$)$_2$, —SH, —$SR^0$,

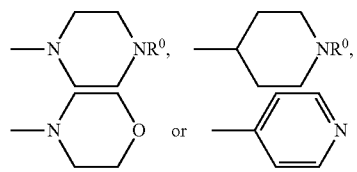

where $R^0$ is hydrogen or alkyl having 1 to 12 carbons; $X^{18}$ is —O—, —CO—, —NH—, —$NR^0$—, —S— or a single bond, where $R^0$ is hydrogen or alkyl having 1 to 12 carbons; $Z^{10}$ is a single bond or alkylene having 1 to 15 carbons, and in the alkylene at least one —$CH_2$— may be replaced by —C≡C—, —CH=CH—, —COO—, —OCO—, —CO— or —O—, and in these groups at least one hydrogen may be replaced by fluorine or chlorine; Ring P is aryl having 6 to 25 carbons, and in the aryl one to three hydrogens may be replaced by —OH, —($CH_2$)$_q$—OH, fluorine, chlorine, alkyl having 1 to 5 carbons or alkyl having 1 to 5 carbons in which at least one hydrogen has been replaced by fluorine or chlorine, where q is 1, 2, 3 or 4; n is 0, 1, 2 or 3; and m is 1, 2, 3, 4 or 5.

12. The liquid crystal composition according to claim 1, wherein in formula (5), $P^1$, $P^2$ and $P^3$ are independently a polymerizable group selected from the group consisting of groups represented by formula (P-1) to formula (P-5):

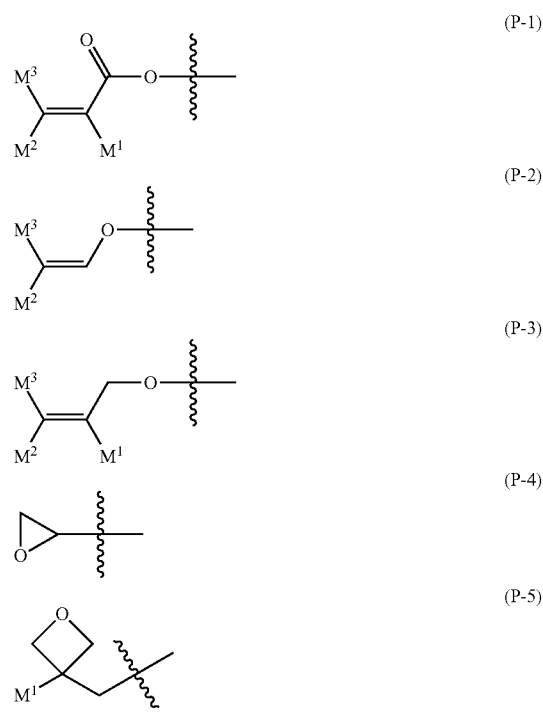

in formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine.

13. The liquid crystal composition according to claim 1, wherein the first additive is at least one polar compound selected from the group consisting of compounds represented by formula (5-1) to formula (5-15):

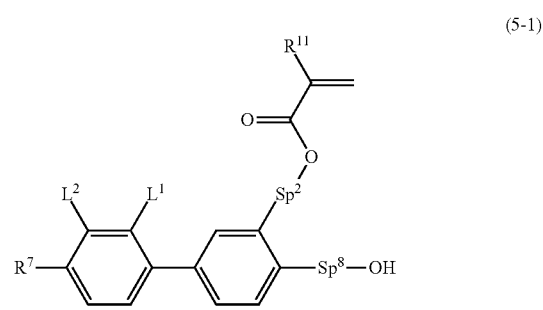
(5-1)

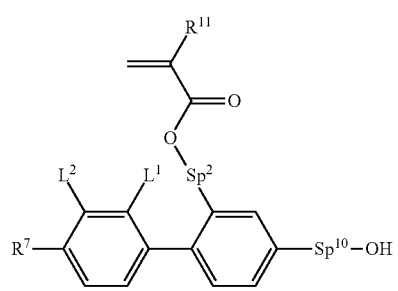 (5-2)
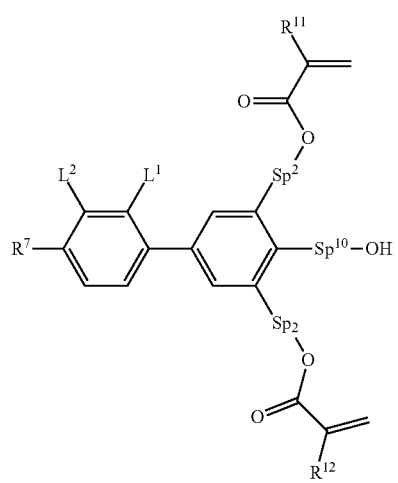 (5-3)
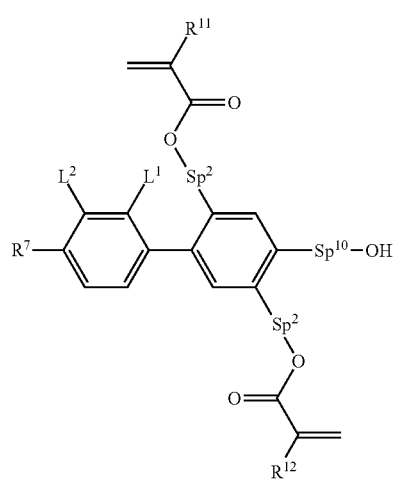 (5-4)
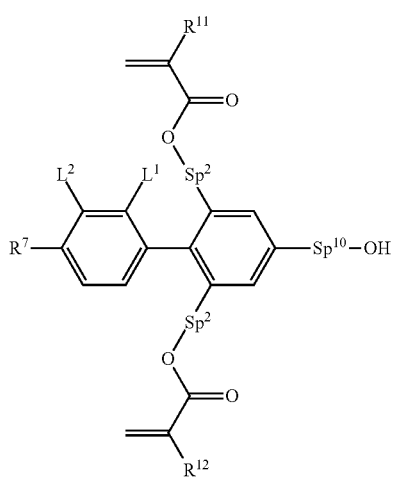 (5-5)
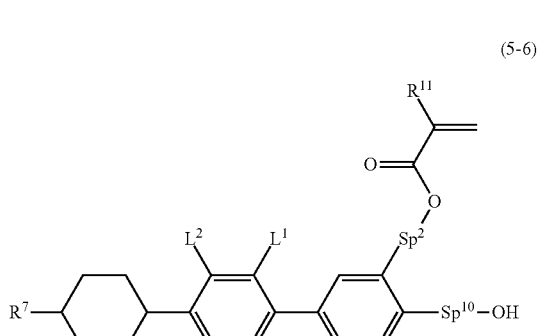 (5-6)
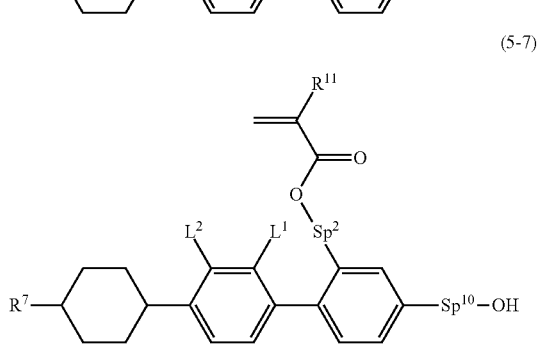 (5-7)
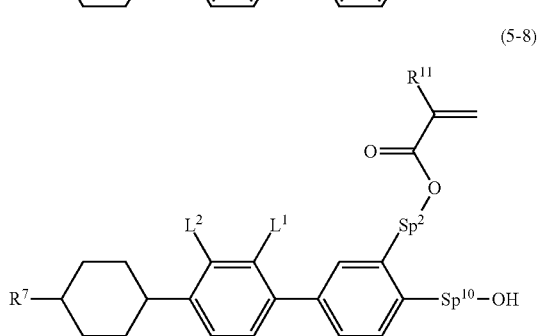 (5-8)

(5-9)
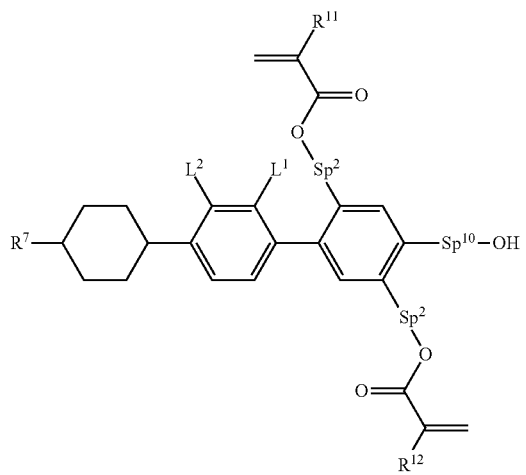
(5-10)
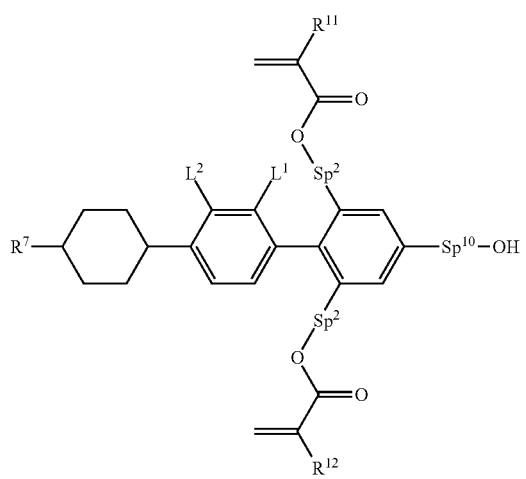
(5-11)
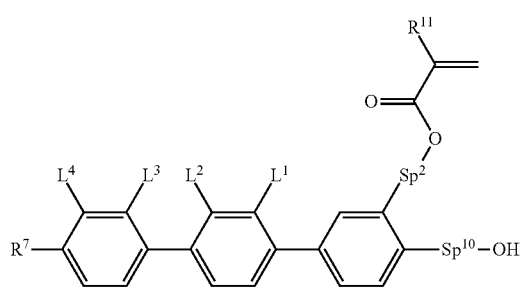
(5-12)
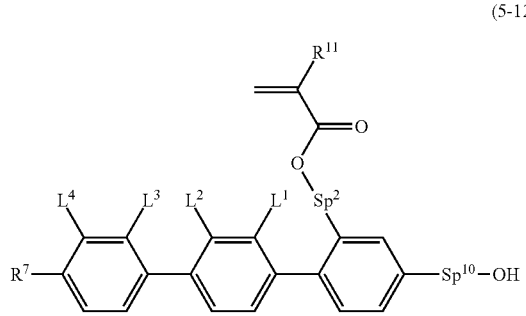
(5-13)
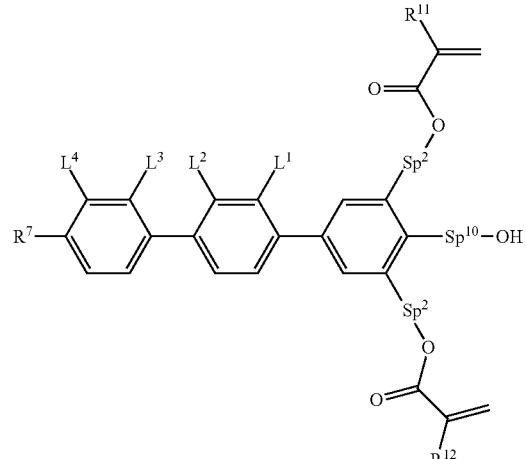
(5-14)
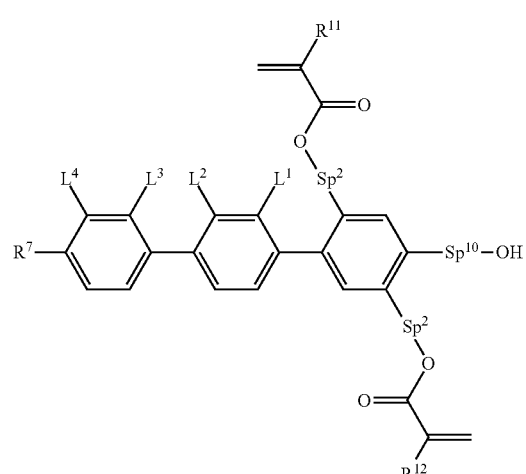
(5-15)
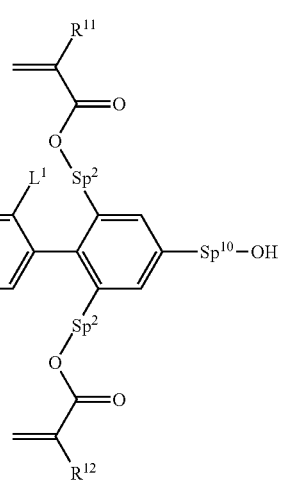
in formula (5-1) to formula (5-15), $R^7$ is hydrogen, fluorine, chlorine or alkyl having 1 to 25 carbons, and in the alkyl at least one —$CH_2$— may be replaced by —$NR^0$—, —O—, —S—, —CO—, —CO—O—, —O—CO—, —O—CO—O— or cycloalkylene having 3 to 8 carbons, at least one tertiary carbon (>CH—) may be replaced by nitrogen (>N—), and in these groups at least one hydrogen may be replaced by fluorine or chlorine, where R⁰ is hydrogen or alkyl having 1 to 12 carbons; Sp² is a single bond or alkylene having 1 to 10 carbons, and in the alkylene at least one —CH₂— may be replaced by —O—, —COO—, —OCO— or —OCOO—, and at least one —CH₂CH₂— may be replaced by —CH=CH— or —C≡C—, and in these groups at least one hydrogen may be replaced by fluorine or chlorine; Sp¹⁰ is a single bond or alkylene having 1 to 10 carbons, and in the alkylene at least one —CH₂— may be replaced by —O—, —COO—, —OCO— or —OCOO—, and at least one —CH₂CH₂— may be replaced by —CH=CH— or —C≡C—, and in these groups at least one hydrogen may be replaced by fluorine or chlorine; L¹, L², L³ and L⁴ are independently hydrogen, fluorine, methyl or ethyl; and R¹¹ and R¹² are independently hydrogen or methyl.

14. The liquid crystal composition according to claim 1, wherein the first additive is at least one polar compound selected from the group consisting of compounds represented by formula (6-1) to formula (6-9):

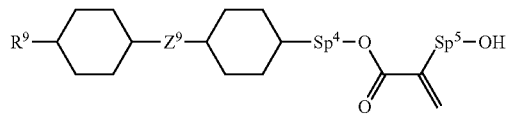
(6-1)

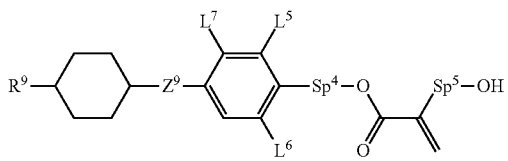
(6-2)

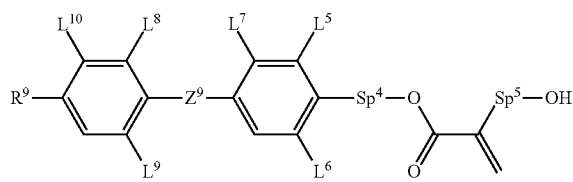
(6-3)

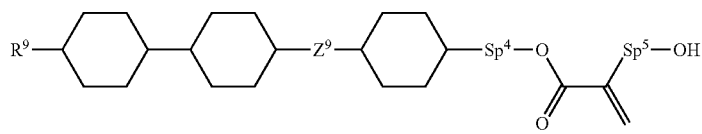
(6-4)

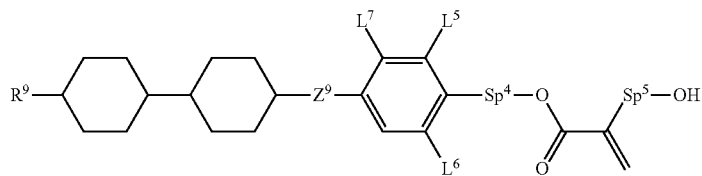
(6-5)

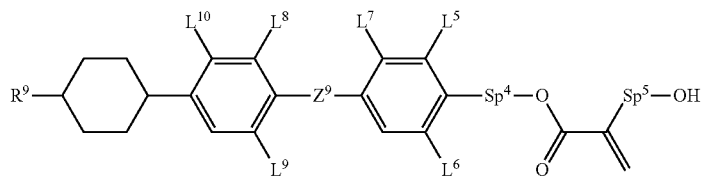
(6-6)

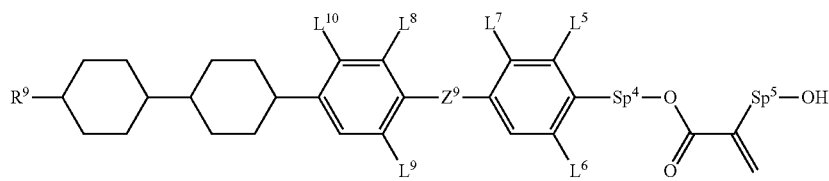
(6-7)

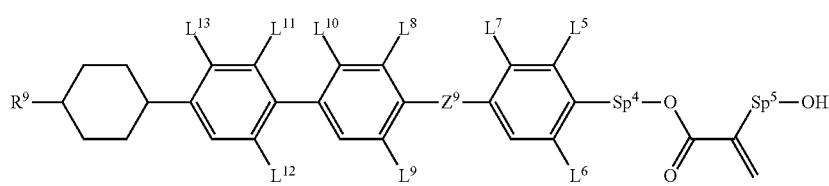
(6-8)

-continued (6-9)

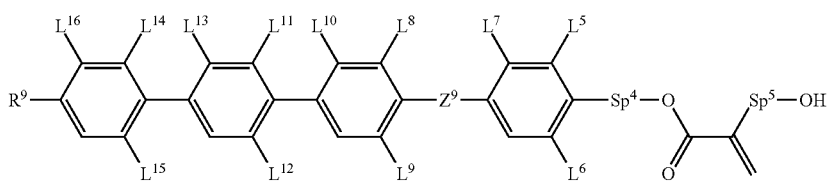

in formula (6-1) to formula (6-9), $R^9$ is hydrogen, fluorine, chlorine, alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; $Z^9$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; $Sp^4$ and $Sp^5$ are independently a single bond or alkylene having 1 to 7 carbons, and in the alkylene at least one —CH$_2$— may be replaced by —O—, —COO— or —OCO—, at least one —CH$_2$CH$_2$— may be replaced by —CH=CH—, and in these groups at least one hydrogen may be replaced by fluorine; and $L^5$, $L^6$, $L^7$, $L^8$, $L^9$, $L^{10}$, $L^{11}$, $L^{12}$, $L^{13}$, $L^{14}$, $L^{15}$ and $L^{16}$ are independently hydrogen, fluorine, methyl or ethyl.

15. The liquid crystal composition according to claim 1, wherein the proportion of the first additive is in the range of 0.05% by weight to 10% by weight based on the weight of the liquid crystal composition.

16. The liquid crystal composition according to claim 1, including at least one polymerizable compound selected from the group consisting of compounds represented by formula (7) as a second additive:

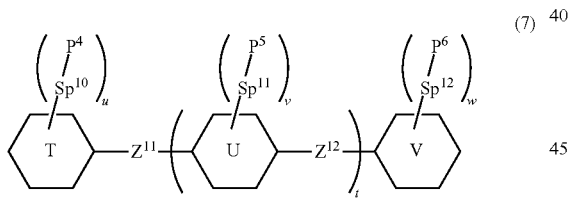

(7)

in formula (7), ring T and ring V are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring U is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^{11}$ and $Z^{12}$ are independently a single bond or alkylene having 1 to 10 carbons, and in the alkylene at least one —CH$_2$— may be replaced by —O—, —CO—, —COO— or —OCO—, and at least one —CH$_2$CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine; $P^4$, $P^5$ and $P^6$ is a polymerizable group; $Sp^{10}$, $Sp^{11}$ and $Sp^{12}$ are independently a single bond or alkylene having 1 to 10 carbons, and in the alkylene at least one —CH$_2$— may be replaced by —O—, —COO—, —OCO— or —OCOO—, and at least one —CH$_2$CH$_2$— may be replaced by —CH=CH— or —C≡C—, and in these groups at least one hydrogen may be replaced by fluorine or chlorine; t is 0, 1 or 2; and u, v and w are independently 0, 1, 2, 3 or 4, and the sum u, v and w is 1 or more.

17. The liquid crystal composition according to claim 16, including at least one polymerizable compound selected from the group consisting of compounds represented by formula (7-1) to formula (7-28) as the second additive:

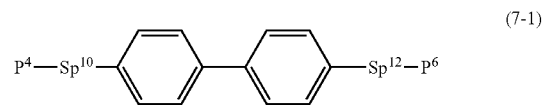

(7-1)

(7-2)

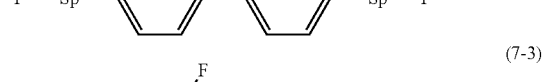

(7-3)

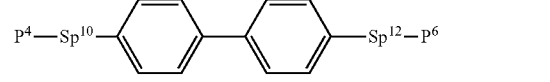

(7-4)

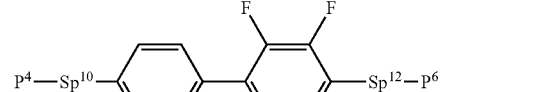

(7-5)

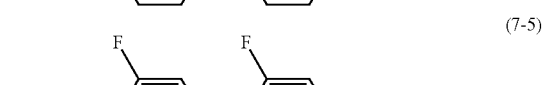

(7-6)

(7-7) 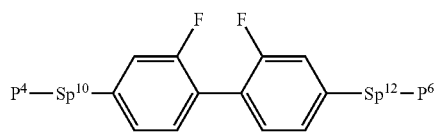
(7-8) 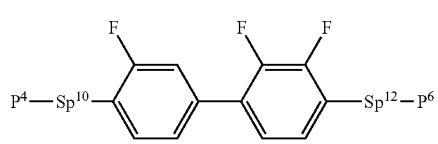
(7-9) 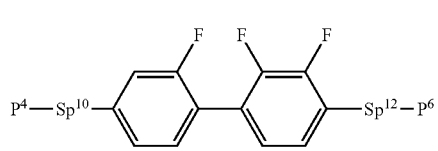
(7-10) 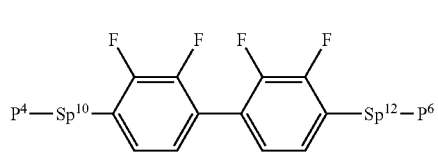
(7-11) 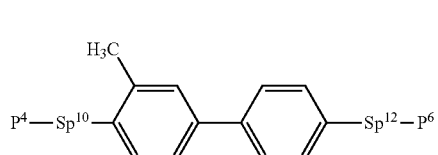
(7-12) 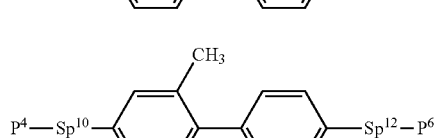
(7-13) 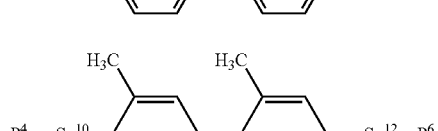
(7-14) 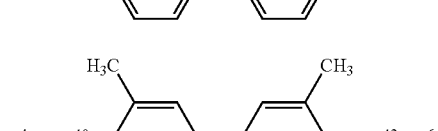
(7-15) 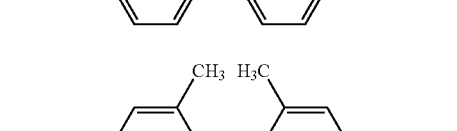
(7-16) 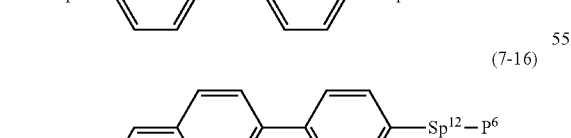
(7-17) 
(7-18) 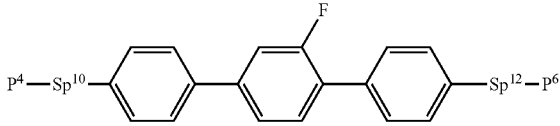
(7-19) 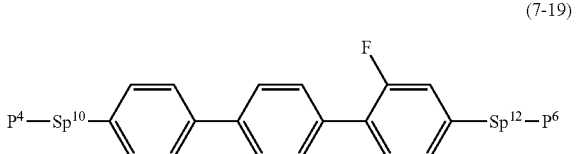
(7-20) 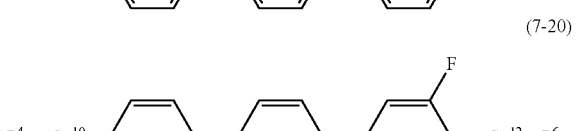
(7-21) 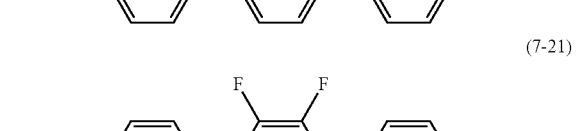
(7-22) 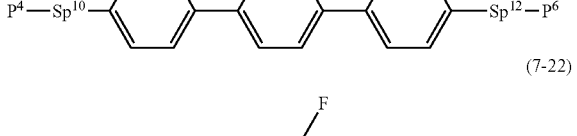
(7-23) 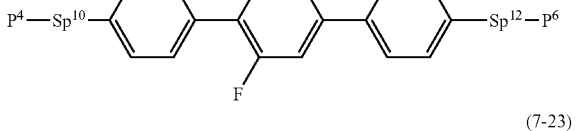
(7-24) 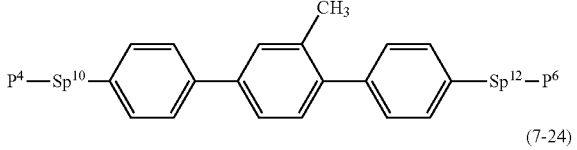
(7-25) 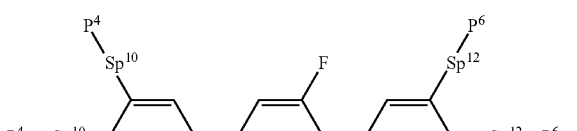
(7-26) 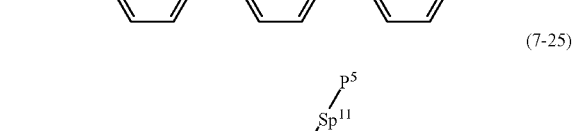

(7-27)

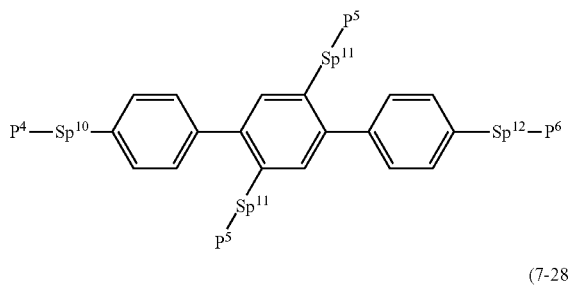

(7-28)

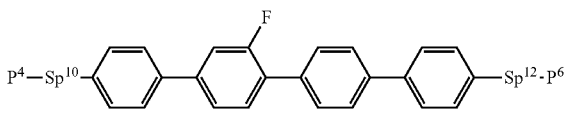

in formula (7-1) to formula (7-28), $P^4$, $P^5$ and $P^6$ are independently a polymerizable group selected from the group consisting of groups represented by formula (P-1) to formula (P-3):

(P-1)

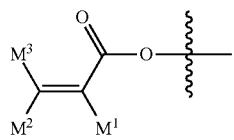

(P-2)

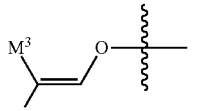

(P-3)

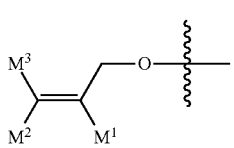

where $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and $Sp^{10}$, $Sp^{11}$ and $Sp^{12}$ are independently a single bond or alkylene having 1 to 10 carbons, and in the alkylene at least one —$CH_2$— may be replaced by —O—, —COO—, —OCO— or —OCOO—, and at least one —$CH_2CH_2$— may be replaced by —CH=CH— or —C≡C—, and in these groups at least one hydrogen may be replaced by fluorine or chlorine.

18. The liquid crystal composition according to claim 16, wherein the proportion of the second additive is in the range of 0.03% by weight to 10% by weight based on the weight of the liquid crystal composition.

19. A liquid crystal display device without alignment films and including the liquid crystal composition according of claim 1, where the polymerizable compound in the liquid crystal composition has been polymerized.

* * * * *